United States Patent
Guskov et al.

(10) Patent No.: US 7,315,303 B1
(45) Date of Patent: Jan. 1, 2008

(54) HYBRID MESHES

(75) Inventors: Igor Guskov, Ann Arbor, MI (US); Andrei Khodakovsky, Pasadena, CA (US); Peter Schröder, Pasadena, CA (US); Wim Sweldens, New Providence, NJ (US)

(73) Assignees: California Institute of Technology, Pasadena, CA (US); Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 10/977,555

(22) Filed: Oct. 28, 2004

Related U.S. Application Data

(63) Continuation of application No. 10/066,100, filed on Jan. 30, 2002, now Pat. No. 7,006,088.

(51) Int. Cl.
*G06T 15/30* (2006.01)

(52) U.S. Cl. .................. 345/423; 345/419; 345/420; 345/440

(58) Field of Classification Search ............... 345/419, 345/420, 423, 440
See application file for complete search history.

(56) References Cited

U.S. PATENT DOCUMENTS 6,466,696 B1 * 10/2002 Politis .................. 382/226

OTHER PUBLICATIONS

Velho "Semi-Regular and Box Spine Surfaces", IEEE 2000, pp. 131-138.*

* cited by examiner

*Primary Examiner*—Kimbinh T. Nguyen
(74) *Attorney, Agent, or Firm*—Howrey LLP

(57) ABSTRACT

A method of forming a hybrid mesh representation of an object surface is provided, along with the hybrid mesh representation and data structures corresponding to various polygons in the hybrid mesh representation. The hybrid mesh representation comprises a base mesh and one or more higher level meshes. At least one of the higher level meshes representing a patch is an irregular mesh. The method of forming the hybrid mesh representation comprises the steps of forming a base mesh, and then forming one or more higher level meshes from the base mesh through one or more regular refinement operations in combination with at least one irregular operation.

36 Claims, 63 Drawing Sheets

HYBRID MESHES

This application is a continuation application of co-pending U.S. patent application Ser. No. 10/066,100 filed Jan. 30, 2002 now U.S. Pat. No. 7,006,008, which is hereby fully incorporated by reference herein as though set forth in full.

The U.S. Government has certain rights in this invention pursuant to Grant Numbers ACI-9721349, DMS-9872890, ACI-9982273 awarded by the National Science Foundation.

FIELD OF THE INVENTION

This invention relates to the field of representing object surfaces, and, more specifically, representing object surfaces through mesh structures or hierarchies.

RELATED ART

A mesh structure is a convenient way to represent object surfaces. In a mesh structure, a mesh of tessellated polygons such as triangles is used to represent the object surface. The vertices of the polygons are positioned on the object surface, and the flat polygon faces form an approximation of the object surface. The overall match between the original object surface and the mesh representation depends on the number of polygons used to form the mesh representation. Generally speaking, the more polygons in the mesh representation, the more accurate it is.

The mesh structure may be a hierarchical arrangement in which a coarse base mesh is refined to progressively finer levels of detail at each layer in the hierarchy. This hierarchical arrangement allows the mesh structure to be tailored to the application at hand. For applications only needing a coarse level of detail, the base mesh, or a mesh within a few layers of the base mesh, may be an appropriate representation. For applications requiring a fine level of detail, a higher level mesh might be an appropriate representation.

A regular mesh is one which is subject to certain restrictions regarding the valence of polygon vertices, i.e., the number of polygonal edges which enter a vertex. For a regular triangular representation, the valence restriction is six for internal vertices, and four for boundary vertices. For a regular representation formed of quads, i.e., boxes or rectangles, the valence restriction is four for internal vertices, and three for boundary vertices.

A regular mesh is to be contrasted with an irregular mesh. An irregular mesh is one which is not subject to valence restrictions. In one embodiment, an irregular mesh is a mesh where at least one vertex thereof violates valence restrictions. Consequently, compared to regular meshes, an irregular mesh is more flexible in terms of representing object surfaces, but entails a more difficult implementation of many geometry processing algorithms.

A regular mesh is often formed by starting with a regular base mesh and then progressively subdividing the base mesh into more detailed meshes which are also regular. A semi-regular mesh is one which is formed by starting with an irregular base mesh and then progressively subdividing each patch of the base mesh into more detailed regular meshes. In both cases, the operations which are performed at each level of the hierarchy are regular operations, i.e., operations which involve subdividing the tessellated polygons at one level into more detailed polygons at a second level such that the valence restrictions are still maintained in the subdivided polygons.

A problem with the regular and semi-regular mesh representations is that detailed features of an object surface need to be reflected or represented in the base mesh in order for those features to be represented at higher levels of the mesh. As a result, the addition of detailed features to an object surface may cause dramatic changes in the regular and semi-regular mesh representations. These representations therefore are not considered to scale well as the number of detailed features in an object surface increases. Consider, for example, an object surface consisting of cylinder 100 illustrated in FIG. 1A. A base mesh for representing that surface is identified with numeral 1A. Now consider the impact of the addition of the small handle 104 to the object surface 100 as illustrated in FIG. 1B. The base mesh 102 is no longer adequate for representing the object surface in a regular or semi-regular mesh representation since the small handle 104 is not reflected in the base mesh. Instead, the existing polygons in the base mesh must be rearranged to accommodate the new feature, or additional polygons must be added to reflect the new feature. In either case, the addition of the new feature does not gracefully translate into changes to the base mesh.

Another problem with the regular and semi-regular mesh representations is that detailed features are frequently represented with stretched polygons having bad sampling patterns. Also, bad aspect ratios can lead to numerical problems if further processing (for example, numerical simulations) of such meshes is required. Stretched polygons having bad sampling patterns are disfavored because they lead to poor approximation of the original object surface.

Consider, for example, an object surface consisting of rabbit ear 106 illustrated in FIG. 1C. A layer three representation of surface 106 in a semi-regular mesh representation is illustrated in FIG. 1D. As can be seen, the surface 106 is represented with polygons 110 and 112 having bad sampling patterns. In effect, these polygons have had to be stretched to accommodate the detail of the rabbit ear. This represents a bad sampling pattern since just one vertex represents the entire ear. Now consider the layer seven representation of the rabbit ear, which is illustrated in FIG. 1E. As can be seen, the representation still suffers from severe polygonal stretching. Moreover, large portions of the original surface 106 are still not represented. Consider, for example, gaps 116 and 118 in the layer seven representation. These gaps represent areas of the original object surface which are not represented in the layer seven mesh. Consider also the spike 114 at the tip of the layer seven representation. This is not a good approximation of the tip of the original surface 106.

RELATED APPLICATION(S)

This application is related to U.S. patent application Ser. No. 09/820,383, entitled "USE OF NORMAL MESHES IN THREE-DIMENSIONAL IMAGING," filed Jul. 26, 2000, U.S. Provisional Application No. 60/176,369, entitled "NORMAL MESHES," filed Jan. 14, 2000, U.S. patent application Ser. No. 09/658,214, entitled "COMPRESSION OF 3D SURFACES USING PROGRESSIVE GEOMETRY," filed Sep. 8, 2000, U.S. Provisional Application No. 60/178,134, entitled "PROGRESSIVE GEOMETRY COMPRESSION," filed Jan. 26, 2000, and U.S. Provisional Application No. 60/176,155, "PROGRESSIVE GEOMETRY COMPRESSION," filed Jan. 14, 2000. Each of these applications is fully incorporated herein by reference as though set forth in full.

SUMMARY

In one aspect, the invention provides a method of forming a hybrid mesh representation of an object surface. A hybrid mesh representation is a hierarchical arrangement of mesh representations, with a base mesh at the root of the hierarchy, and with higher level meshes extending from the root of the hierarchy, where patches may be represented at higher levels beyond the base mesh through irregular meshes. It is to be contrasted with regular and semi-regular representations, where all patches are represented at levels beyond the base mesh through regular meshes.

The method begins with the step of forming a base mesh for the object surface. The base mesh may be produced manually or automatically, or combinations thereof. The base mesh may be regular or irregular. The base mesh may be such that patch edges are aligned in accordance with features on the object surface. The polygons forming the mesh may be any suitable polygon, such as but not limited to triangles, quads, or hexagons. Moreover, the base mesh may be parameterized, i.e., may have a mapping into a parameter domain, for ease of data manipulation.

The next step in the method comprises forming at least one higher level mesh from the base mesh, through one or more regular refinement operations in combination with at least one irregular operation. In one implementation, this step comprises progressively refining the base mesh to one or more levels through regular operations, i.e., operations which involve subdividing the polygons while maintaining valence restrictions, irregular operations, i.e., operations which involve changing the connectivity of a mesh without necessarily maintaining valence restrictions, or any combination thereof, provided that at least one irregular operation is performed on or in relation to at least one level. Examples of irregular operations which are possible include removing polygons, and adding polygons to avoid over-stretching of existing polygons. The result is a hierarchical arrangement of mesh representations which constitutes a hybrid mesh.

A second aspect of the invention comprises a hybrid mesh representation of an object surface. The hybrid mesh representation comprises a base mesh and one or more higher level meshes having a hierarchical relationship. The base mesh may be a regular or irregular mesh. Moreover, each patch of the base mesh may be represented at high levels of the hierarchy through a regular or irregular mesh, but at least one of the patches should be represented at a higher level of the hierarchy through an irregular mesh.

A third aspect of the invention comprises one or more data structures corresponding to a hybrid mesh representation. A first data structure comprises a data structure corresponding to a root polygon in a mesh representation. In a hybrid mesh, such root polygons may appear in the base mesh or in higher level meshes. In one embodiment, the data structure corresponding to a root polygon comprises a pointer to each of its vertices, a pointer to the root polygons of each of its neighbors or data structures corresponding thereto, and a pointer to polygons comprising its children (if any) or data structures corresponding thereto.

A second data structure comprises a data structure corresponding to a child polygon in a mesh representation. In a hybrid mesh, a child polygon may appear at any level beyond the base mesh. In one embodiment, the data structure corresponding to a child polygon comprises a pointer to its parent or a data structure corresponding thereto, a pointer to each of its vertices, and a pointer to each of its children (if any) or data structures corresponding thereto. In this embodiment, in contrast to the data structure corresponding to a root polygon, the data structure corresponding to a child polygon lacks pointers to each of its neighbors.

The data structure corresponding to a child polygon may also comprise a flag which has first and second states. The flag is normally in the first state, indicating that the child polygon is present. If the child polygon is removed, such as through an irregular operation, the flag is placed in the second state. In one implementation, the first state is the state in which the flag is a logical "0" (the reset state), and the second state is the state in which the flag is a logical "1" (the set state).

One or more child polygons may be selected and removed. Additional polygons forming an arbitrary irregular submesh can be added. This submesh can be connected to the main mesh along the boundary of the selected region. In the latter case, the submesh boundary must agree with the boundary of selected region. If additional polygons are added, they are represented by root faces so they have neighbor pointers to each other. If the submesh is attached to the main mesh, the neighbor information indicating faces in the submesh which are neighbors of main mesh faces (which do not have neighbor pointers) is stored using virtual root faces. Such virtual root faces do not represent any polygon in the mesh but are only used to store neighbor information. Virtual root faces are referenced by removed faces as their children (removed faces cannot have any real children).

It is also possible to remove some faces, without adding others, thus introducing holes in a mesh. It is also possible to add but not attach new faces, thus introducing a disconnected component in a mesh.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 2B is a pyramid depicting the confinement of irregular mesh structures in a traditional semi-regular mesh representation to the base level, while

DETAILED DESCRIPTION

As utilized herein, terms such as "about" and "substantially" are intended to allow some leeway in mathematical exactness to account for tolerances that are acceptable in the trade, e.g., any deviation upward or downward from the value modified by "about" or "substantially" by any value in the range(s) from 1% to 20% of such value. Moreover, as used herein, the terms "face" and "polygon" are synonyms and are used interchangeably, and the term "patch" refers to a region of the original model which will correspond to a face of the base mesh.

Furthermore, for purposes of this disclosure, a "hybrid" mesh is a hierarchical mesh where at least one patch is represented at a level beyond the base mesh by a mesh formed from a regular refinement step followed by an irregular operation, and an "irregular" operation is one which involves changing the connectivity of a mesh without necessarily maintaining valence restrictions. Examples of irregular operations include without limitation removing one or more faces from a mesh, and adding new polygons to form an arbitrary submesh.

Figure 2A:
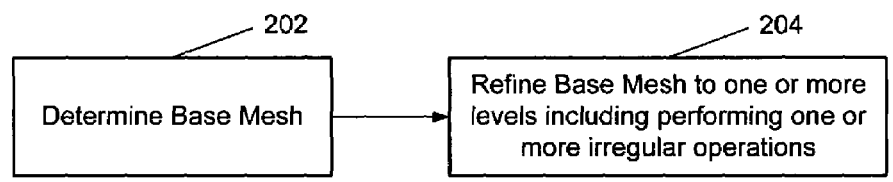
FIG. 2A is a simplified flowchart of an embodiment of a method a building a hybrid mesh representation according to the invention.
Figure 2B:
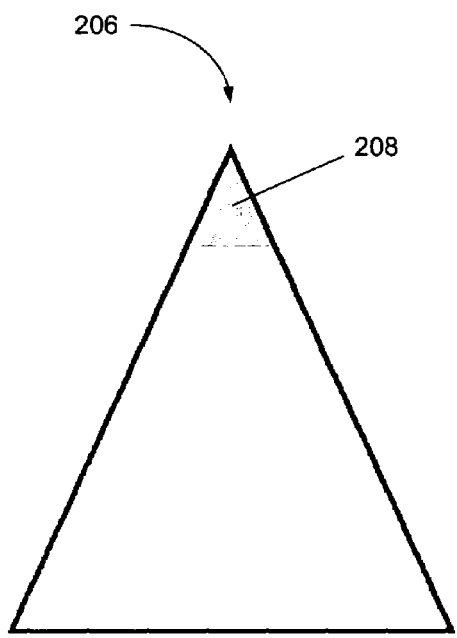
Figure 2C:
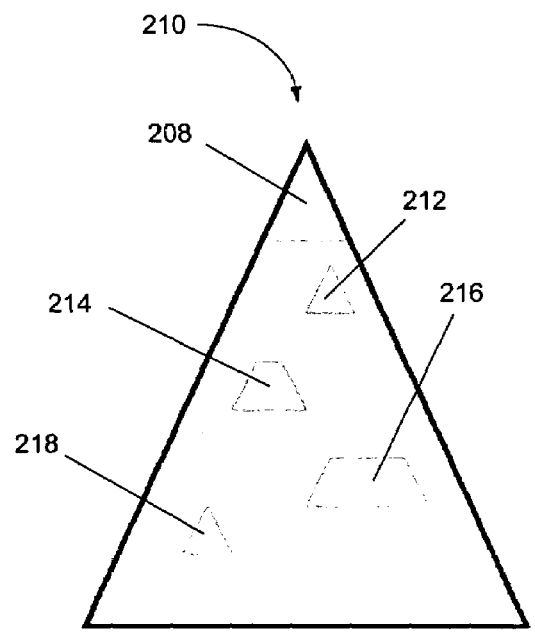
FIG. 2C is a pyramid depicting the possible dispersion of irregular mesh structures at any level of a mesh representation according to the invention.

A first aspect of the invention comprises a method of forming a hybrid mesh representation of an object surface. Referring to FIG. 2A, a flowchart of an embodiment of a method of forming a hybrid mesh representation of an object surface is illustrated. Referring to FIG. 2C, a hybrid mesh representation 210 is a hierarchical arrangement of mesh representations, with a base mesh 208 at the root of the hierarchy, and with higher level meshes extending from the root of the hierarchy, where the patches may be represented through meshes at higher levels of the hierarchy beyond the base mesh which are irregular. In the particular example illustrated in FIG. 2C, the higher level meshes representing patches which are irregular are identified with numerals 212, 214, 216, and 218. It is to be contrasted with regular and semi-regular representations, where all meshes representing patches at layers beyond the base mesh are regular. FIG. 2B illustrates a semi-regular mesh 206, where only the base mesh 208 is irregular, and all higher level meshes representing patches are regular.

Turning back to FIG. 2A, the method of forming the hybrid mesh representation begins with step 202, which comprises forming a base mesh for the object surface. The base mesh may span or substantially span the object surface, and may be produced manually, automatically, or any combination thereof. The base mesh may be regular or irregular. The base mesh may be such that patch edges are aligned in accordance with features on the object surface. The polygons forming the mesh may be any suitable polygon, such as but not limited to triangles, quads, or hexagons. Moreover, the base mesh may be parameterized, i.e., expressed in a parameter domain, for ease of data manipulation.

Figure 3:
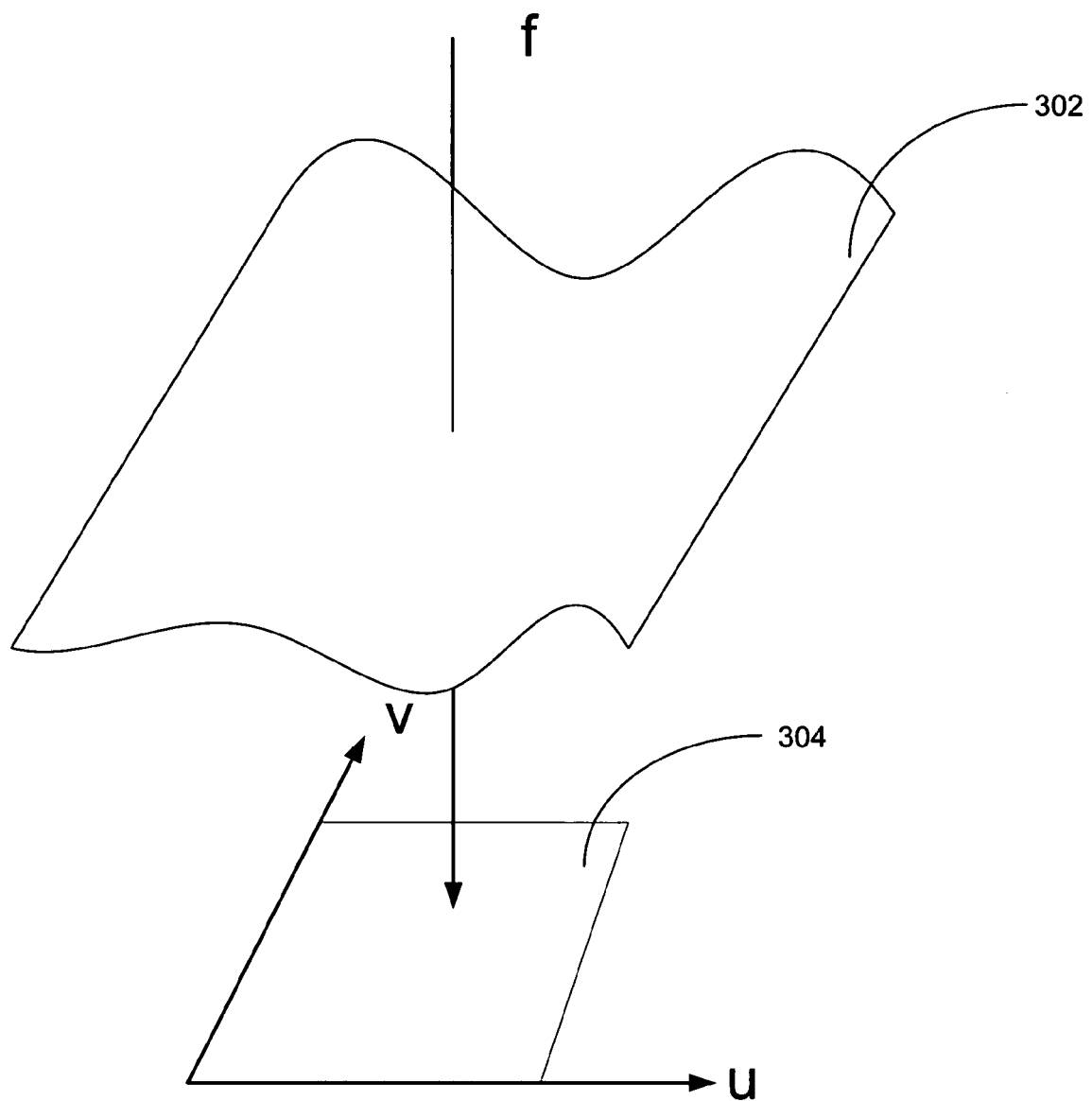
FIG. 3 depicts the parameterization of an object surface in the (u, v) domain.

Referring to FIG. 3, a portion of an object surface 302 is shown, which is represented as a series of points in the Cartesian coordinate (x, y, z) domain. Through parameterization, this portion of the object surface may be mapped into an arbitrary polygon 304 in the parameter (u, v) domain. The mapping between the object surface in the parameter domain and the object surface in the Cartesian coordinate domain is represented by the function f(u, v). Once the data manipulations have been completed, the manipulated data in the parameter domain may be transformed back into the Cartesian coordinate domain through the function f(u, v).

In one implementation, each polygon of a base mesh in (x, y, z) space is mapped into the unit square $[1, 0] \times [0, 1]$ in the (u, v) domain. In this implementation, a mapping function f is determined by minimizing a certain energy function subject to the boundary condition that the boundary of the polygon in (x, y, z) space map into the boundary of the unit square in the parameter domain. In one example, the energy function is that proposed in Floater, M. S., "Parameterization and Smooth Approximation of Surface Triangulations," Computer-Aided Geometric Design 14 (1997), pp. 231-250, which is hereby fully incorporated herein by reference as though set forth in full. In this example, the function f is such that each interior vertex $u_i$ in the parameter domain (where $u_i$ is a two-dimensional vector corresponding to the coordinates (u, v)) satisfies the following condition:

$$u_i = \sum_{k \in N(i)} a_{ik} u_k$$

where $\aleph(i)$ is the 1-ring neighborhood of the vertex i in the mesh in (x, y, z) space, and the weights $\alpha_{ik}$ are as defined in the Floater reference, cited above.

Referring back to FIG. 2A, the next step in the method is step 204, which comprises progressively refining the base mesh to one or more levels through, at each level, one or more regular operations, i.e., operations which involve subdividing the polygons while maintaining valence restrictions, one or more irregular operations, i.e., operations which involve changing the connectivity of a mesh without necessarily maintaining valence restrictions, or any combination thereof, provided that at least one irregular operation is performed for at least one of the levels. The result is a hierarchical arrangement of mesh representations, such as that illustrated in FIG. 2C, which constitutes a hybrid mesh.

In the most general case, this step can be represented as follows, where M stands for a regular mesh, N stands for an irregular mesh, the superscript indicates the level of the mesh, with the superscript of 0 referring to the base mesh and the superscript n referring to the highest level mesh in the hierarchy, with the right arrow →:indicating a regular refinement step, and with the double right arrow ⇒indicating one or more irregular operations:

$$M^0 \Rightarrow N^0 \to M^1 \Rightarrow N^1 \to M^2 \Rightarrow N^2 \ldots M^n \Rightarrow N^n$$

It is possible for there to be no regular refinement operations, in which case $M_j = N^{j-1}$. It is also possible for there to be only one irregular operation on a particular level. In this case, on all the levels j where no irregular operations occur, the condition $N^j = M^j$ holds.

Figure 4A:
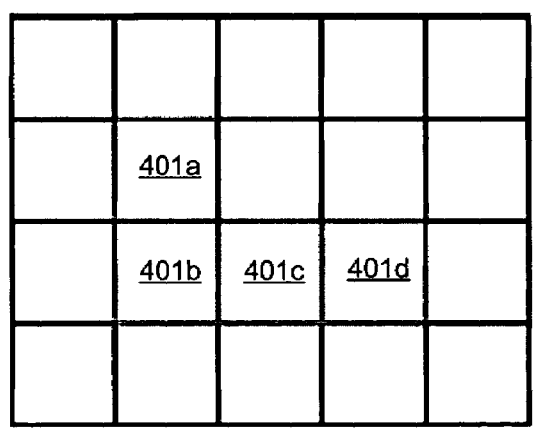
FIGS. 4A-4B illustrate an example of an irregular operation which comprises cutting a hole or gap in a mesh.
Figure 4B:
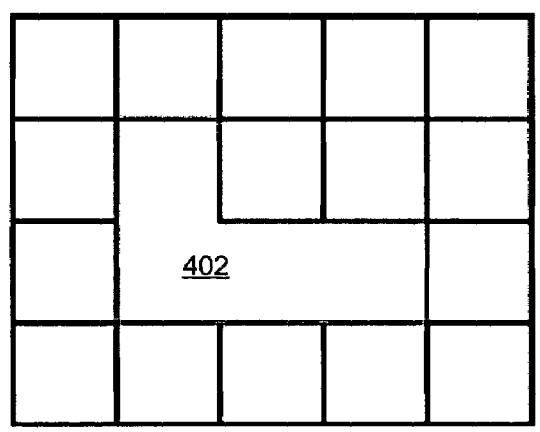
Figures 5A, 5B:
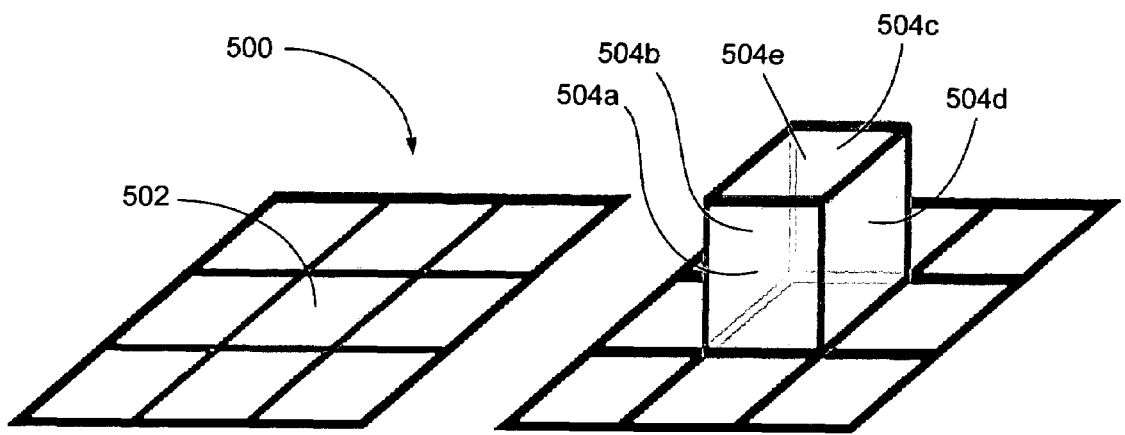
FIGS. 5A-5B illustrate an example of an irregular operation which comprises adding a cube or other volume to a mesh.
Figures 6A, 6B:
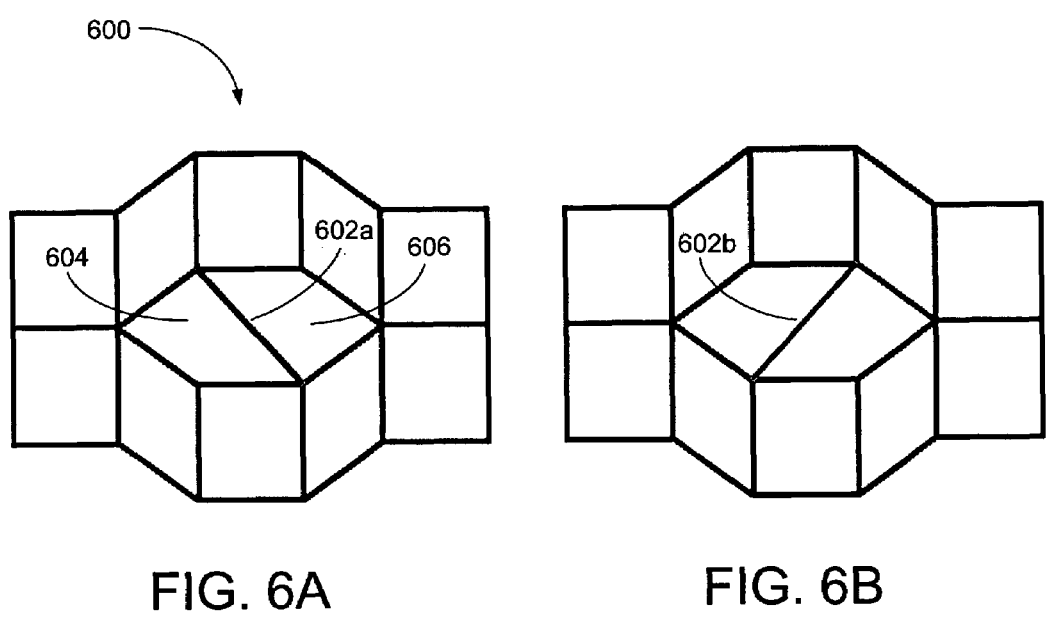
FIGS. 6A-6B illustrate an example of an irregular operation which comprises flipping the edge of a polygon in a mesh.
Figures 7A, 7B:
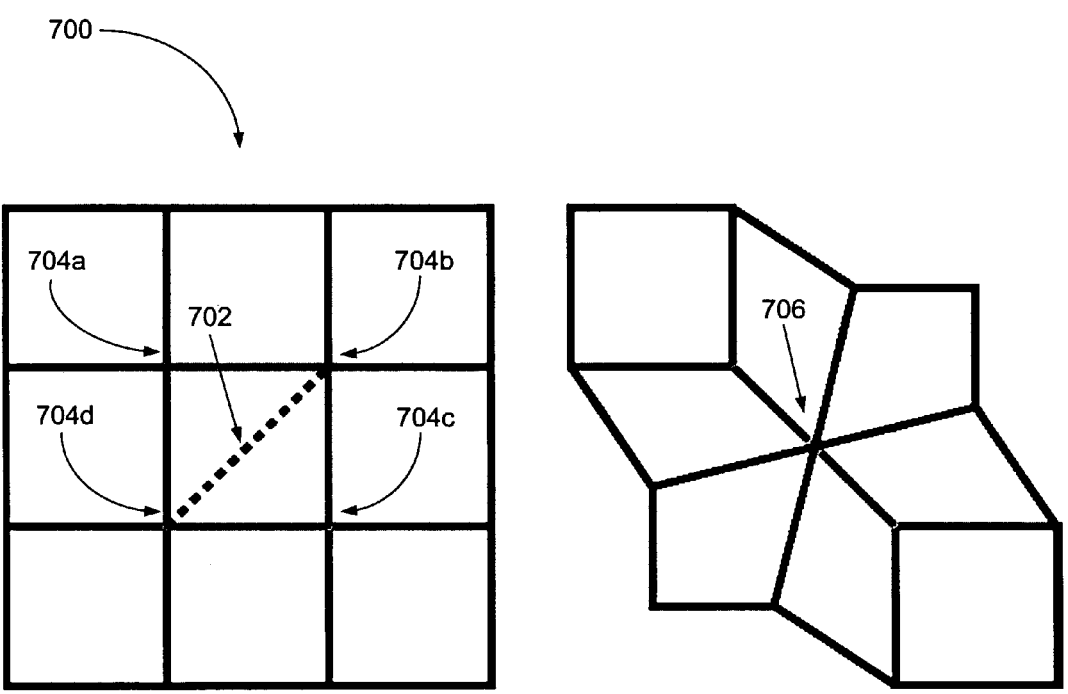
FIGS. 7A-7B illustrate an example of an irregular operation which comprises collapsing the diagonal of a polygon in a mesh.

Examples of irregular operations which are possible include removing polygons, adding polygons to avoid overstretching of existing polygons, flipping polygon edges, collapsing a polygon diagonal; and connecting polygons. These examples are illustrated in FIGS. 4A-4B (removing polygons); FIGS. 5A-5B (adding polygons); FIGS. 6A-6B (flipping polygon edges); FIGS. 7A-7B (collapsing polygon diagonals); and FIGS. 8A-8B (connecting polygons).

Additional examples include the use of irregular operations for feature alignment (illustrated in FIGS. 15A-15G in the context of David's eye), dealing with stretching (illustrated in FIGS. 10A-10H in the context of a rabbit ear), introducing topology (such as the tunnels illustrated in FIGS. 13A-13H, 14A-14H in the context of the Stanford Buddha), and cube-building (illustrated in FIGS. 11A-11F, 12A-12E, in the context of a Feline model).

In the particular examples illustrated in these figures, the polygons are quads, but it should be appreciated that other examples are possible, so these particular examples should not be taken as limiting.

Referring to FIG. 4A, a regular mesh 400 is illustrated. FIG. 4B illustrates the same mesh after an irregular operation has been performed, removing polygons 401a, 401b, 401c, and 401d. The result is a hole or gap 402 cut into the mesh. Referring to FIG. 5A, a regular mesh 500 is illustrated. FIG. 5B illustrates the same mesh after an irregular operation has been performed, adding polygons 504a, 504b, 504c, 504d, and 504e (in the shape of a cube) (and substituting them for polygon 502).

Referring to FIG. 6A, a mesh 600 is illustrated in which edge 602a separates polygons 604 and 606. Referring to FIG. 6B, the same mesh is illustrated after an irregular operation has been performed, flipping edge 602a so that it becomes edge 602b.

Referring to FIG. 7A, a mesh 700 is illustrated in which a non-edge diagonal of a polygon is identified with numeral 702, and the four vertices of the polygon are identified with numerals 704a, 704b, 704c, 704d. Referring to FIG. 7B, the same mesh is illustrated after an irregular operation has been performed, collapsing diagonal 702, resulting in the four vertices 704a, 704b, 704c and 704d collapsing into a single point, identified with numeral 706 in FIG. 7B.

Figures 8A, 8B:
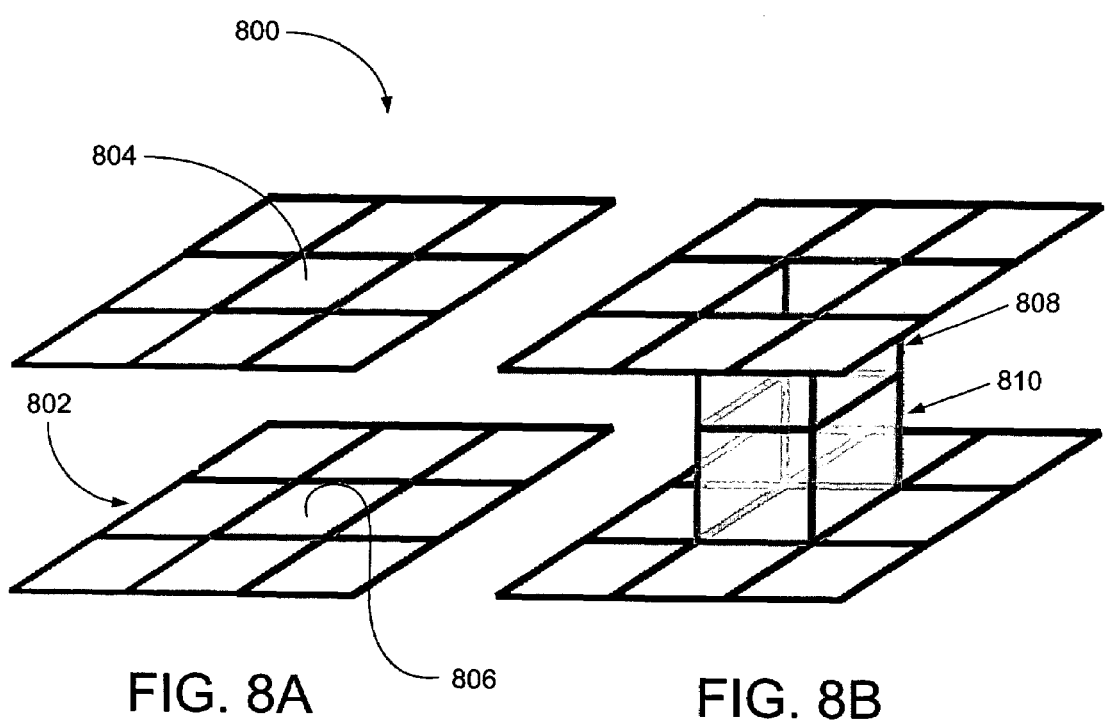
FIGS. 8A-8B illustrate an example of an irregular operation which comprises connecting two meshes with a cylinder or other volume.

Referring to FIG. 8A, two parallel meshes are identified with numerals 800 and 802. FIG. 8B illustrates the same two meshes after an irregular operation has been performed connecting the two meshes by adding cubes 808 and 810 (and removing polygons 804 and 806 identified in FIG. 8A).

Several examples of the foregoing method will now be illustrated and described. Again, in each of the examples the polygons used were quads. However, other examples and polygons are possible, so these particular examples should not be taken as limiting. Referring to FIGS. 9A-9H, an example of the process of building a hybrid mesh representation of an object surface, which in this case is a bust of Max Plank, is illustrated. In this example, a combination of automatic and manual steps are employed to perform the process, with the manual steps being performed by a user, and the automatic steps being performed by a processor-based system.

Figure 9A:
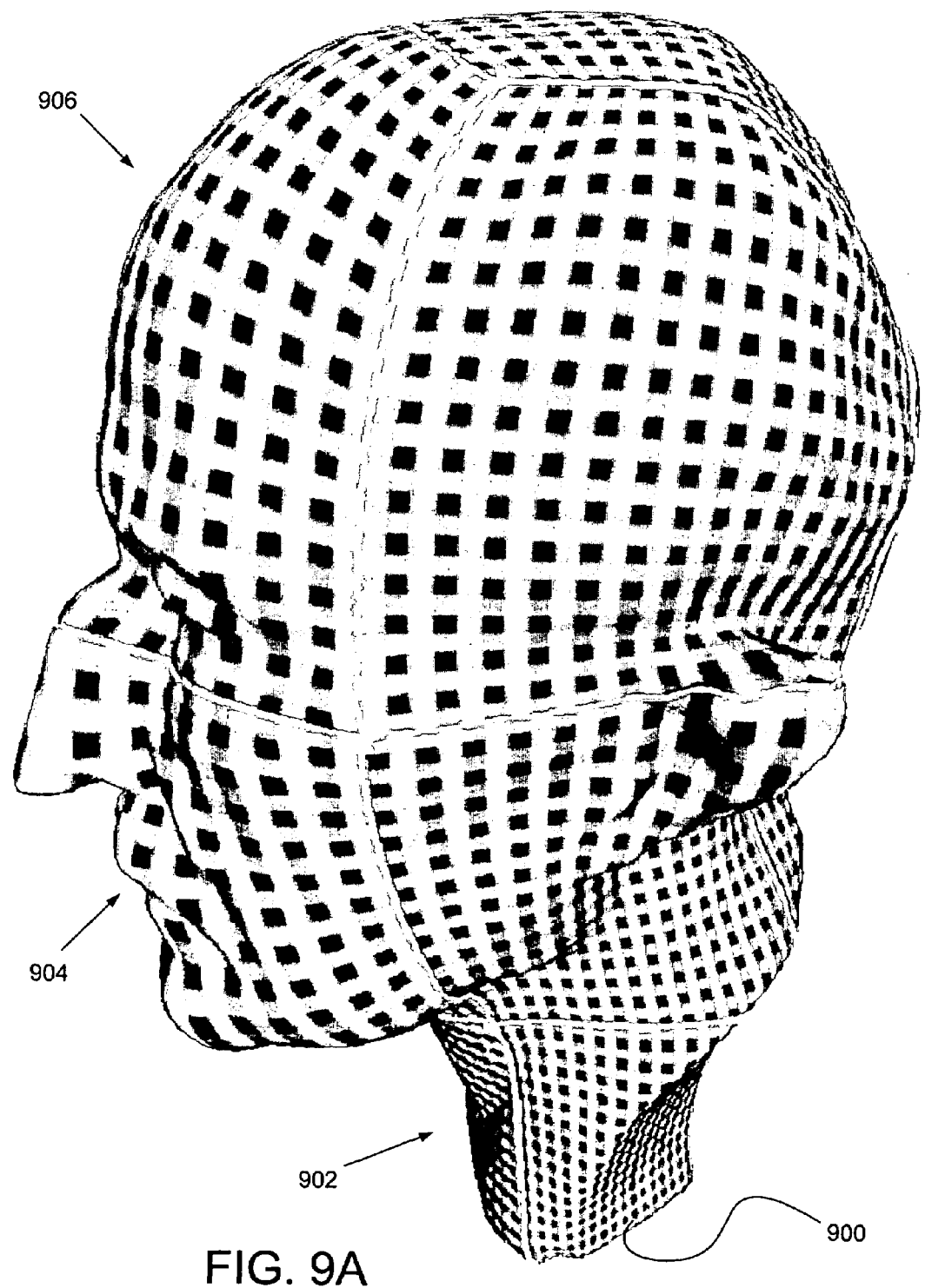
FIGS. 9A-9H illustrate one embodiment of the process of building a hybrid mesh representation of the head of Max Plank.

FIG. 9A illustrates the base mesh $M^0$ formed after a user selects four points on the neck boundary 900, and a system automatically adds three cubes on top of the quad formed by these four points, moves the vertices of the cubes so they are on the object surface, traces and smoothes the boundaries between the polygons, and then parameterizes the base polygons. In FIG. 9A, the portion of the base mesh which results from the first cube is identified with numeral 902; the portion of the base mesh which results from the second cube is identified with numeral 904; and the portion of the base mesh which results from the third cube is identified with numeral 906.

Figure 9B:
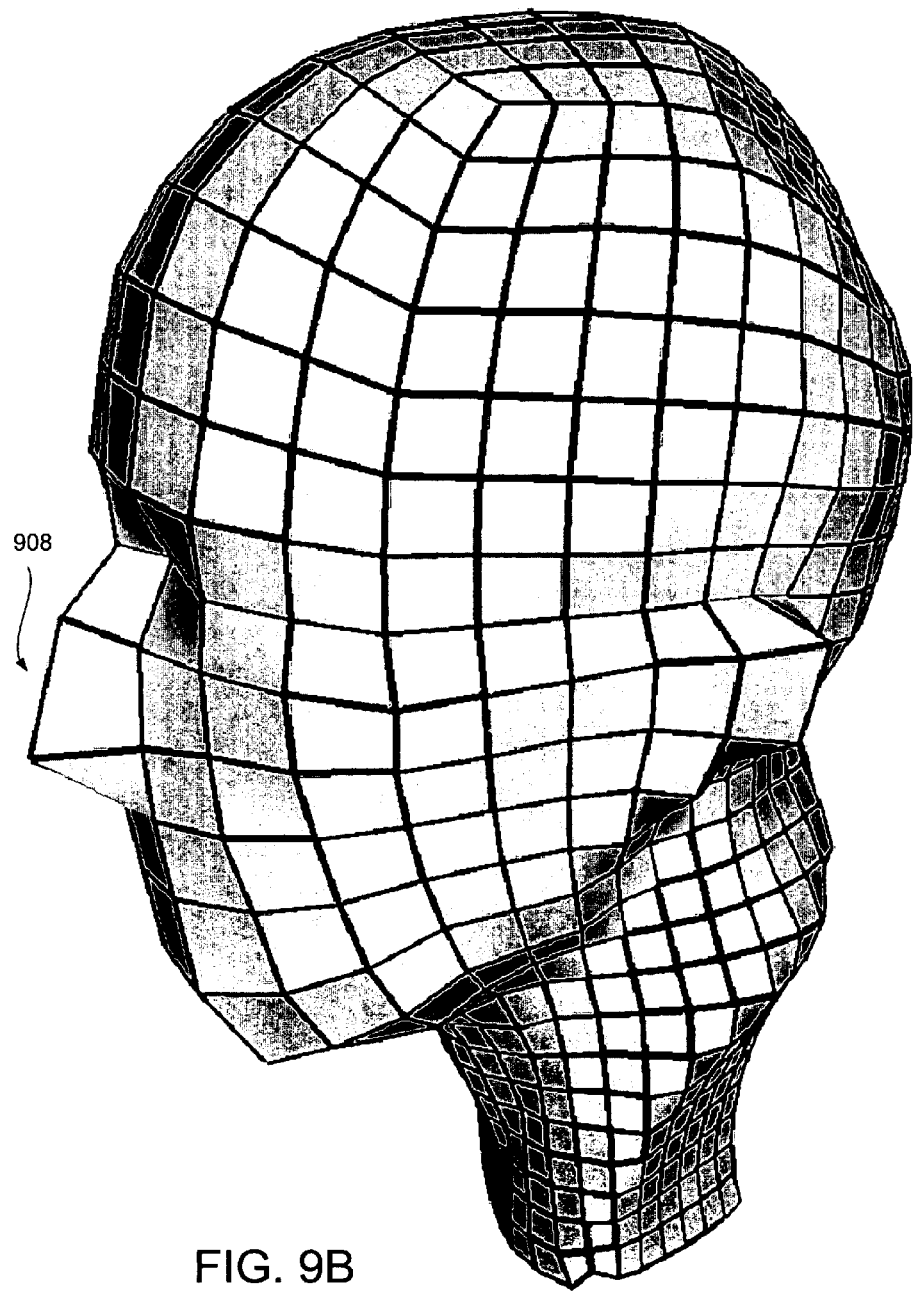
Figure 9C:
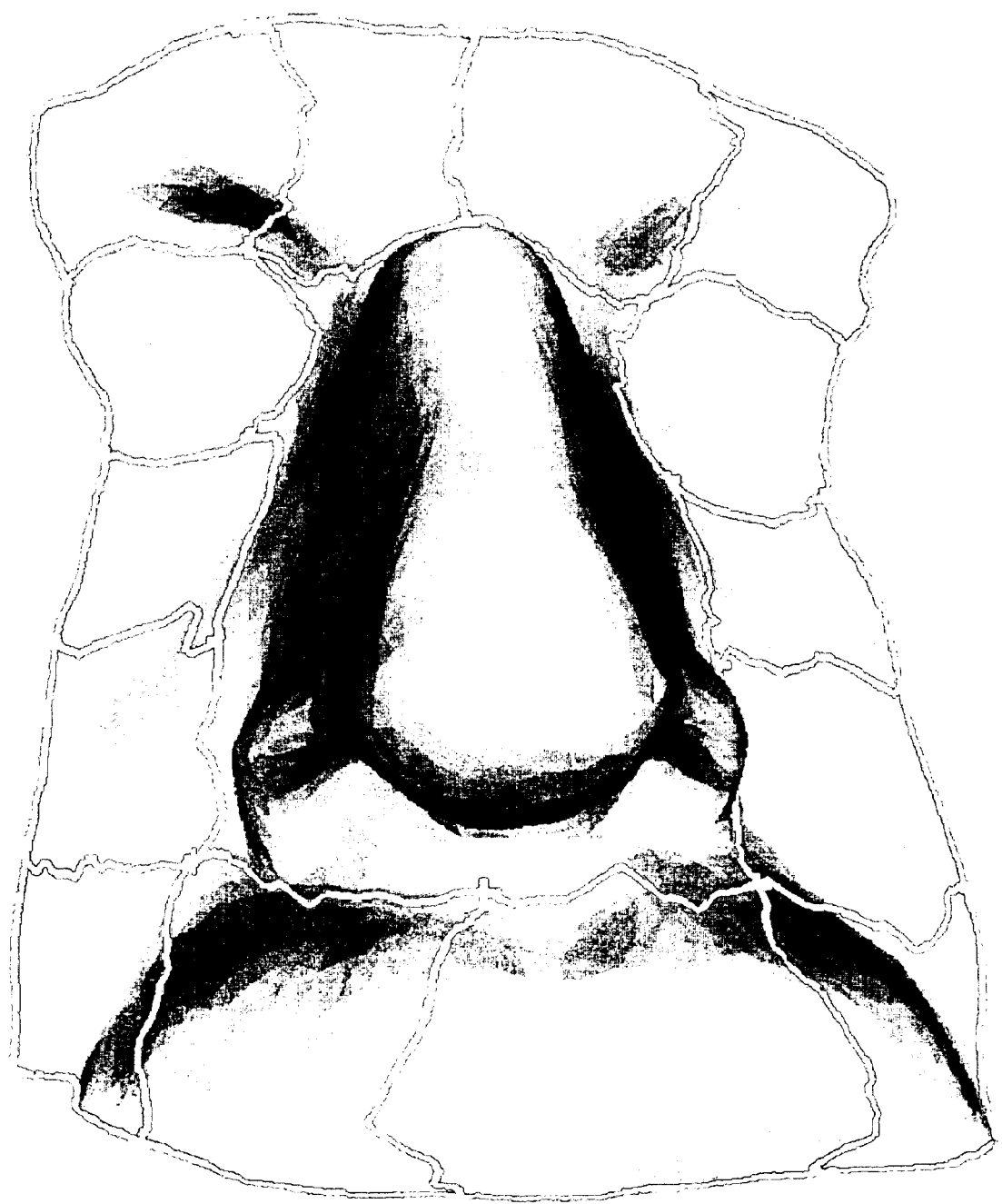

The system then subjects the base mesh $M^0$ to three levels of regular refinement. The result is $M^3$, which is illustrated in FIG. 9B. The system also computes a stretch parameter $\sigma_q$ for each quad q defined as the ratio of $A_q$, the area of the original object surface covered by the quad, and $P_q$, the area of the quad in the parameter domain. The system then identifies, through shading, coloring or the like, those quads which correspond to a high stretch parameter. FIG. 9F illustrates an example where the stretch parameter for a quad is identified by its color. In particular, quads which are colored red (identified in the figure with the label "R") are quads with a high stretch parameter. Quads which are colored orange (identified in the figure with the label "O") are quads with a medium-to-high stretch parameter. Quads which are colored yellow (identified in the figure with the label "Y") are quads with a medium stretch parameter. Quads which are colored green (identified in the figure with the label "G") are quads with a medium-to-low stretch parameter. Quads which are colored blue (identified in the figure with the label "B") are quads with a low stretch parameter. In FIG. 9B, the quads in $M^3$ which are determined to have a high stretch ratio are those which are associated with the nose area 908.

Referring to FIG. 9B, the user then selects the 2×3 quad region 908 surrounding the nose for an irregular operation. The systems expands this region by one layer of quads (resulting in a 4×5 quad region) in order to ensure a smooth parametric transition. The system then cuts the selected 4×5 region from the original mesh $M^3$, removes the 2×3 interior, and presents it to the user. The result is illustrated in FIG. 9C.

Figure 9D:
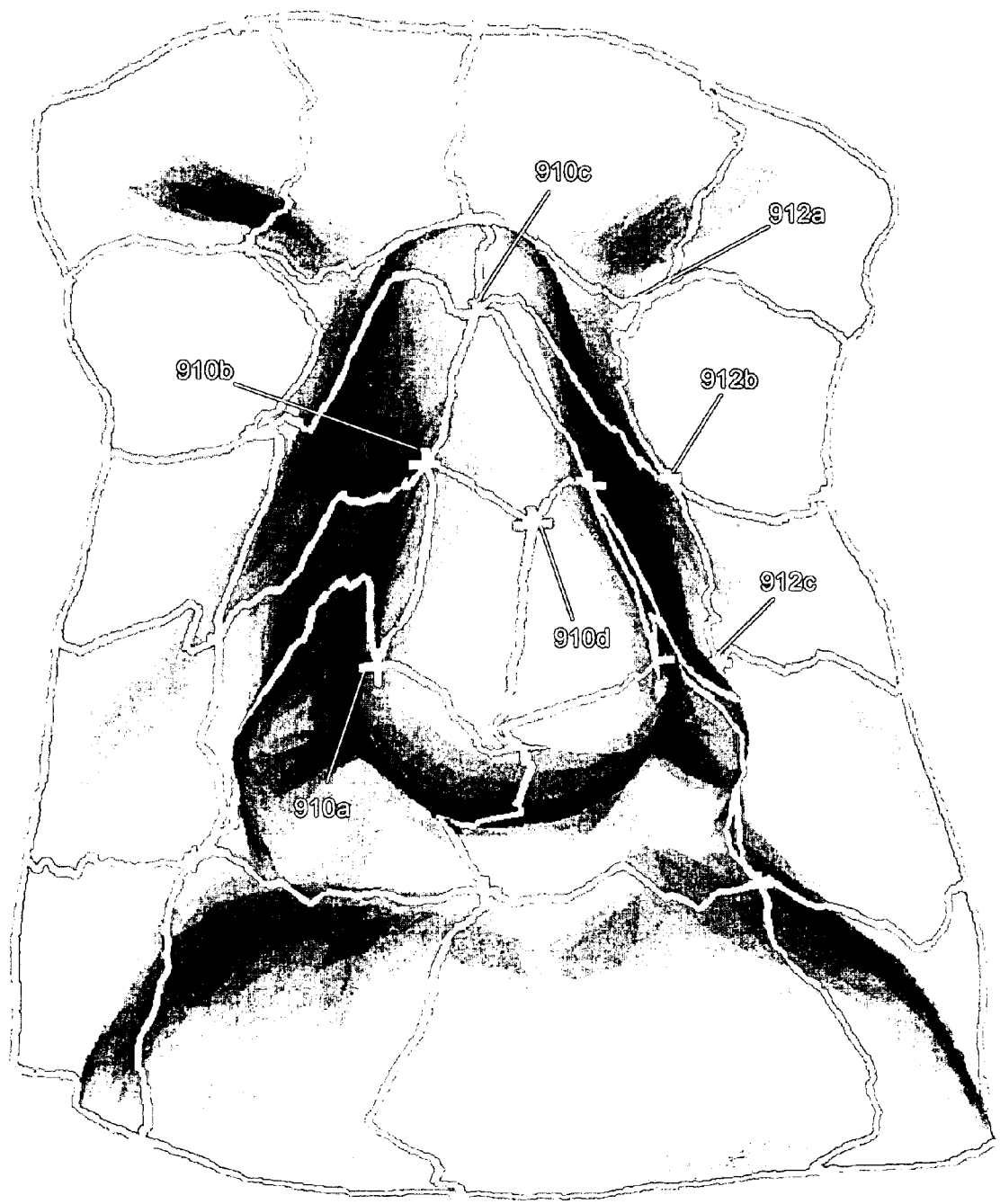

Referring to FIG. 9D, the user then selects and positions control points 910$a$, 910$b$, 910$c$ in the interior 2×3 region, and the system responds by connecting the control points together and with the existing polygon vertices 912$a$, 912$b$, 912$c$. This ensures that the resulting mesh connects to the original mesh $M^3$.

Figure 9E:
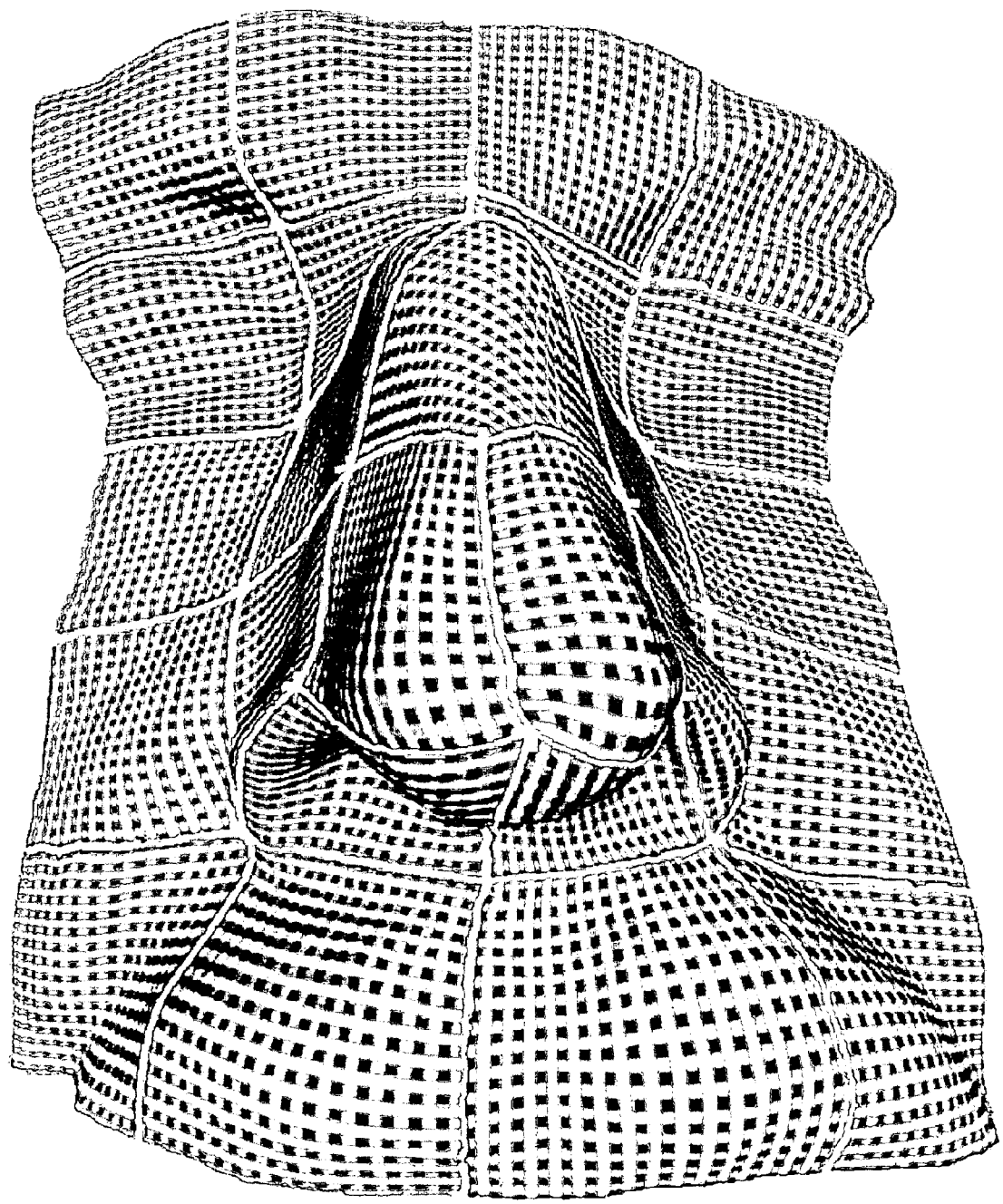
Figure 9F:
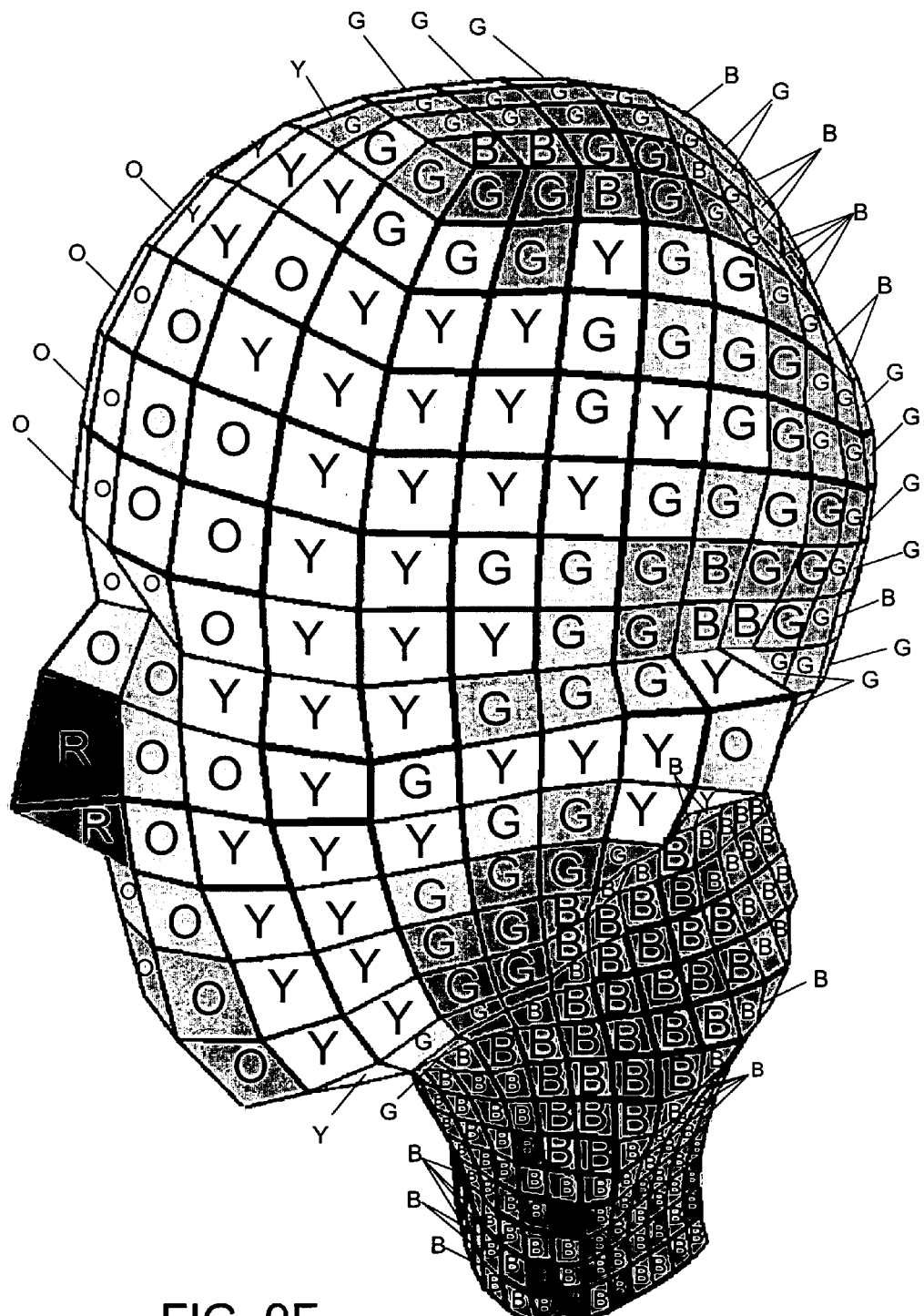

The system then smoothes the edges between the polygons, and determines a parameterization of the same. The result is illustrated in FIG. 9E. The system also substitutes the resulting interior 2×3 region for the original 2×3 interior region in $M^3$. The result is $N^3$. The system also recomputes the stretch parameters for the quads of $N^3$, allowing the user to confirm that the undue stretching of the polygons around the nose region has been alleviated.

Figure 9G:
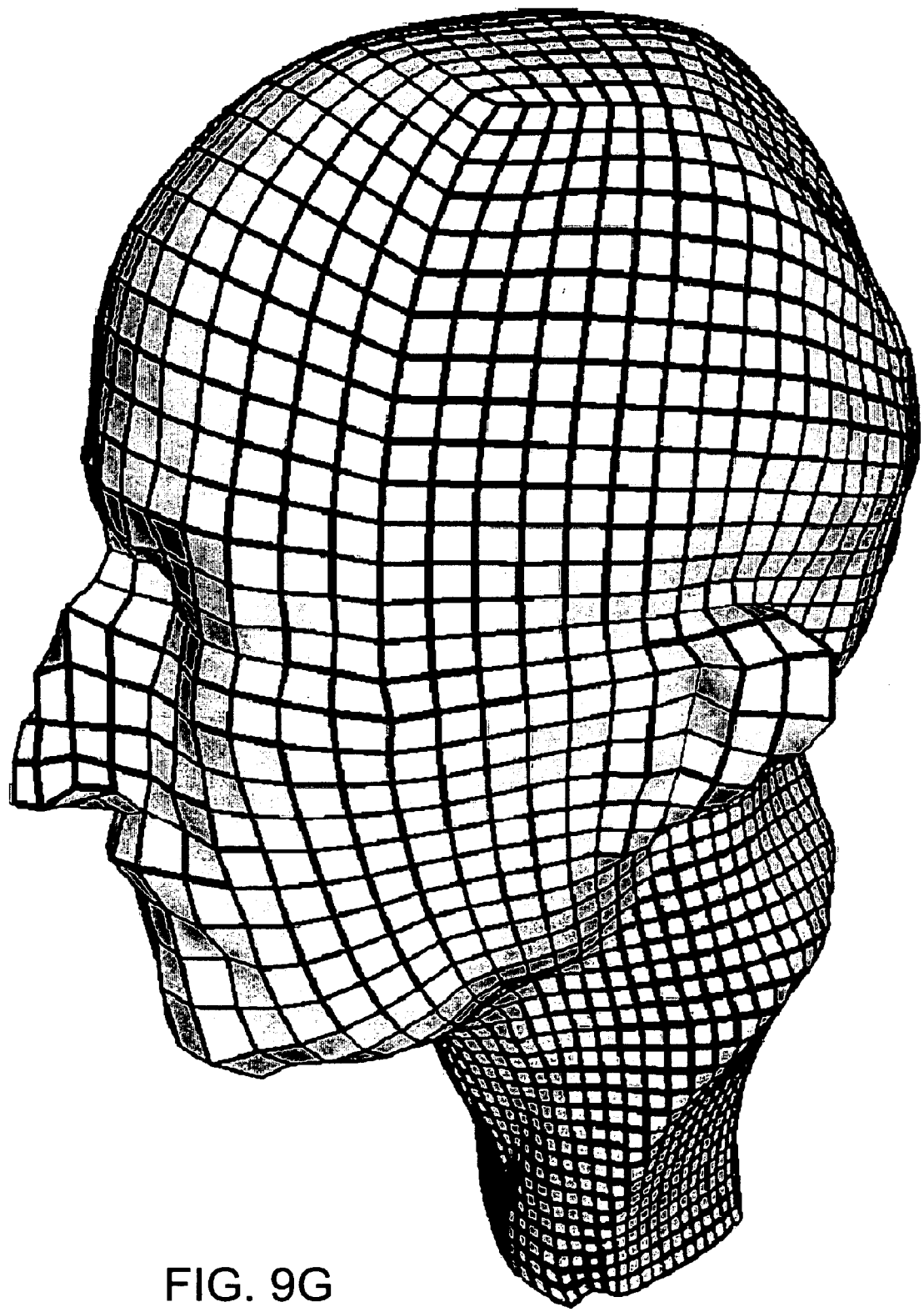
Figure 9H:
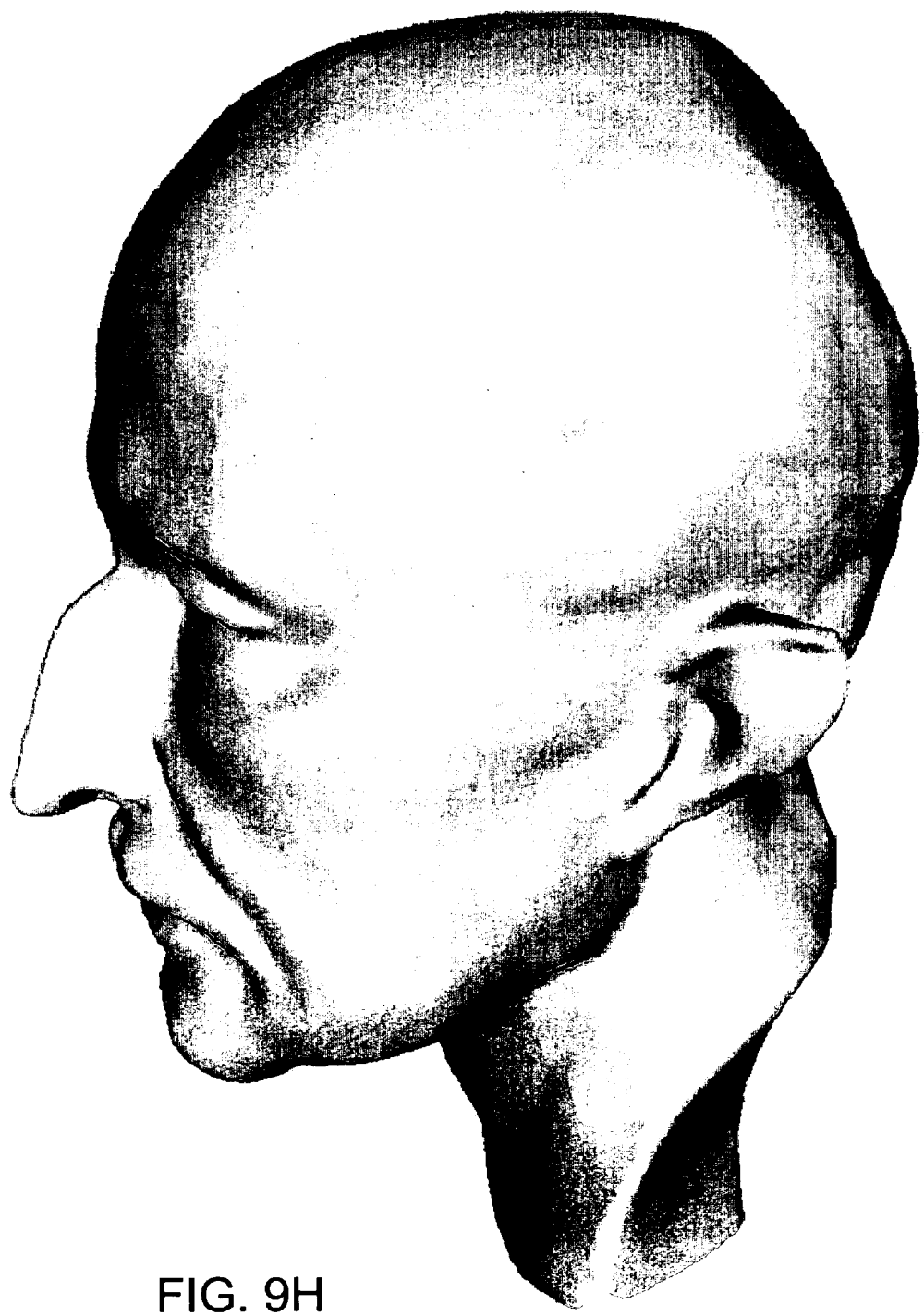

The system then undertakes another regular refinement step. The result is $M^4$, which is illustrated in FIG. 9G. Five additional adaptive refinement steps, i.e., regular refinement steps where faces which are already sufficiently flat are not subdivided, are then performed, resulting in $M^9$, illustrated in FIG. 9H. The mesh $M^9$ deviates from the original object surface by no more than 0.01%.

In the foregoing example, a semi-automatic method of dealing with stretching is described, but it should be appreciated that fully automatic techniques are possible in which the system computes a stretch parameter for some or all of the polygons in a mesh representation, compares this parameter with a user specified threshold, and identifies or selects those regions which violate the threshold. Then an automatic layout method (such as but not limited to cube building) may be invoked to generate the layout for the submesh.

Figure 10A:
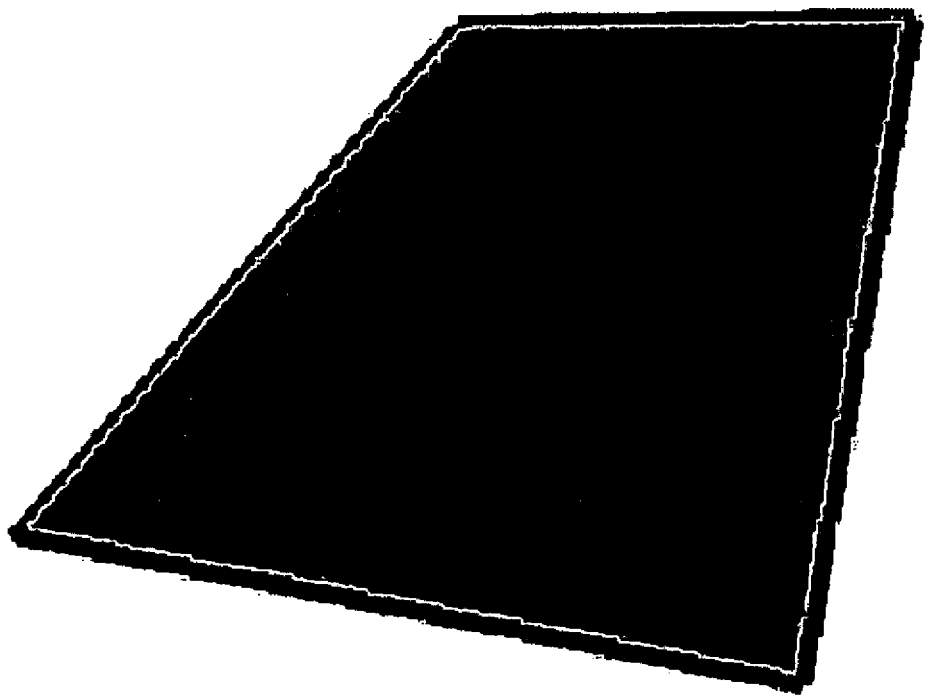
FIGS. 10A-10H illustrate one embodiment of the process of building a hybrid mesh representation of a rabbit head (excepting the left ear thereof, which is represented through a traditional semi-regular mesh representation).
Figure 10B:
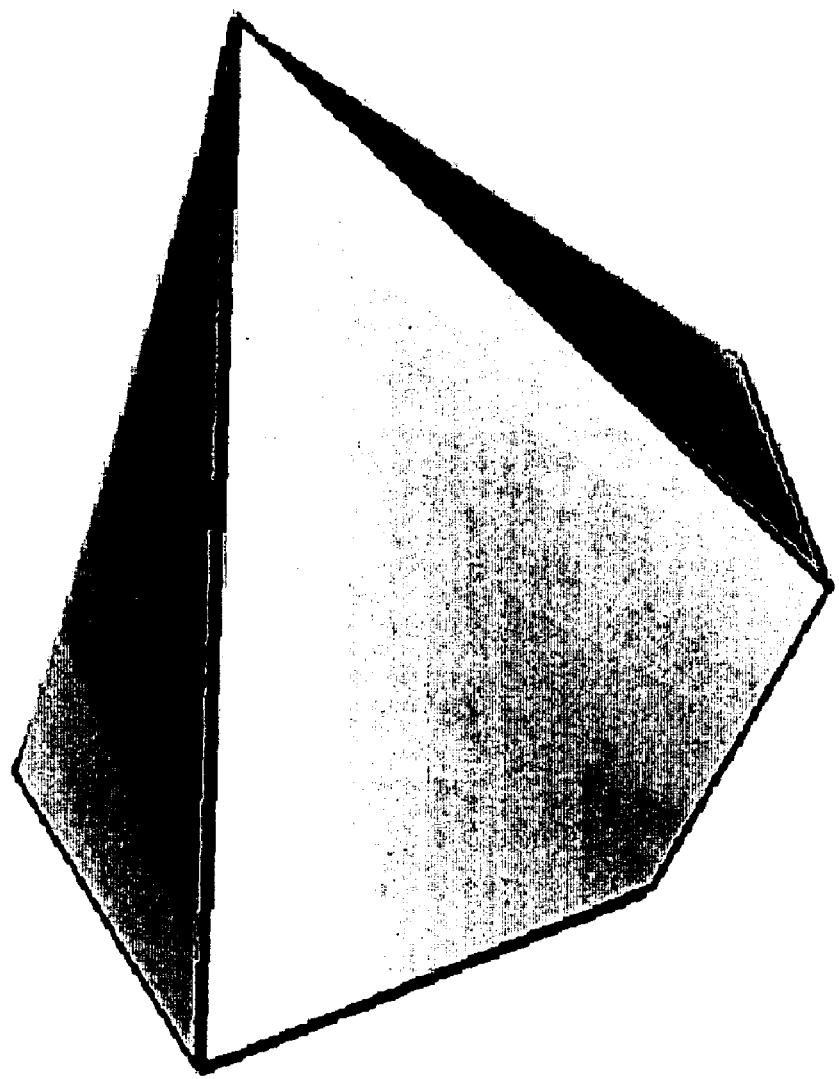
Figure 10C:
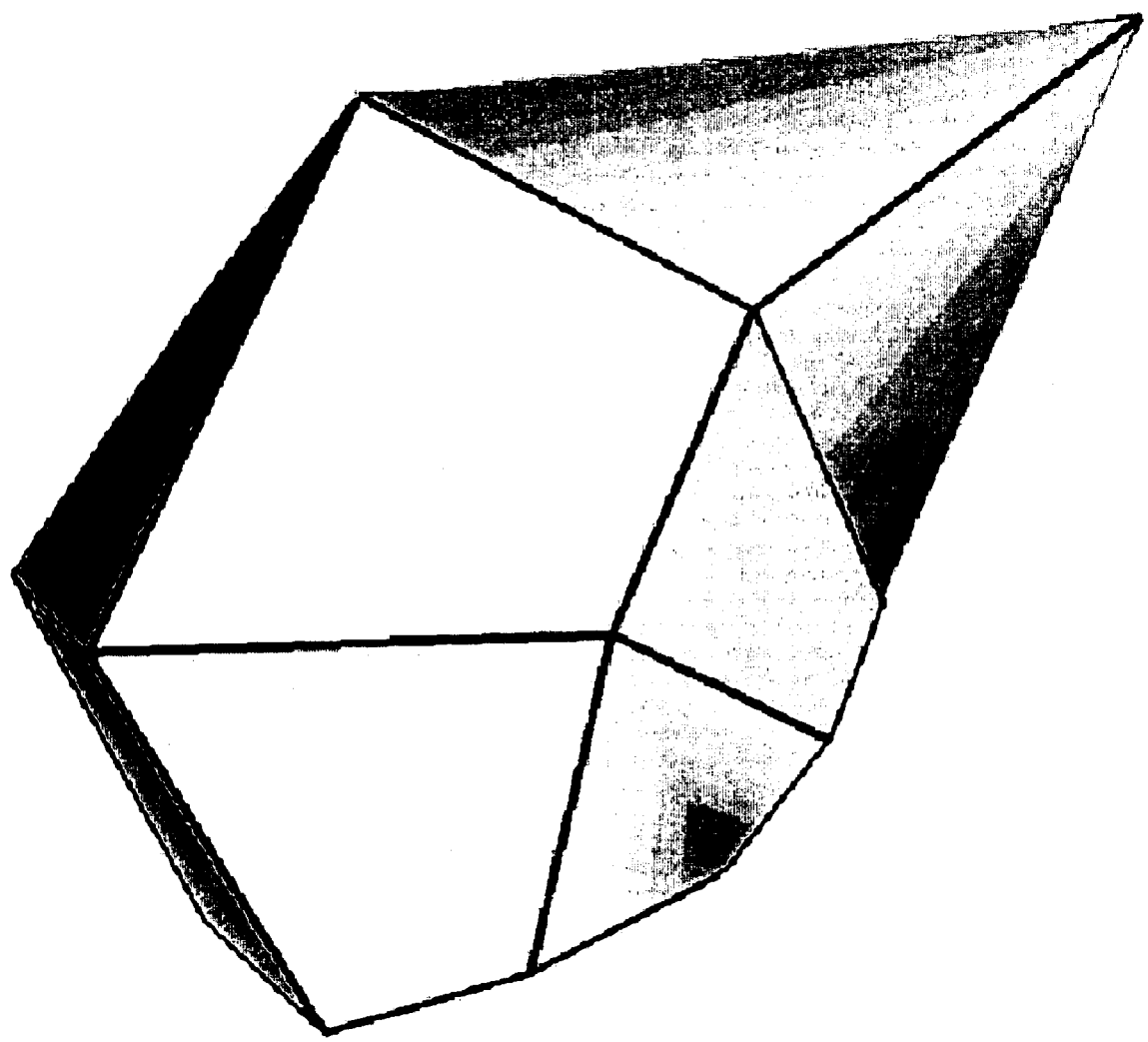
Figure 10D:
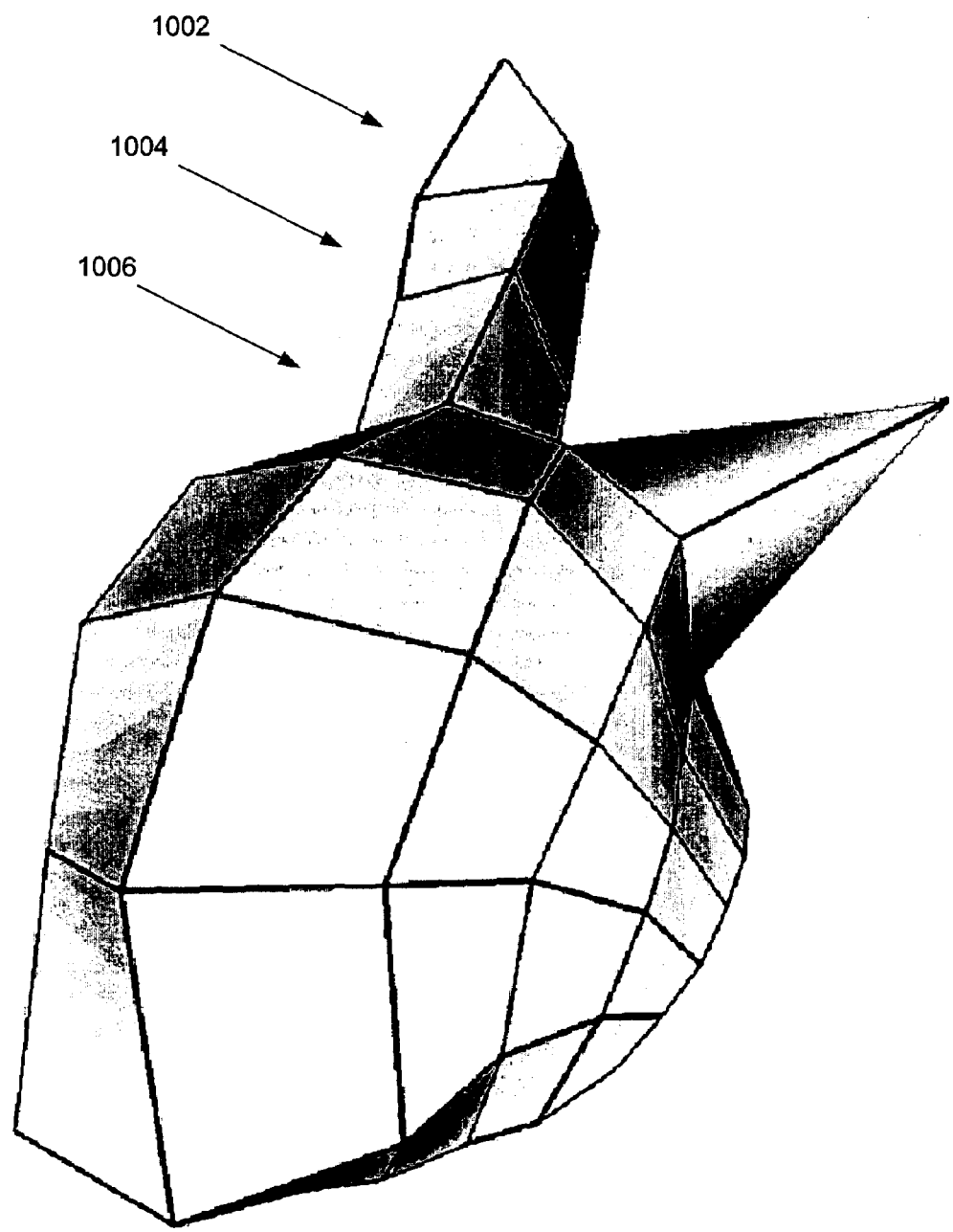

Referring to FIGS. 10A-10H, the process of building a mesh representation of an object surface, in this case a rabbit head, is illustrated. In FIG. 10A, a base mesh consisting of a single quad is defined. The quad then undergoes three regular refinement steps. The mesh after the first refinement step is illustrated in FIG. 10B, and the mesh after the second refinement step is illustrated in FIG. 10C. FIG. 10D illustrates the mesh after the third refinement step and after three cubes, identified with numerals 1002, 1004, and 1006, are added to provide extra skin for the right ear.

Figure 10E:
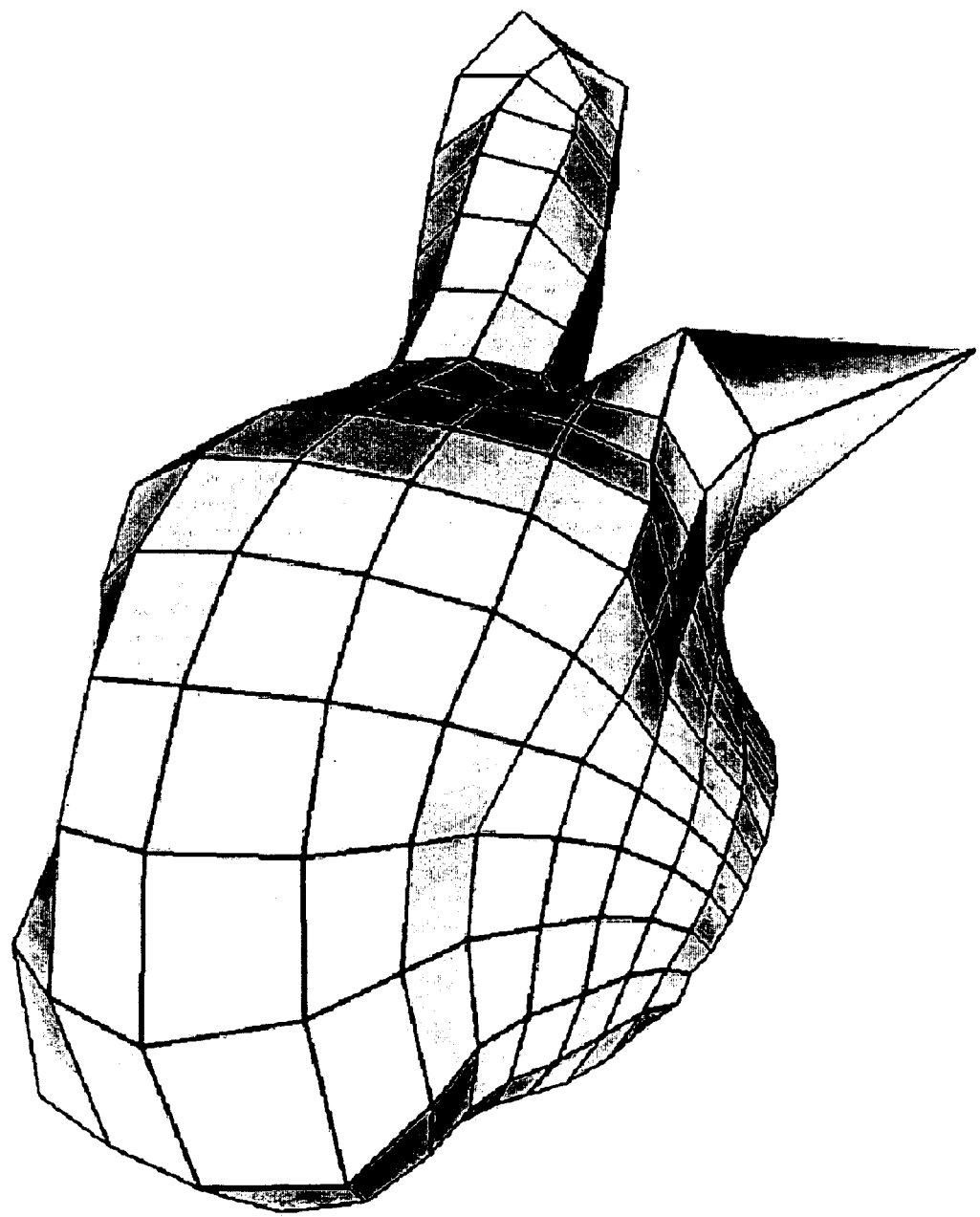
Figure 10F:
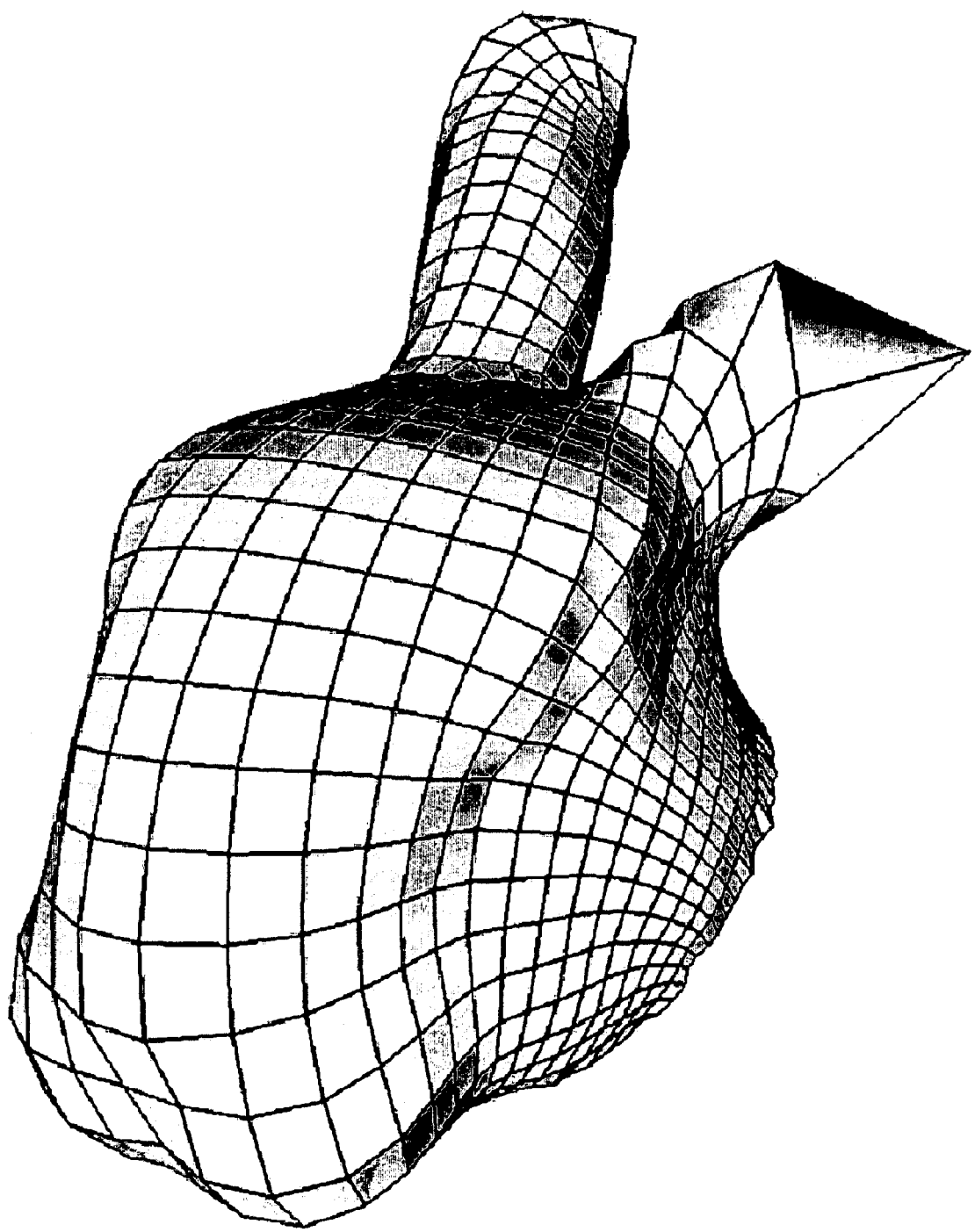
Figure 10G:
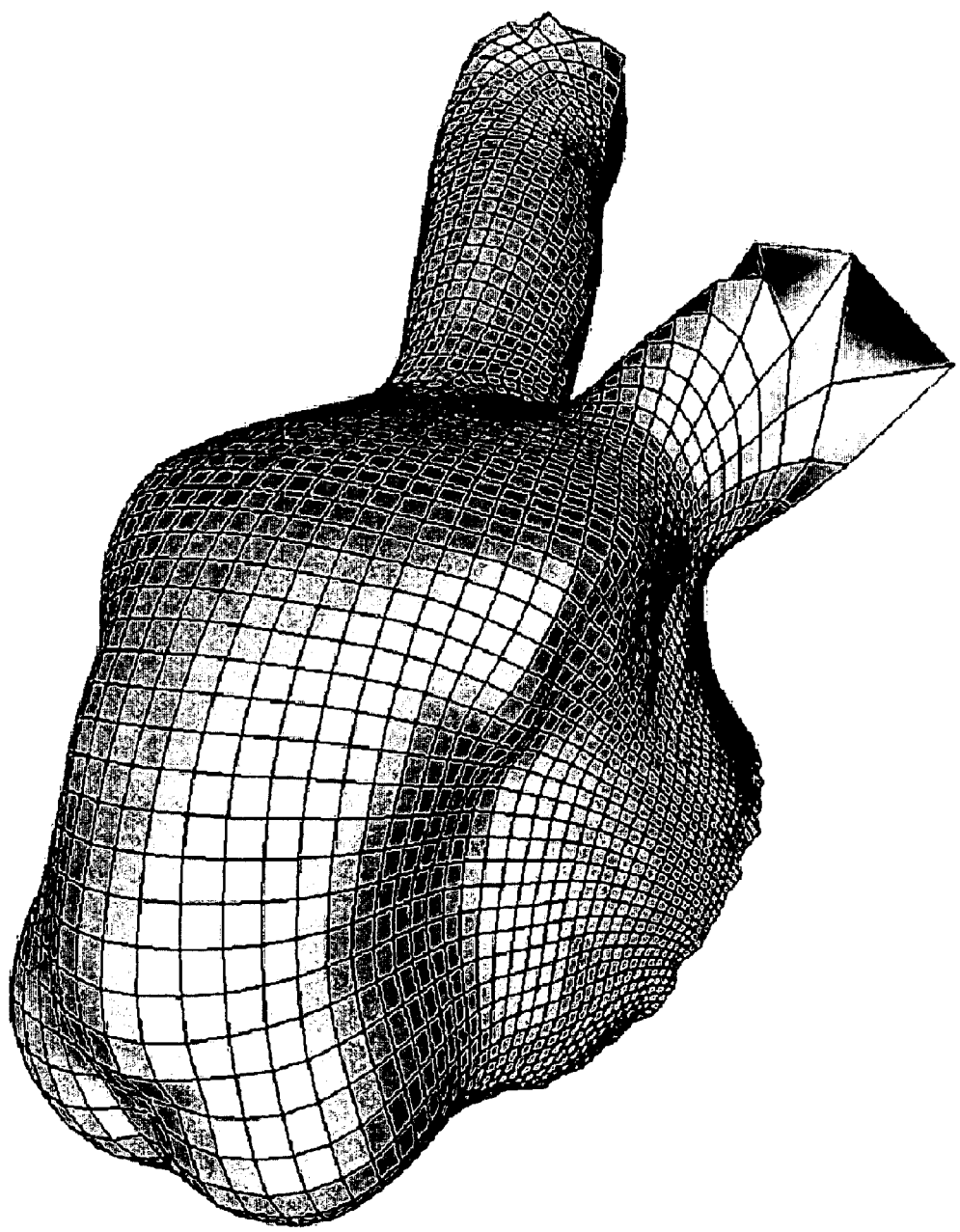
Figure 10H:
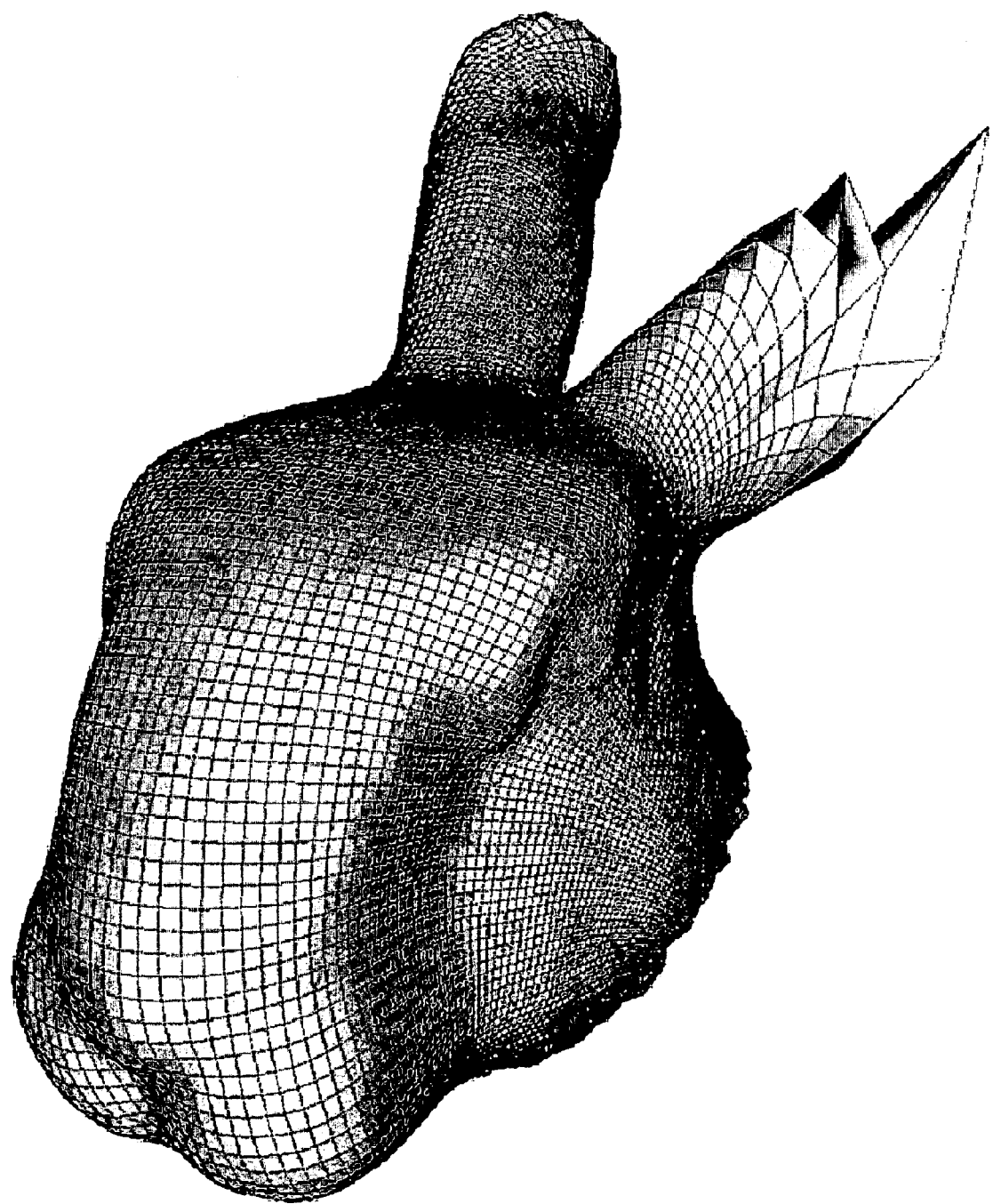

The mesh then undergoes four additional regular refinement operations. The mesh after the fourth refinement step is illustrated in FIG. 10E; the mesh after the fifth refinement step is illustrated in FIG. 10F; the mesh after the sixth refinement step is illustrated in FIG. 10G; and the mesh after the seventh refinement step is illustrated in FIG. 10H.

As illustrated, throughout these refinement operations, the quads making up the right ear (which is represented through a hybrid mesh) continue to exhibit a good aspect ratio, while the quads making up the left ear (which is represented through a semi-regular mesh) suffer from severe stretching, and poor aspect ratios. Even after seven refinement steps, as illustrated in FIG. 10H, large portions of the original object surface comprising the left ear are still not represented in the mesh. (see also FIG. 1E).

Referring to FIGS. 11A-11F, the steps involved in the process of building a hybrid mesh for a Feline model is illustrated. To build the base mesh $M^0$, illustrated in FIG. 11A, an automatic cube building algorithm is employed (discussed farther on in relation to FIGS. 18A-18C—rabbit ear example). As illustrated, a four cube base mesh is built comprising the four cubes identified with numerals 1110$a$, 1100$b$, 1100$c$, and 1100$d$.

Figure 1A:
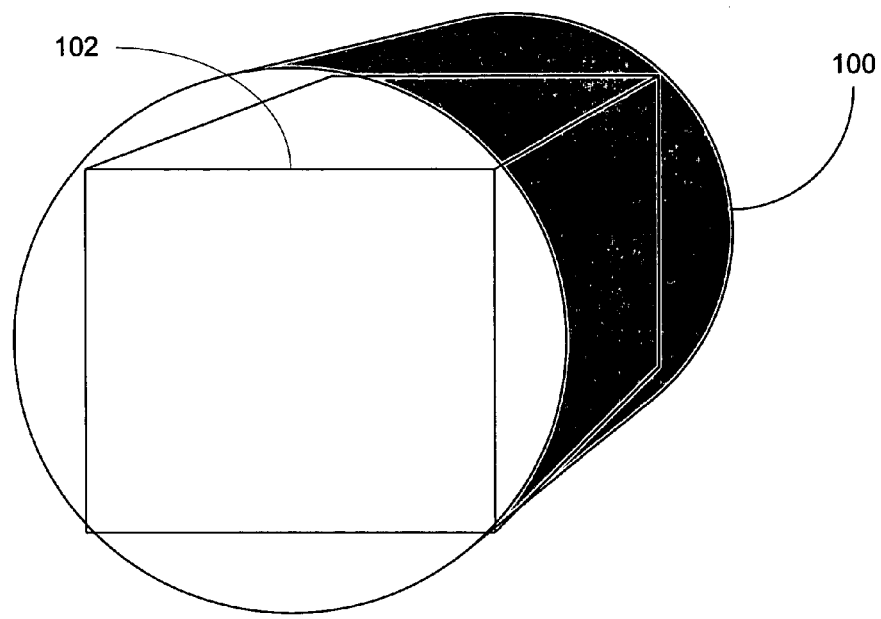
FIG. 1A illustrates a base domain representation of an object surface.
Figure 1B:
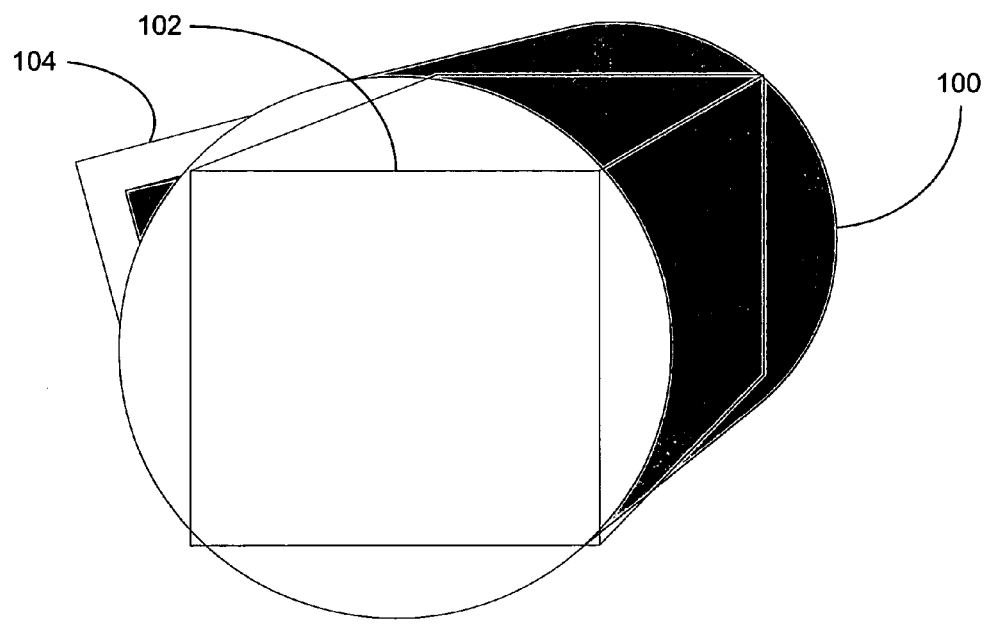
FIG. 1B illustrates the addition of a detailed feature to the object surface of FIG. 1B.
Figure 1C:
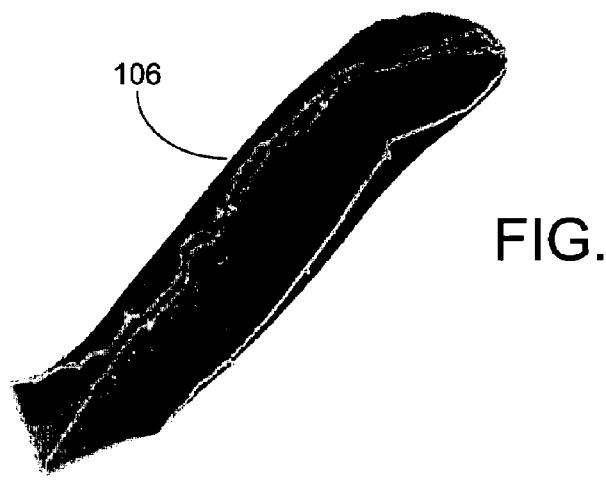
FIG. 1C illustrates an object surface.
Figure 1D:
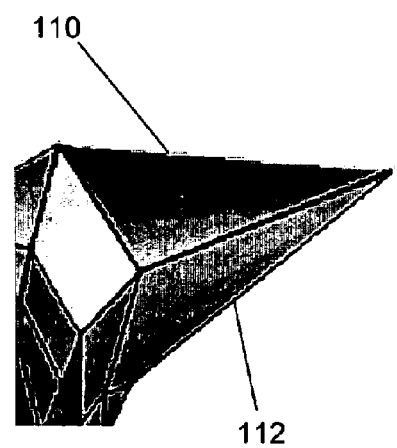
FIG. 1D illustrates a traditional semi-regular mesh representation of the object surface of FIG. 1C in which the polygons thereof have high aspect ratios or stretch parameters.
Figure 11A:
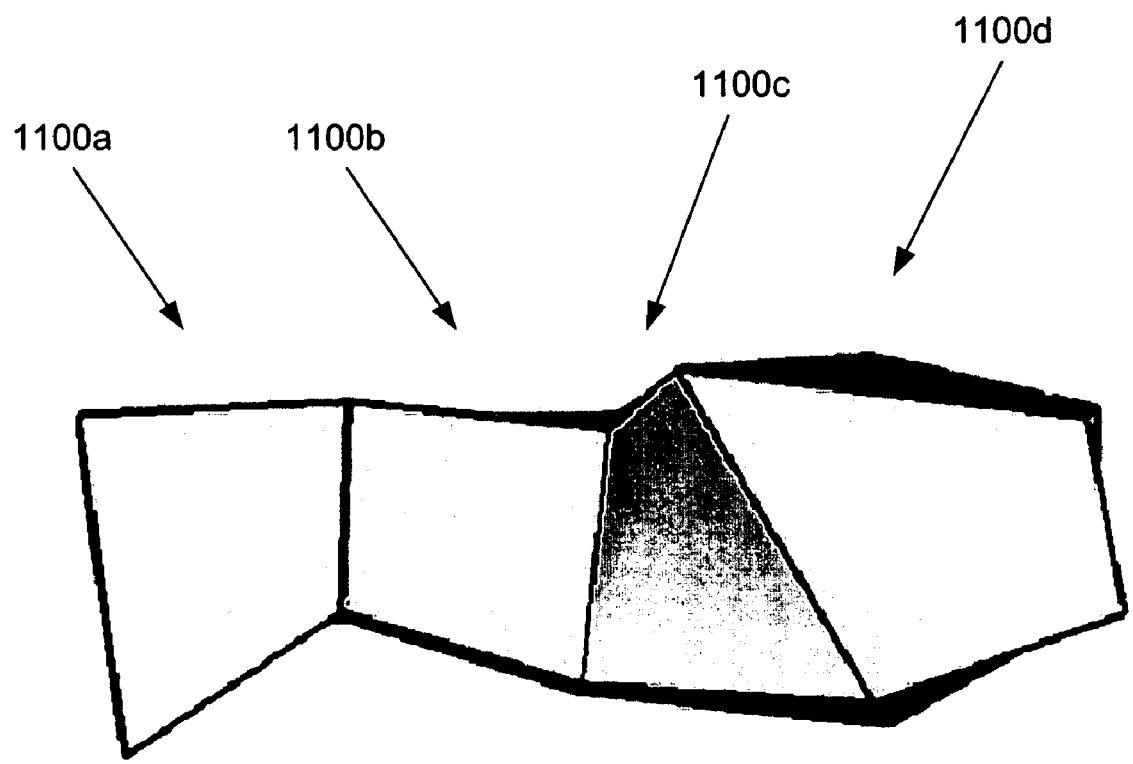
FIGS. 11A-11F illustrate one embodiment of the process of building a hybrid mesh representation of a Feline model.
Figure 11B:
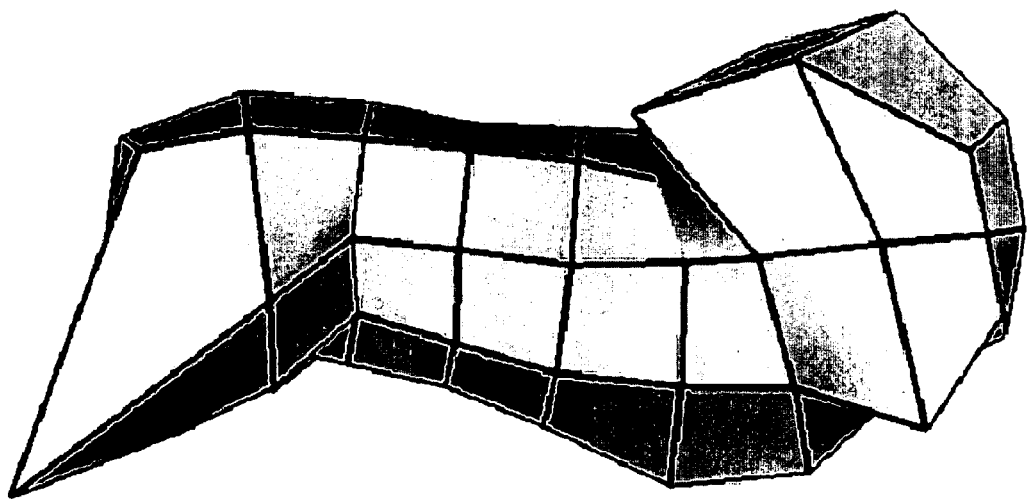
Figure 11C:
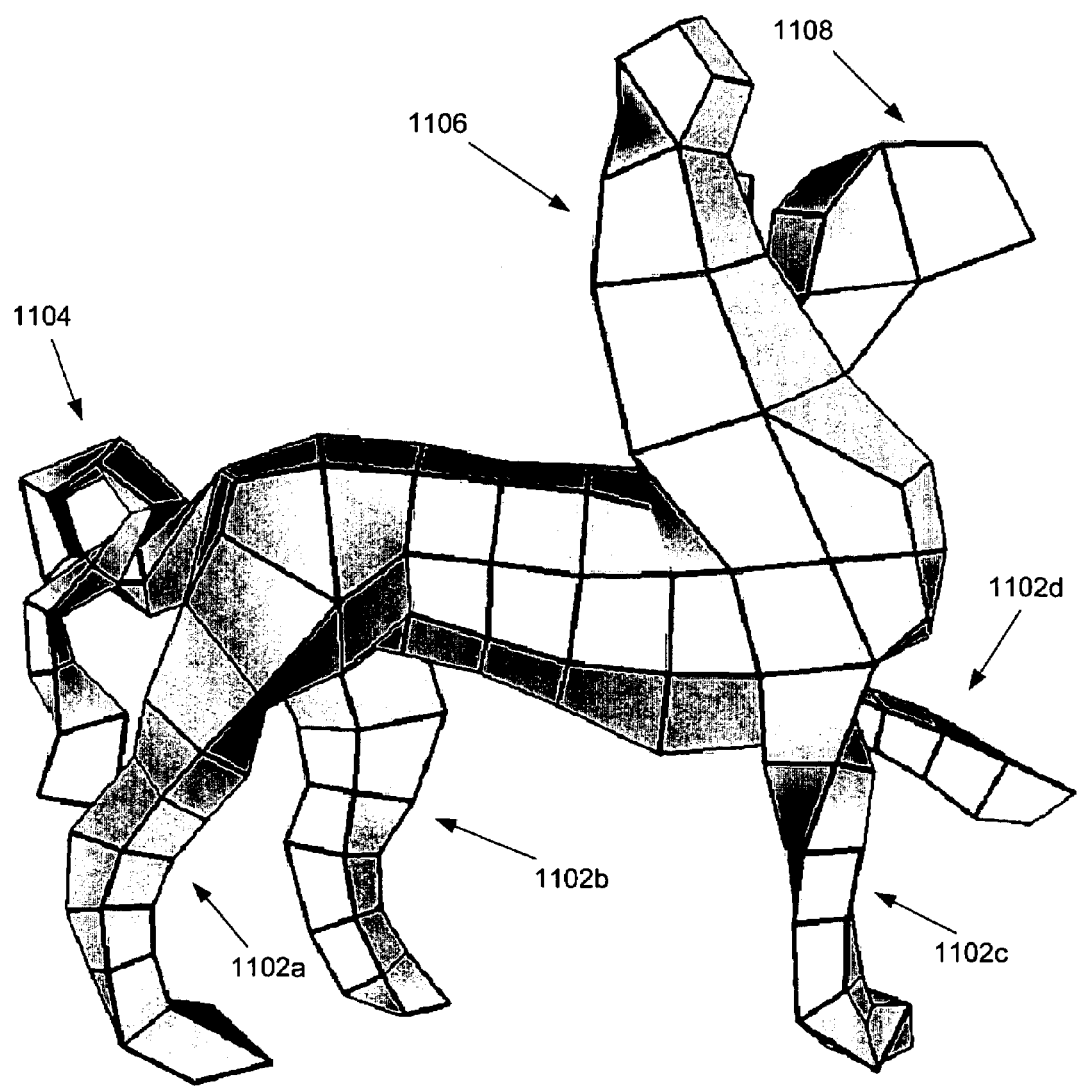
Figure 11D:
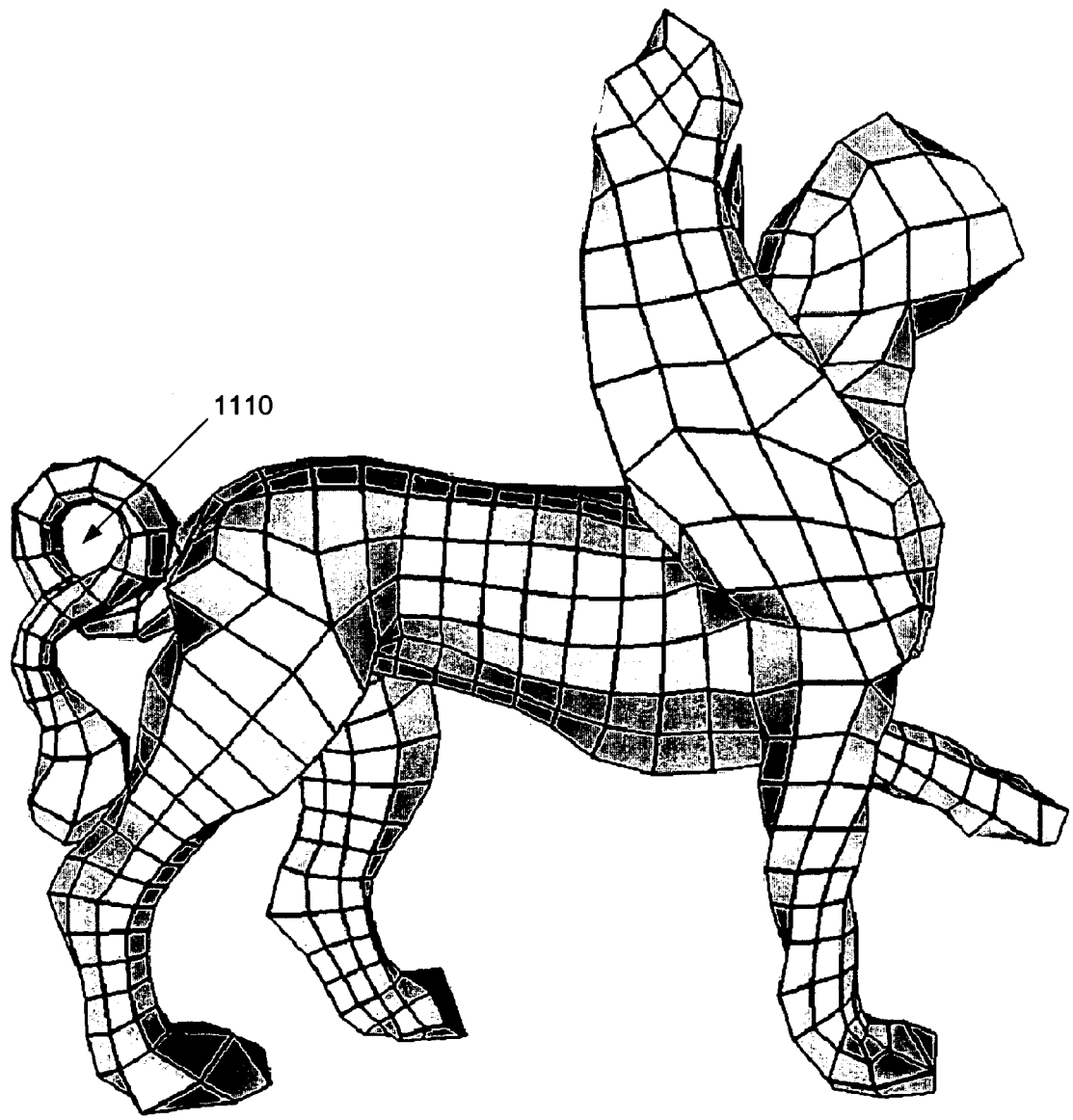
Figure 11E:
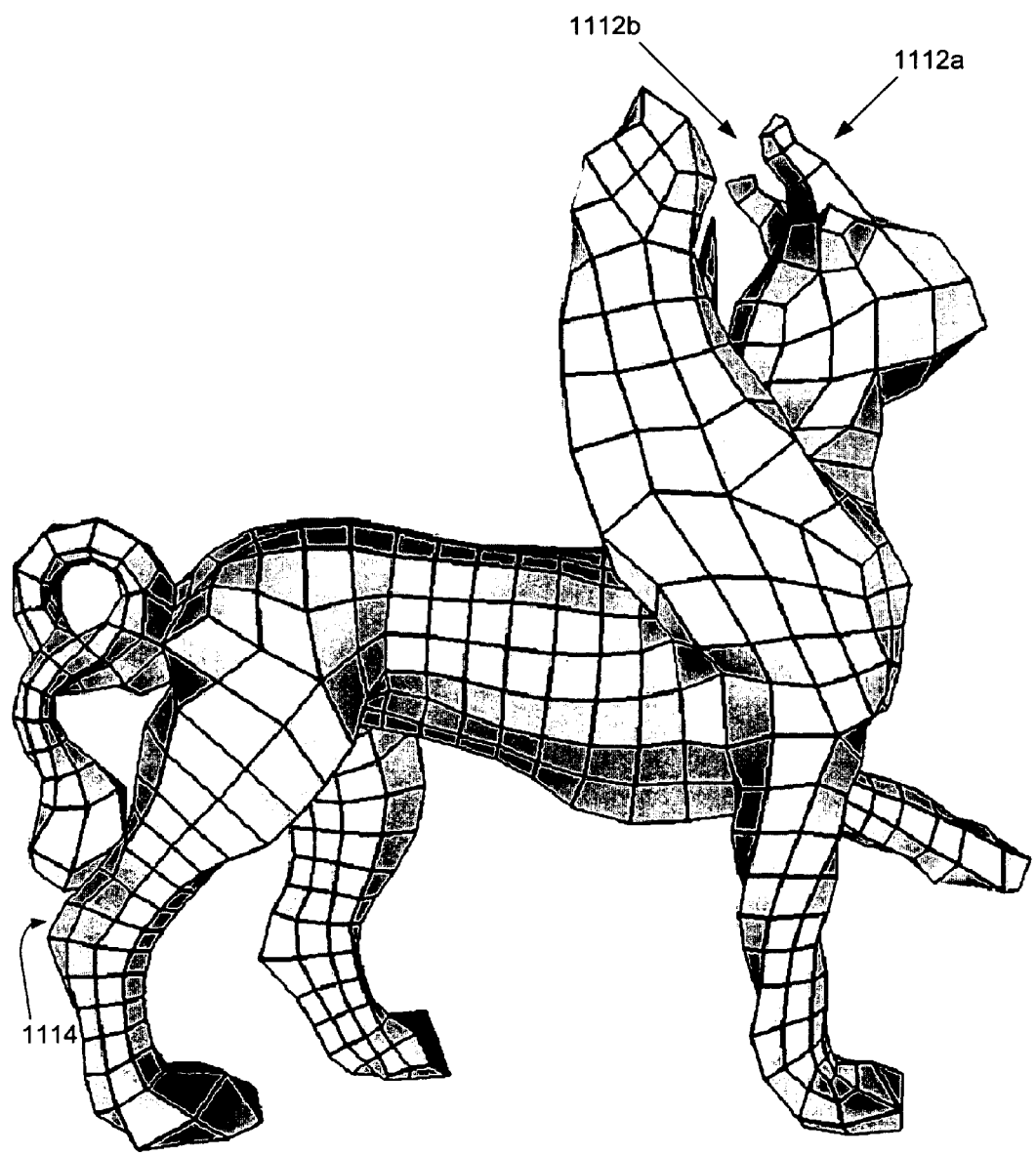

The base mesh $M^0$ undergoes a regular refinement step, resulting in the level one mesh $M^1$ illustrated in FIG. 1B. Referring to FIG. 11C, the level one mesh then undergoes one or more irregular operations, adding long chains of cubes to accommodate the legs (cubes identified with numerals 1102$a$, 1102$b$, 1102$c$, 1102$d$), tail (cubes identified with numeral 1104), wings (cubes identified with numeral 1106), and head (cubes identified with numeral 1108). The result is the mesh $N^1$ illustrated in FIG. 11C.

Figure 1E:
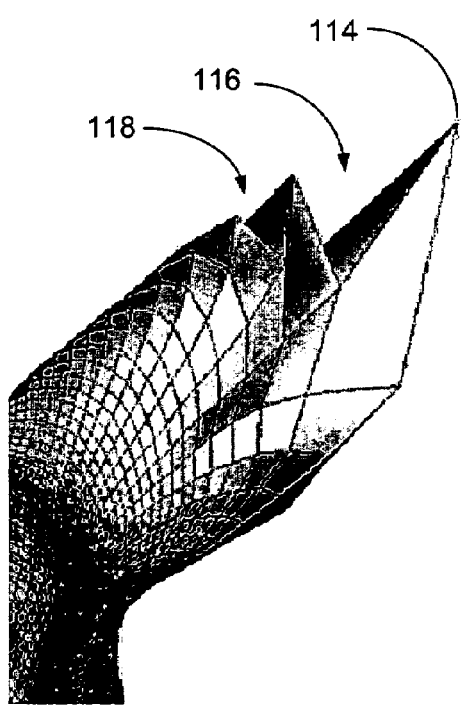
FIG. 1E illustrates a traditional semi-regular representation of the object surface of FIG. 1C at a higher level than that of FIG. 1D.

The mesh $N^1$ then undergoes a regular refinement step, resulting in a level two mesh $M^2$. An irregular connect operation (discussed earlier in relation to FIGS. 8A-8B) is performed on $M^2$, fusing the tail together at the area identified with numeral 1110 in FIG. 11D. Referring to FIG. 1E, a second irregular operation is performed, adding chains of cubes, identified with numerals 1112$a$ and 1112$b$, to accommodate the horns of the Feline. The result in the mesh $N^2$ illustrated in FIG. 11E. The mesh $N^2$ then undergoes a regular refinement step to result in the mesh $M^3$ (not shown). Moreover, an irregular connect operation is performed, causing the tail to fuse to the body at the area identified with numeral 1114 in FIG. 11E, resulting in the mesh $N^3$ (not shown).

Figure 11F:
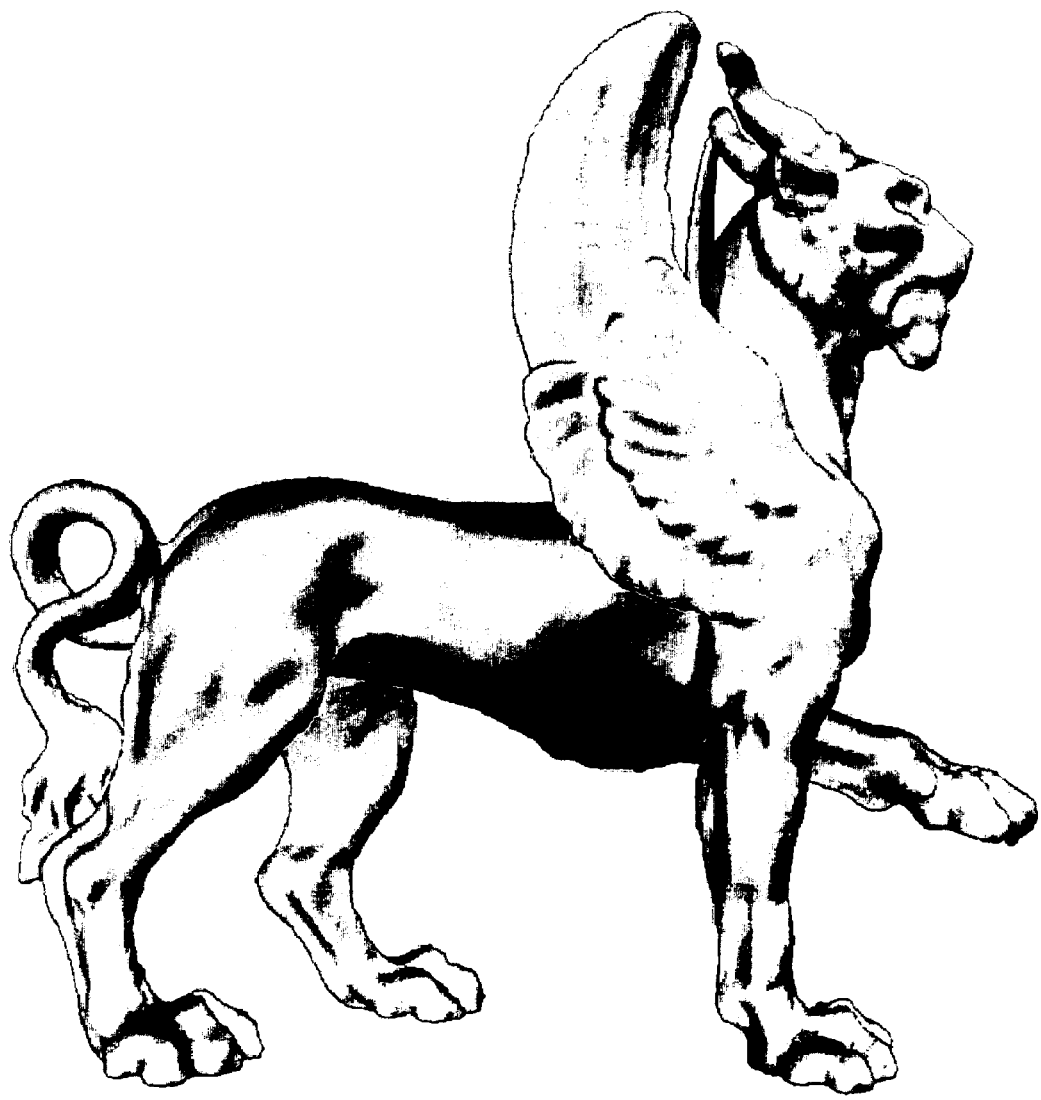

The mesh $N^3$ then undergoes five additional adaptive refinement steps, i.e., regular refinement steps where faces which are already sufficiently flat are not subdivided, to result in the mesh $M^8$ illustrated in FIG. 11F. This mesh is such that it deviates from the object surface by no more than 0.01%.

Figure 12A:
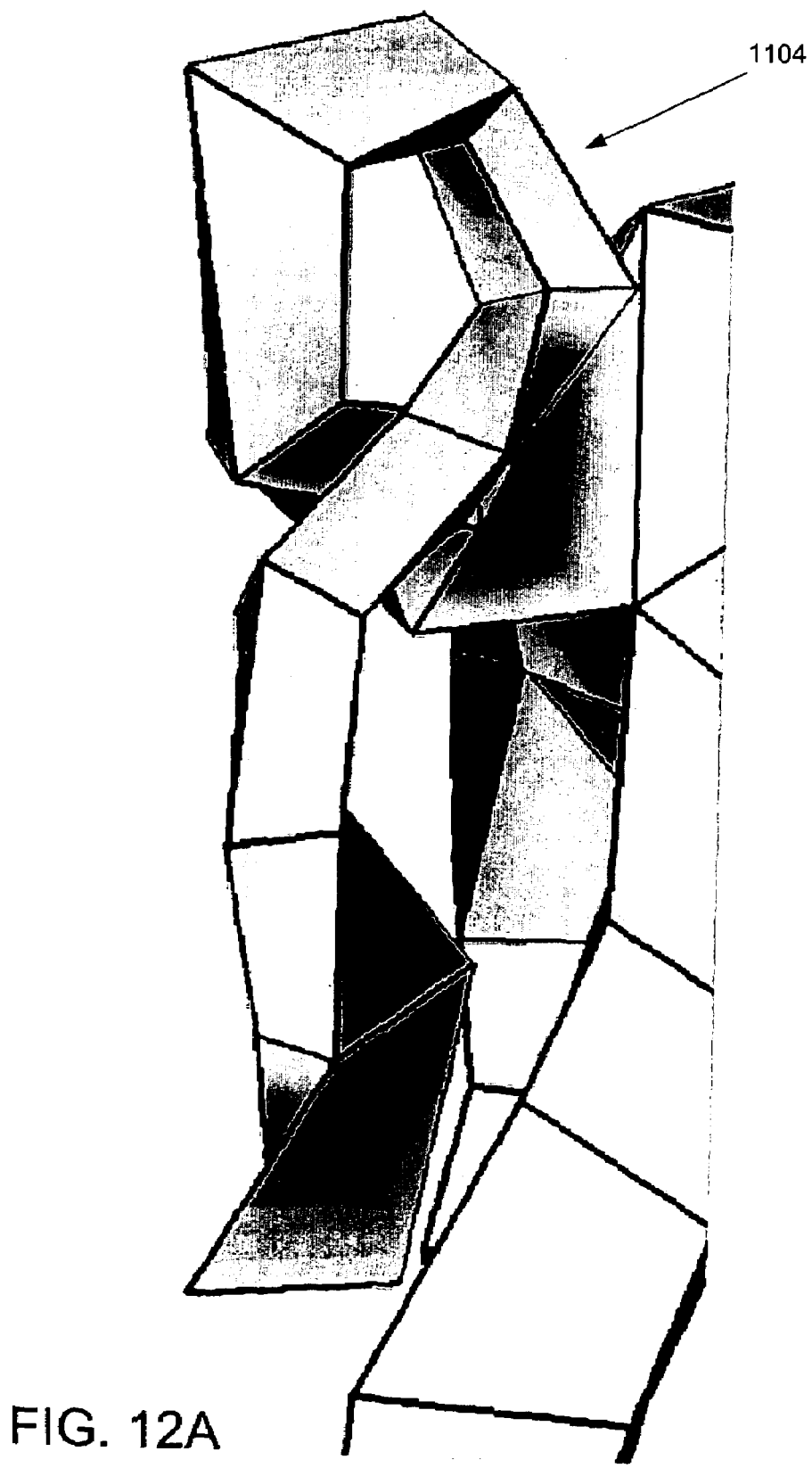
FIGS. 12A-12E illustrate the two instances of tail fusing which occur during the building process illustrated in FIGS. 11A-11F.
Figure 12B:
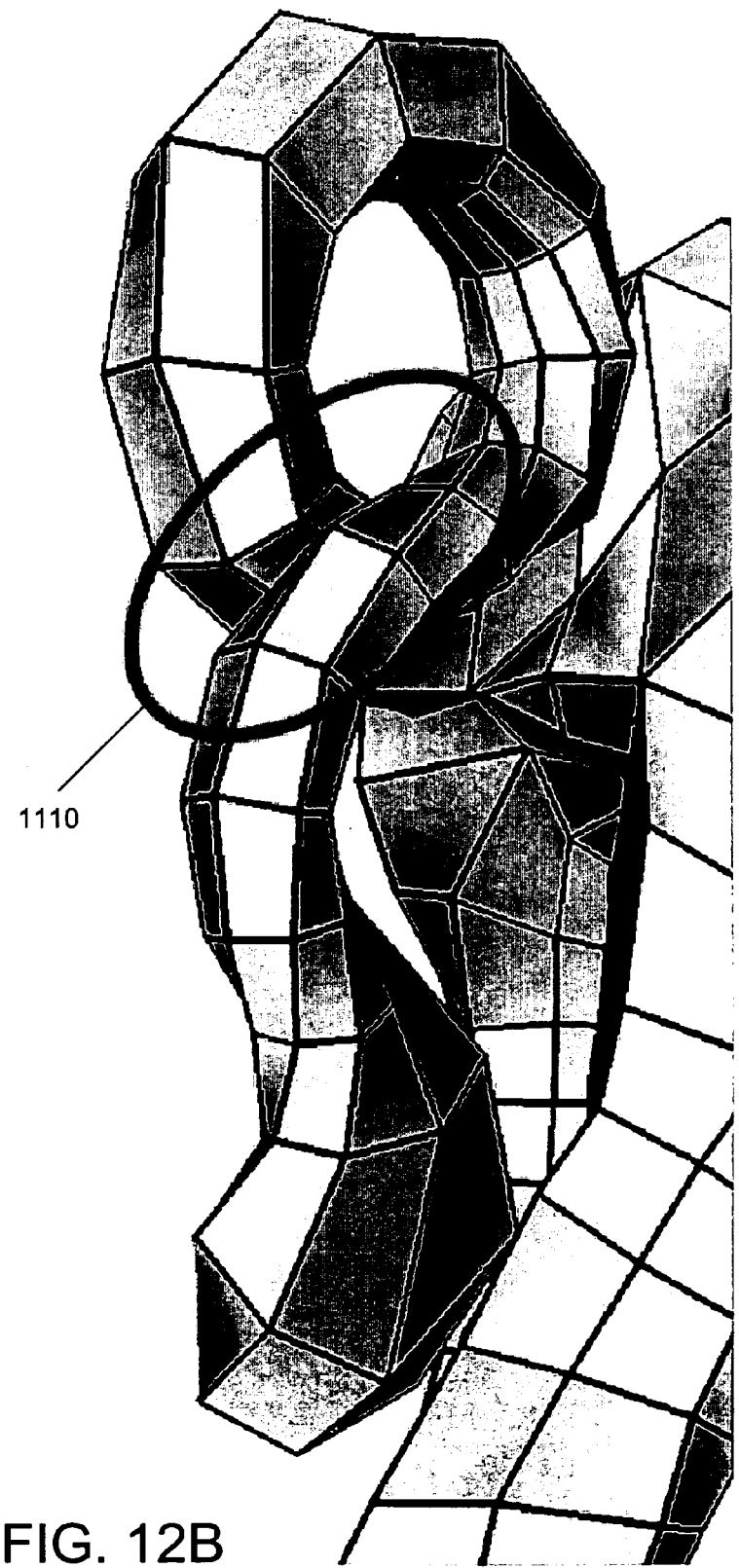
Figure 12C:
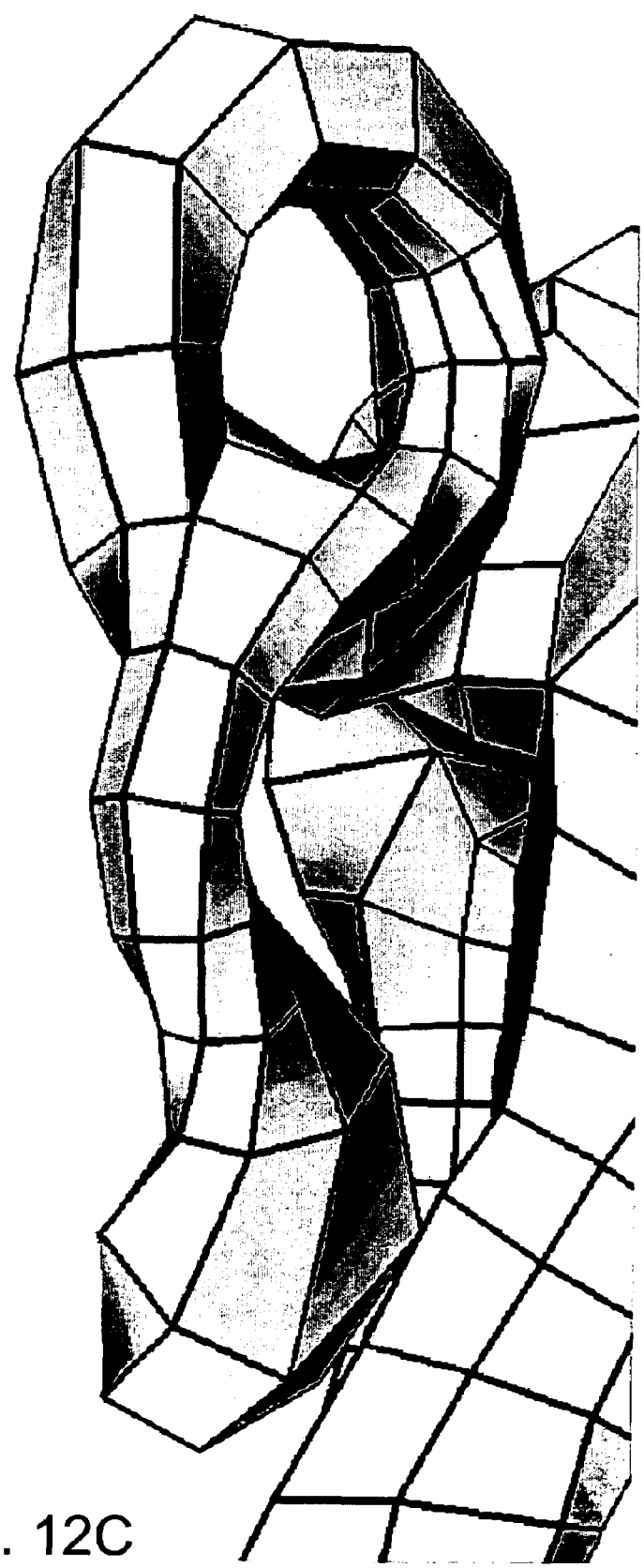
Figure 12D:
Figure 12E:
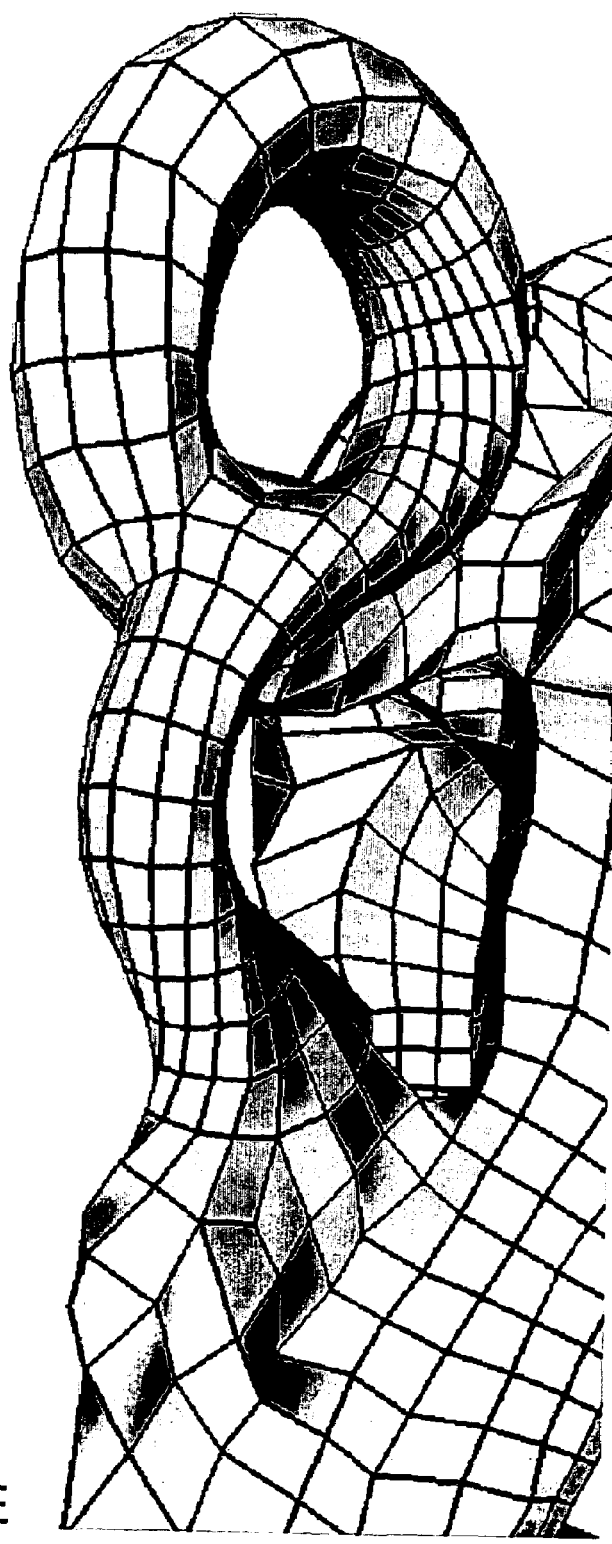

Referring to FIGS. 12A-12E, additional detail regarding the fusing of the tail section of the Feline model is shown. FIG. 12A illustrates the long chain of cubes 1104 added to accommodate the tail section at level one. FIG. 12B illustrates the portion 1110 of the tail loop which is fused together at level two. FIG. 12C illustrates the mesh resulting from the fusing operation of FIG. 12B. FIG. 12D illustrates the end portion 1114 of the tail which is fused to the body at level three. FIG. 12E illustrates the mesh resulting from the fusing operation of FIG. 12E.

Figure 13A:
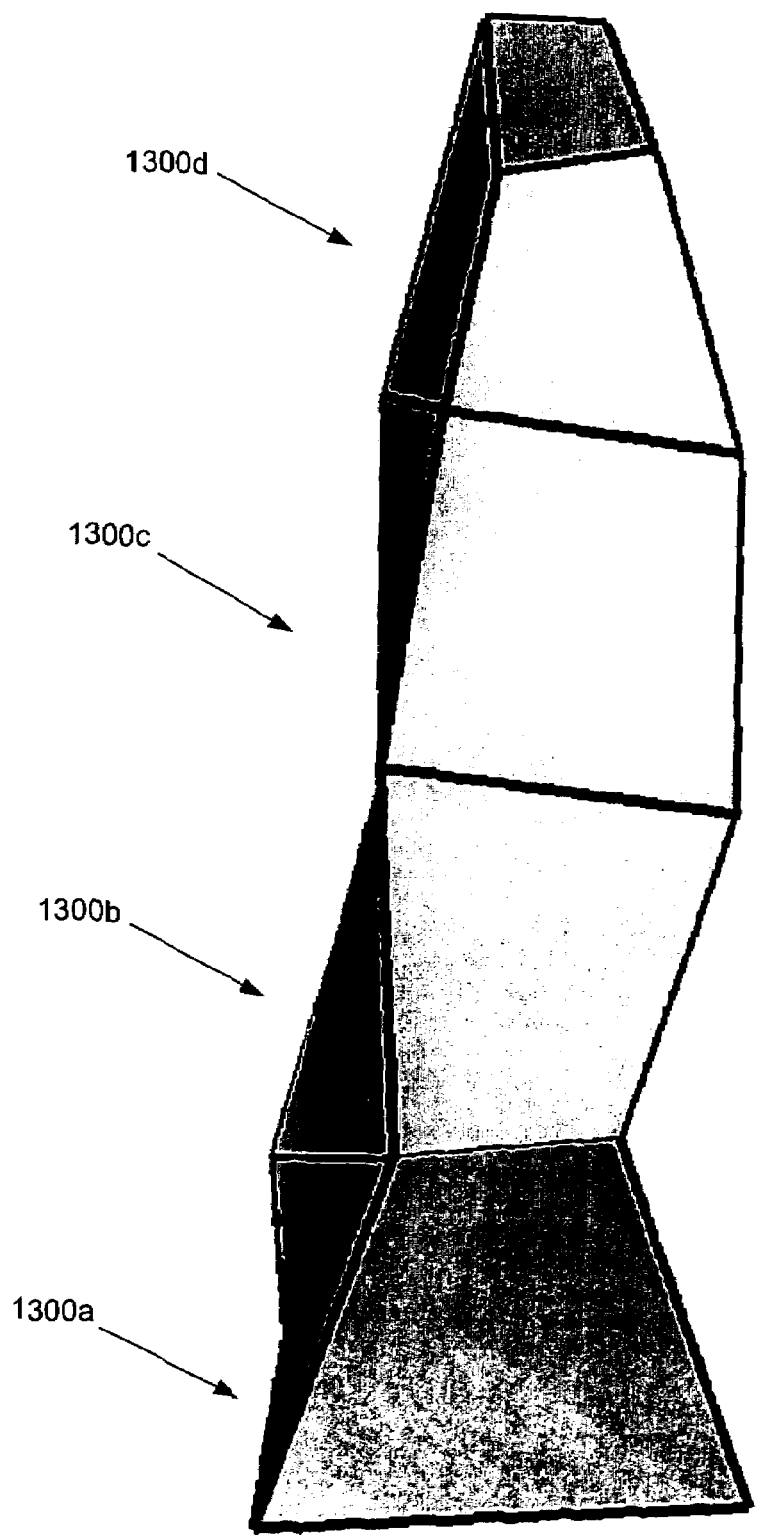
FIGS. 13A-13H illustrate one embodiment of the process of building a hybrid mesh representation of the Stanford Buddha.

Referring to FIGS. 13A-13H, the process of building a hybrid mesh for a Stanford Buddha model is illustrated. FIG. 13A illustrates the base mesh $M^0$, formed by invoking the automatic cube building algorithm mentioned previously and to be discussed in more detail in relation to FIGS. 18A-18C. The result is the four cube base mesh illustrated in FIG. 13A, comprising cubes 1300$a$, 1300$b$, 1300$c$, and 1300$d$.

Figure 13B:
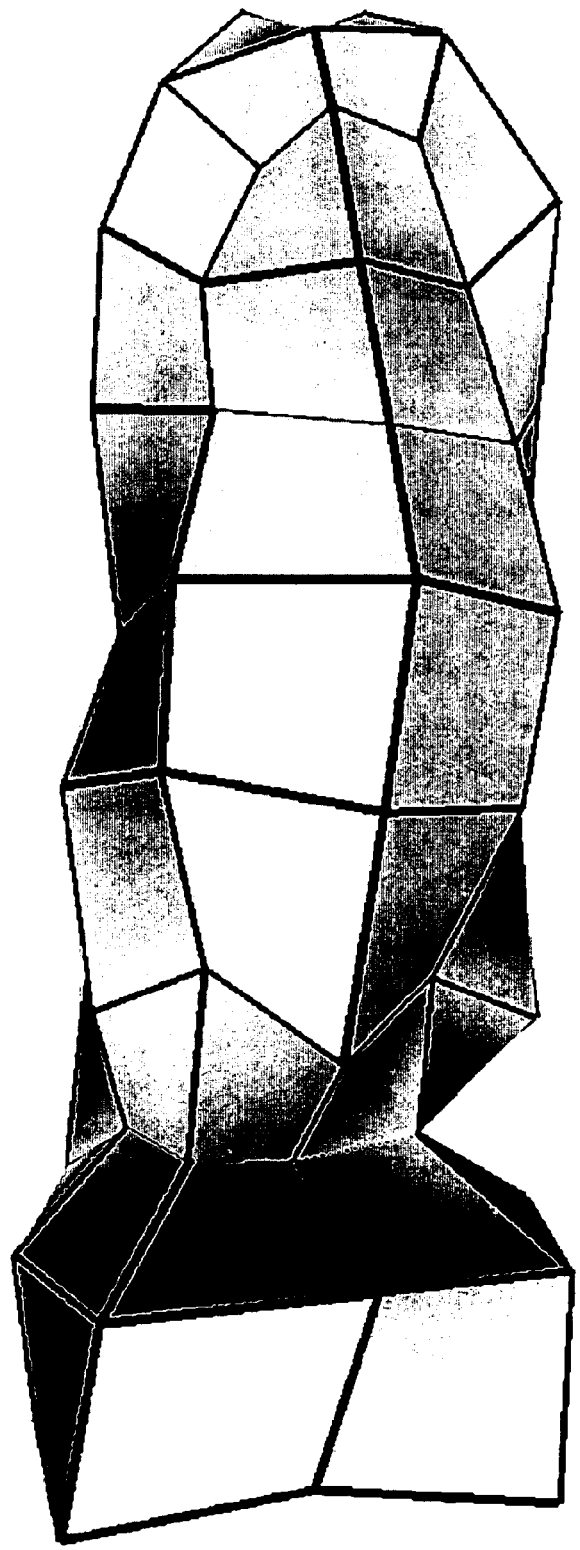
Figure 13C:
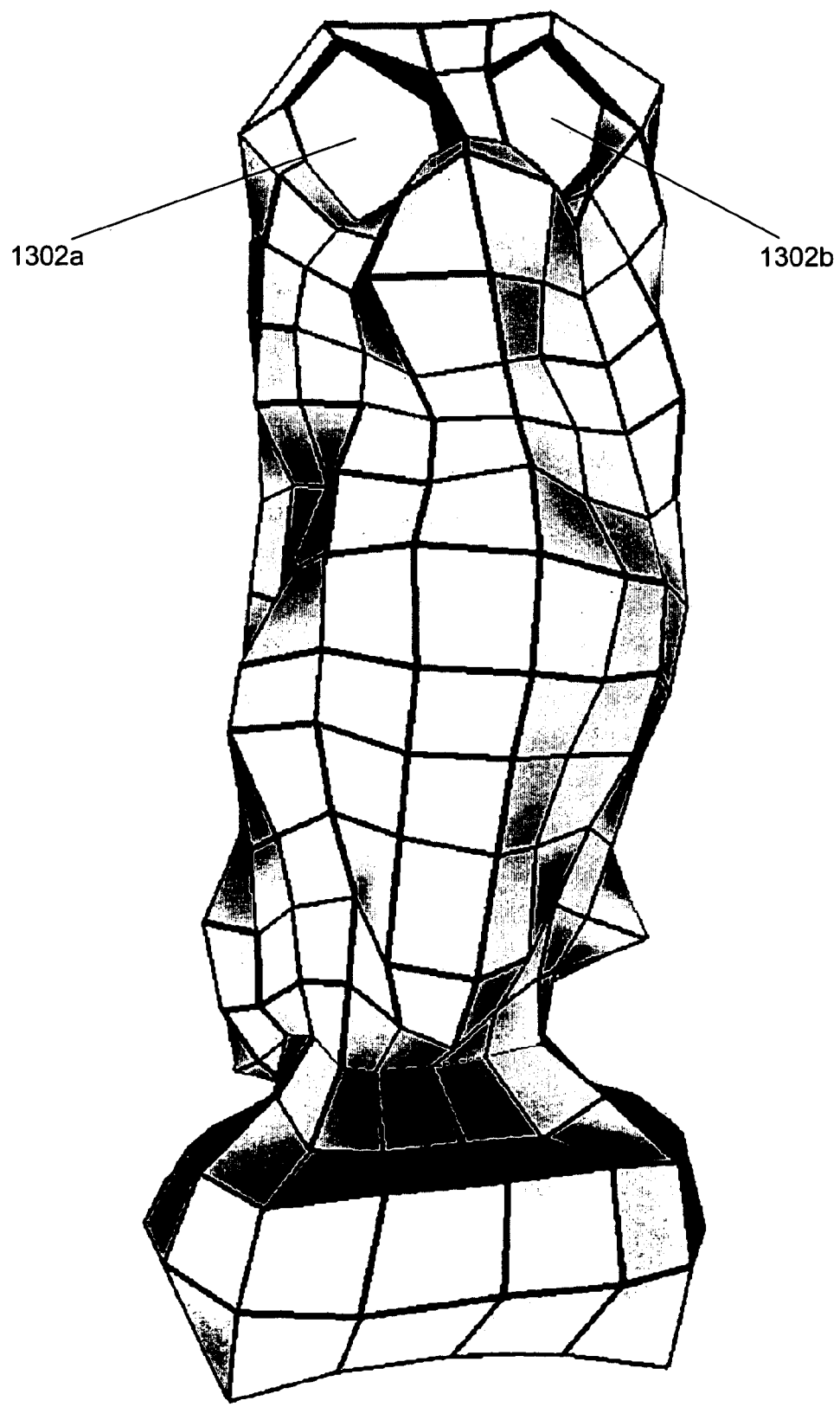

The base mesh $M^0$ then undergoes a regular refinement step, resulting in the mesh $M^1$ illustrated in FIG. 13B. Referring to FIG. 13C, the mesh $M^1$ then undergoes an irregular operation (discussed previously in relation to FIGS. 4A-4B, creating tunnels 1302$a$ and 1302$b$ between the head and arms. The result is the mesh N' illustrated in FIG. 13C.

Figure 13D:
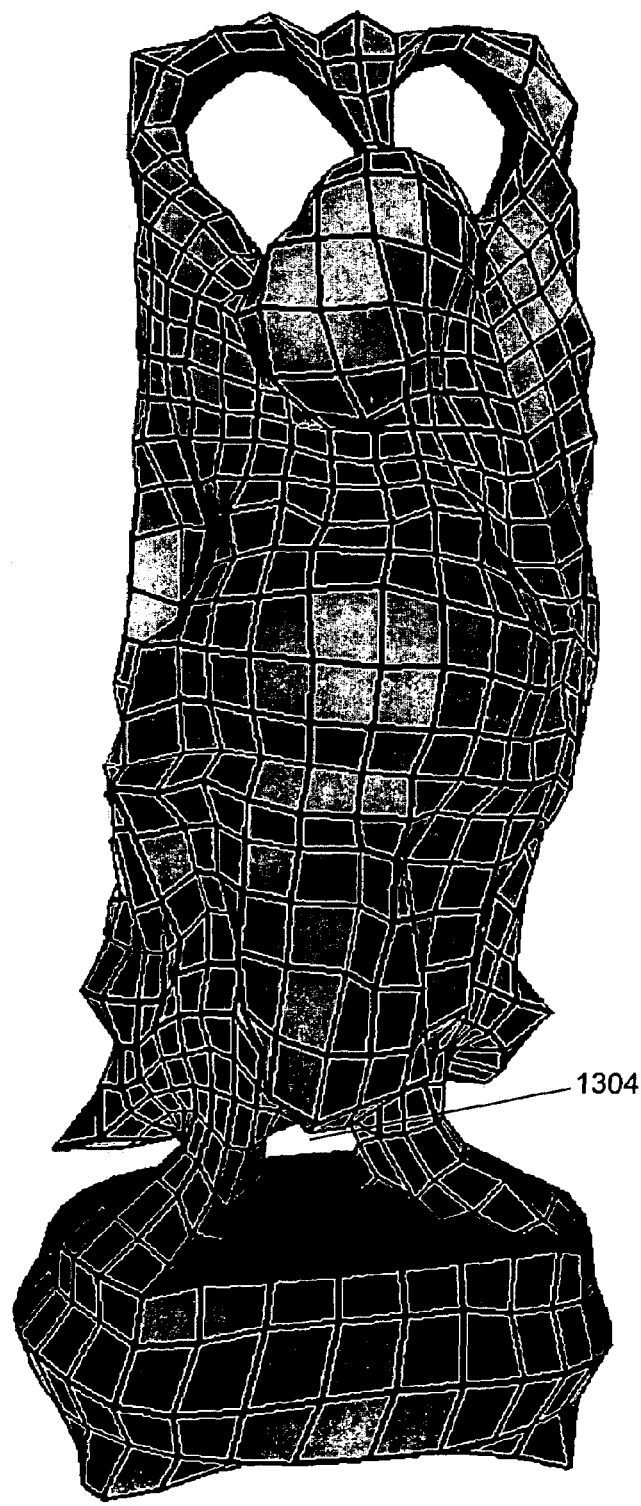

Referring to FIG. 13D, the mesh N' then undergoes a regular refinement operation, and an irregular operation is performed, creating tunnel 1304 between the feet. The resulting mesh $N^2$ is illustrated in FIG. 13D.

Figure 13E:
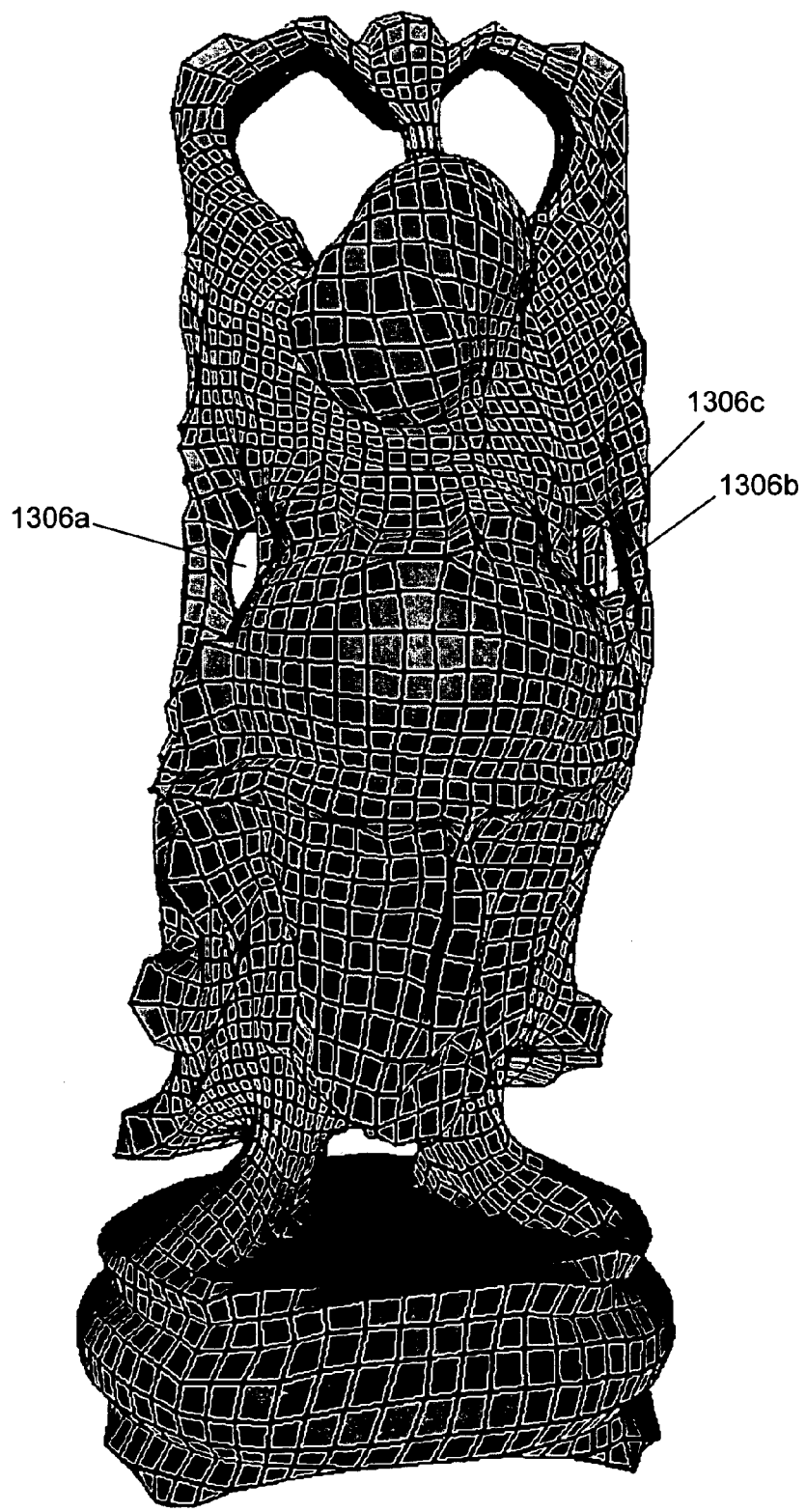

Referring to FIG. 13E, the mesh $N^2$ then undergoes a regular refinement operation, and an irregular operation is performed, creating tunnels 1306$a$, 1306$b$ and 1306$c$ at the sides. The resulting mesh $N^3$ is illustrated in FIG. 13E.

Figure 13F:
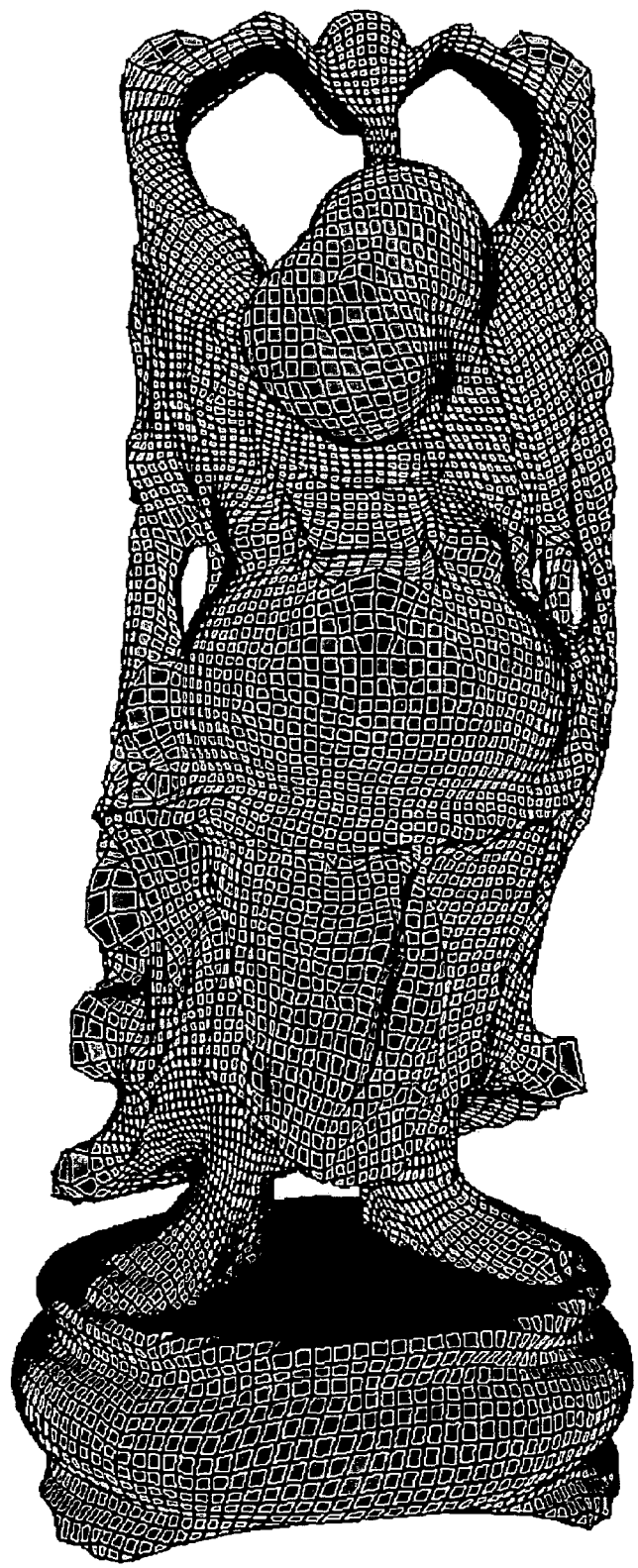
Figure 13G:
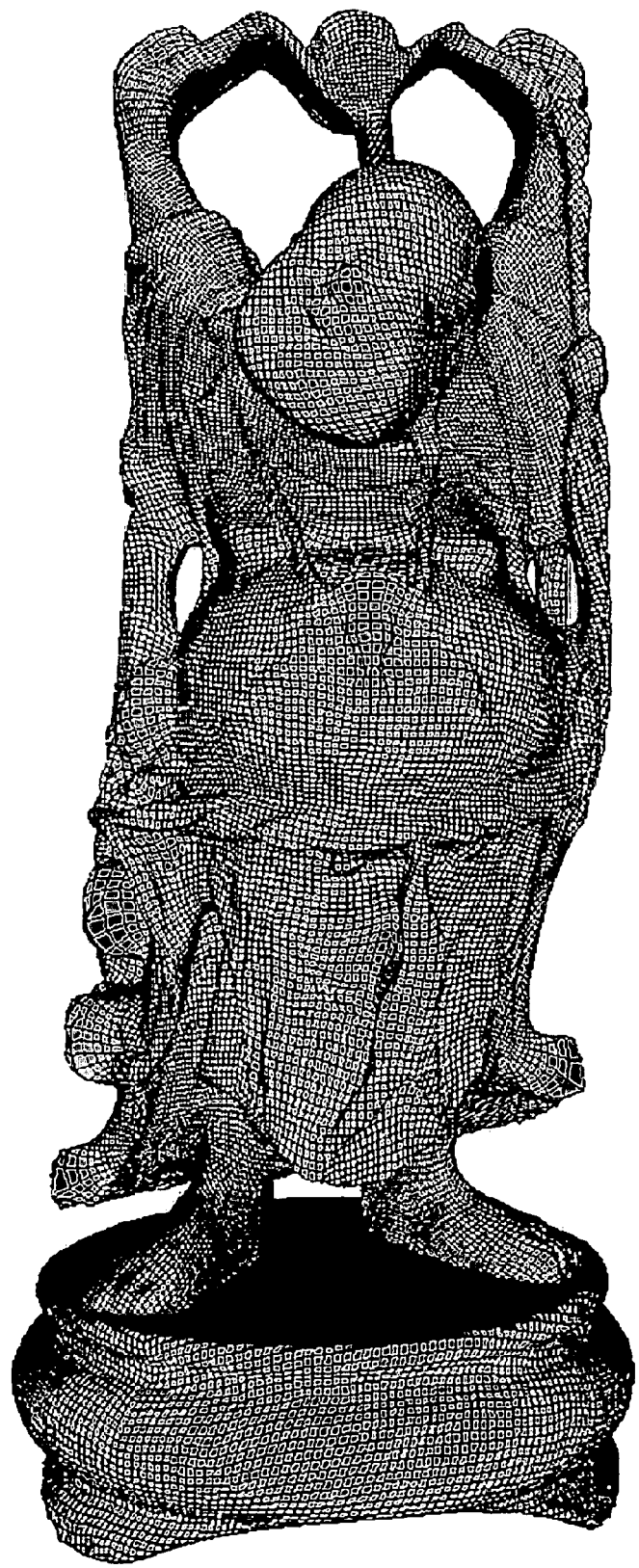

The mesh $N^3$ then undergoes a regular refinement step, resulting in the mesh $M^4$ illustrated in FIG. 13F. Similarly, the mesh $M^4$ also undergoes a regular refinement step, resulting in the mesh $M^5$ illustrated in FIG. 13G.

Figure 13H:

Two additional adaptive refinement steps are performed, i.e., regular refinement steps where faces which are already sufficiently flat are not subdivided, to result in the level six mesh illustrated in FIG. 13H.

Figure 14A:
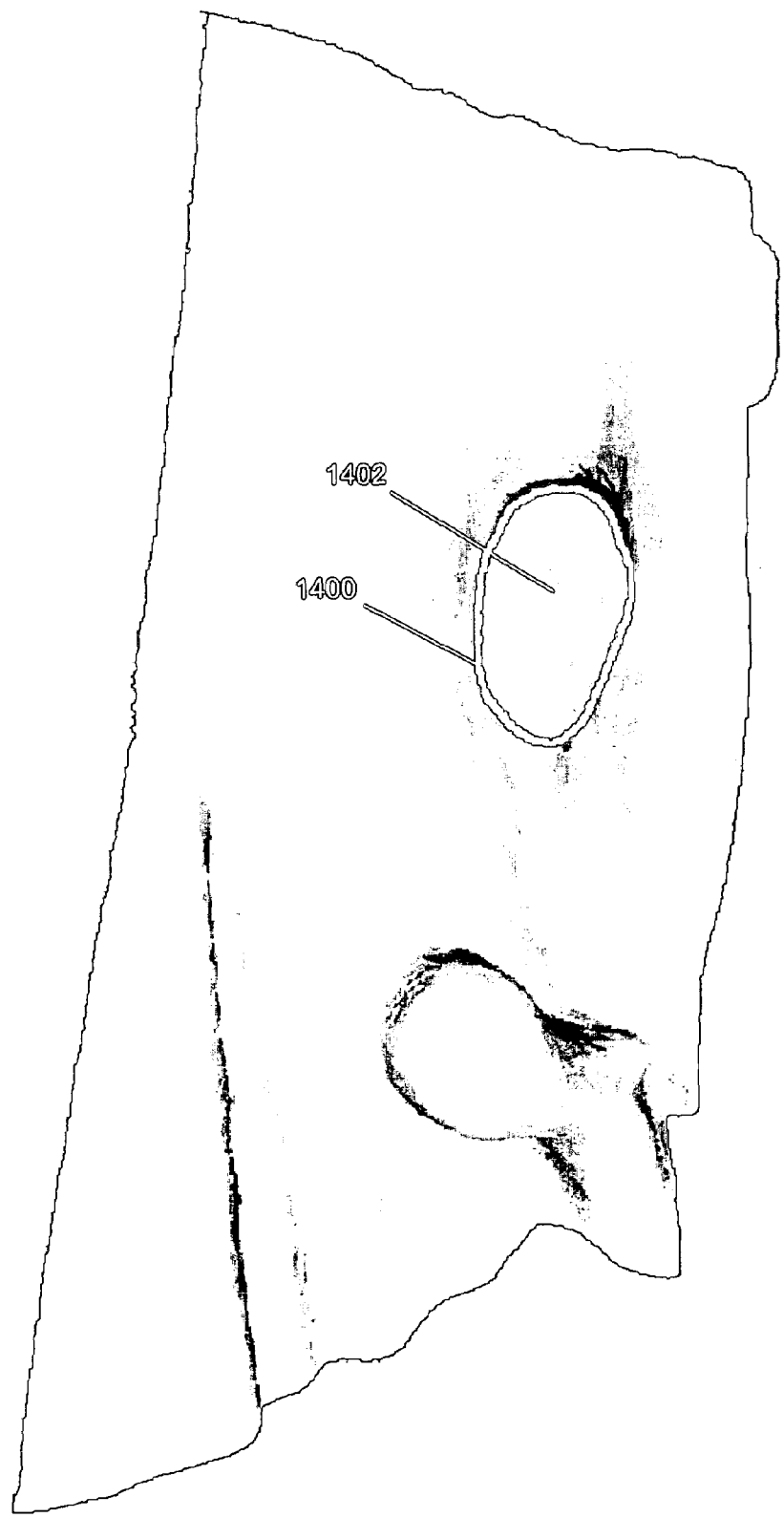
FIGS. 14A-14H illustrate one instance of the creation of a tunnel which occurs during the building process illustrated in FIGS. 13A-13H.

Referring to FIGS. 14A-14H, additional detail about the process of creating a tunnel in the side of the Stanford Buddha model is illustrated. As illustrated in FIG. 14A, the user traces an outline 1400 of the tunnel on the original object surface. The system responds by closing the tunnel with two caps, one for the front surface of the Buddha and the other for the rear surface of the Buddha. In FIG. 14A, the cap 1402 for the front surface of the Buddha is illustrated.

Figure 14B:
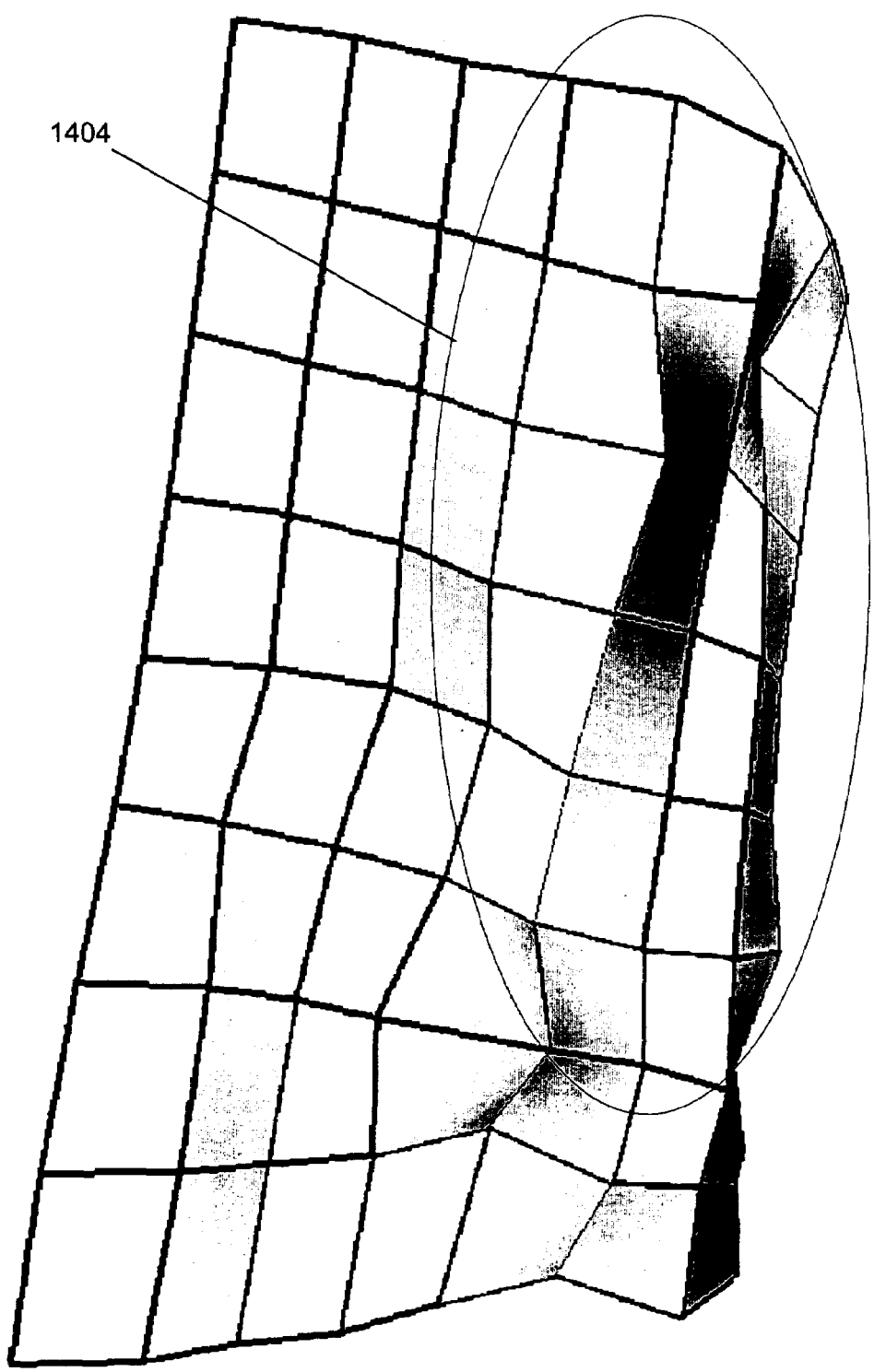

When it is time to introduce the tunnels in the layer three mesh, the user prompts the system, and the system responds by selecting the area in the layer three mesh which includes the traces and corresponding caps to a level three mesh. Referring to FIG. 14B, the selected area is identified with numeral 1404.

Figure 14C:
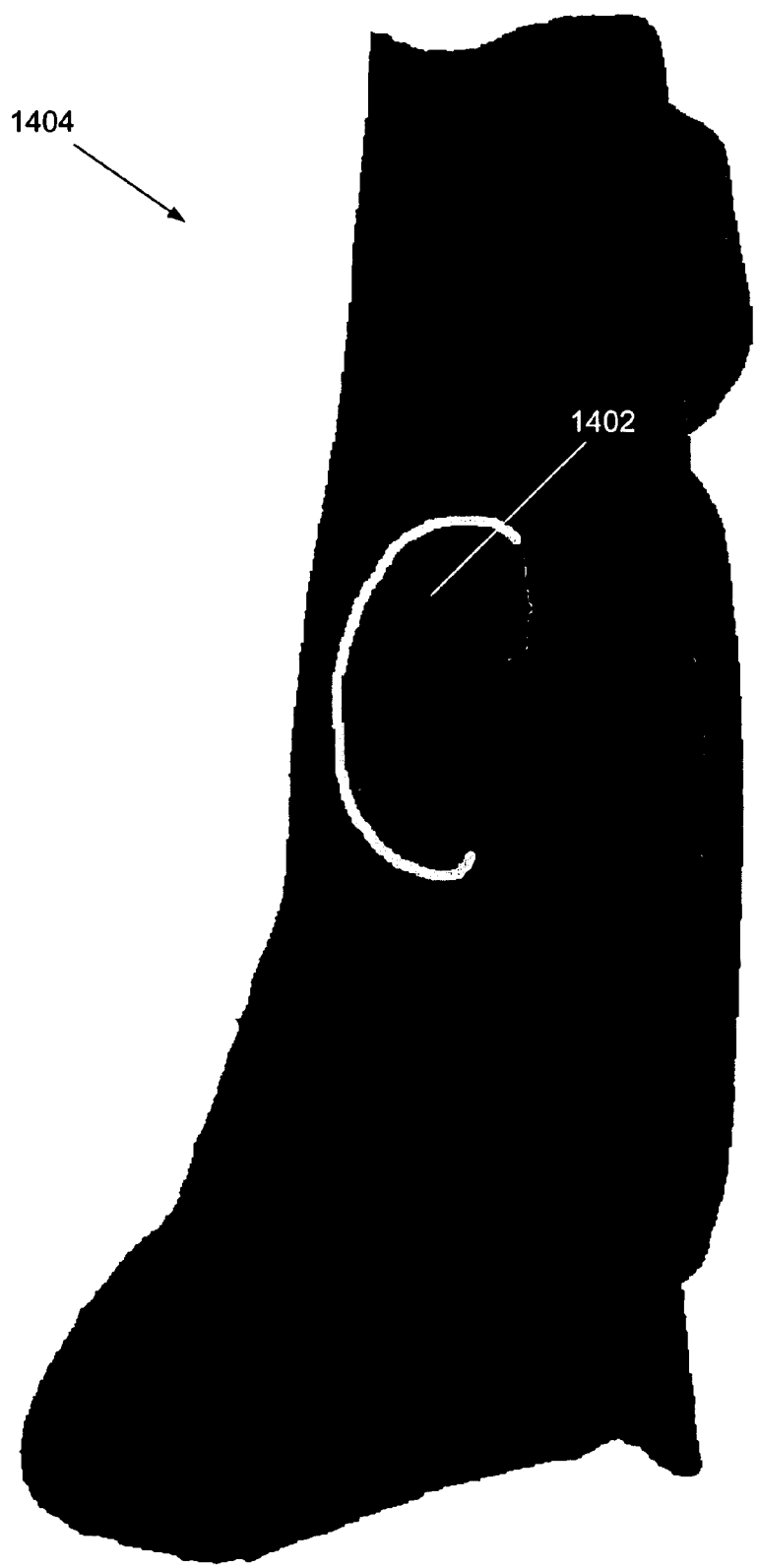
Figure 14D:
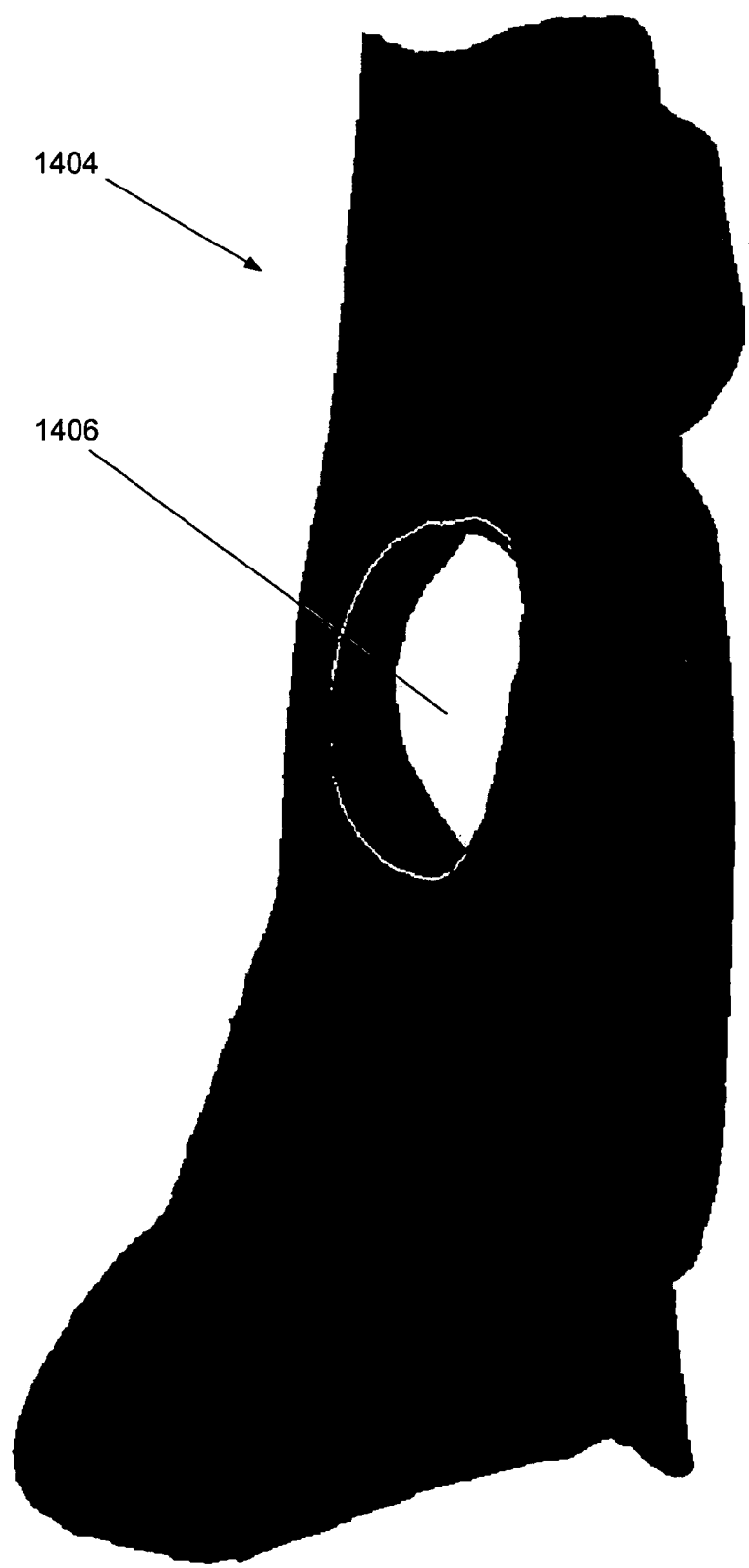

Referring to FIG. 14C, the system then cuts the area 1404 out of the layer three mesh. As illustrated, the caps 1402 are still inserted. Referring to FIG. 14D, the system then removes the caps 1402, exposing the tunnel 1406.

Figure 14E:
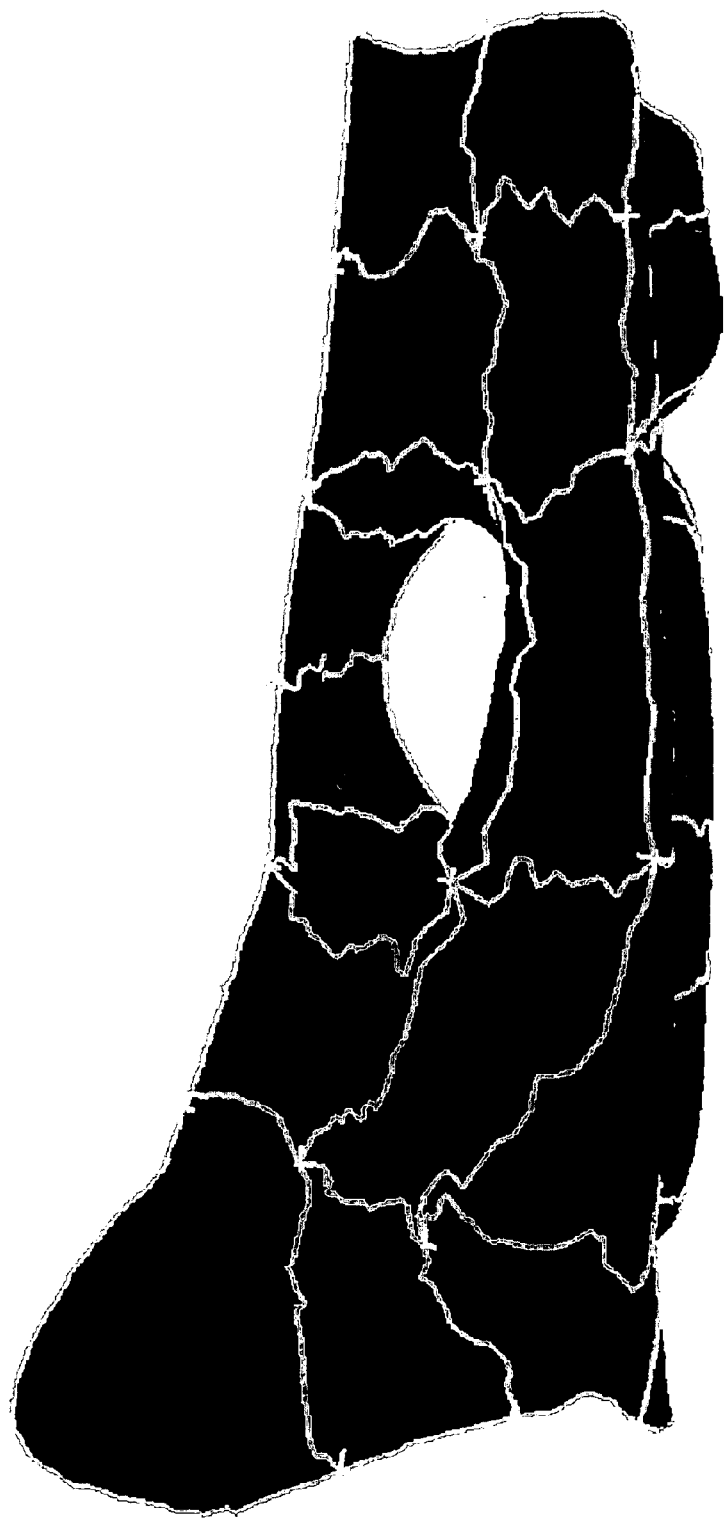
Figure 14F:
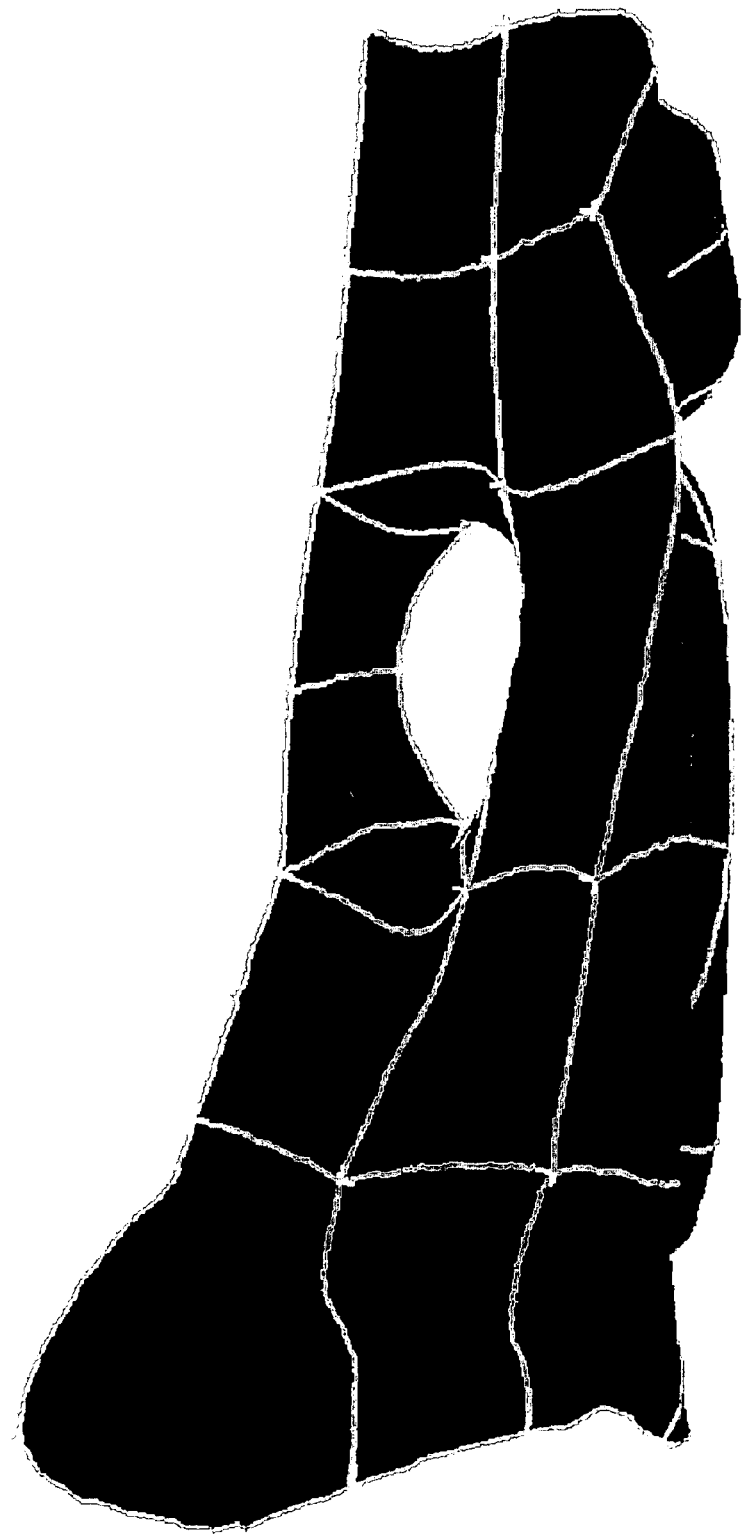

Referring to FIG. 14E, the system builds a patch layout for this area, and, referring to FIG. 14F, relaxes the patch layout (using the operations discussed father on in relation to FIGS. 16A-16C and 17A-17C). The result is illustrated in FIG. 14F.

Figure 14G:
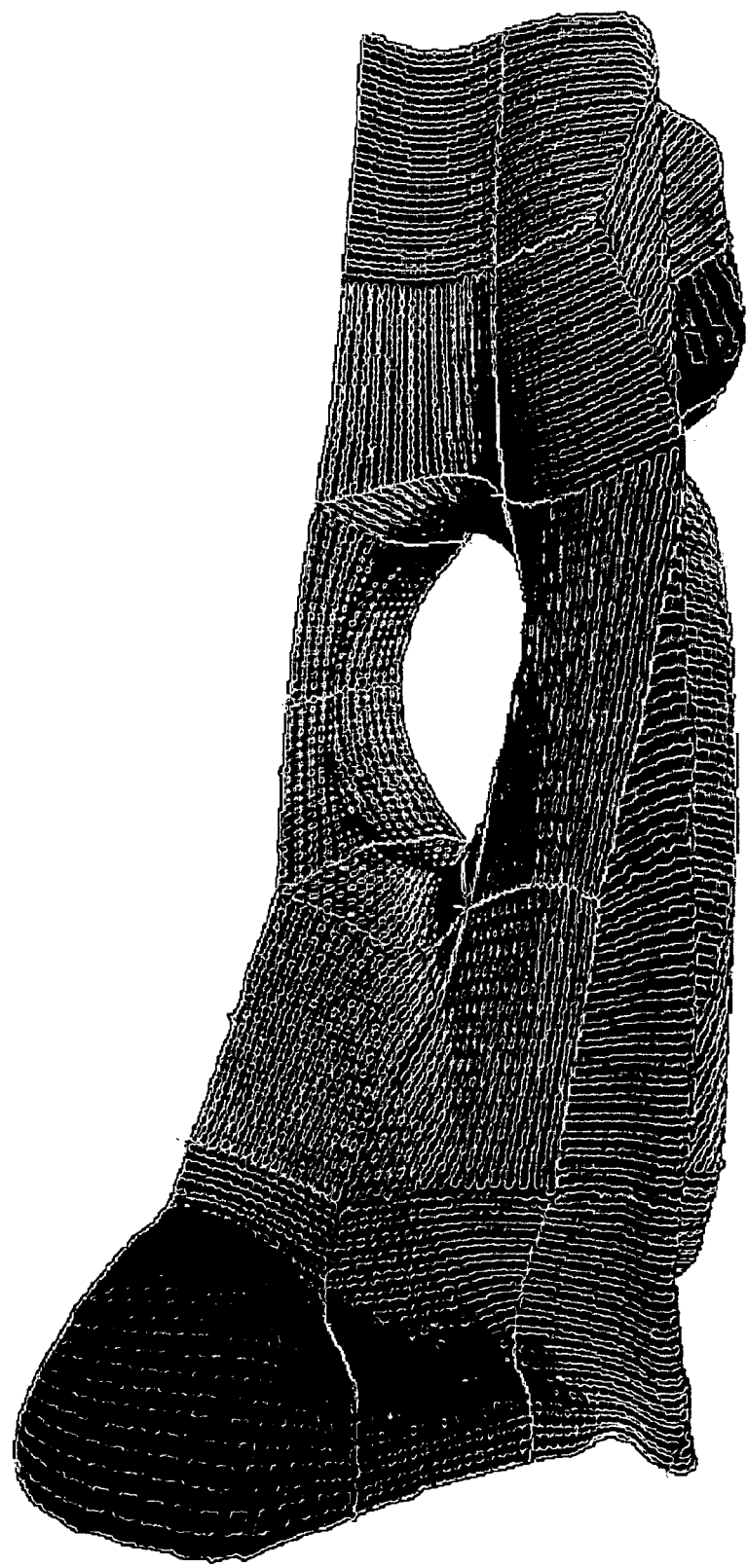

Referring to FIG. 14G, this part of the mesh is parameterized, and the selected area 1404 illustrated in FIG. 14B is replaced with an irregular submesh in the parameter domain. In one implementation, to be discussed farther on in relation to FIGS. 19A-19B, this step is implemented by setting a flag corresponding to each of the quads in the selected area 1404 illustrated in FIG. 14B, indicating that these quads have been removed, and converted to virtual root quads. Each of the quads in the substituted mesh illustrated in FIG. 14G are then introduced into the layer three mesh as root quads, and identified as neighbors of the virtual root quads.

Figure 14H:
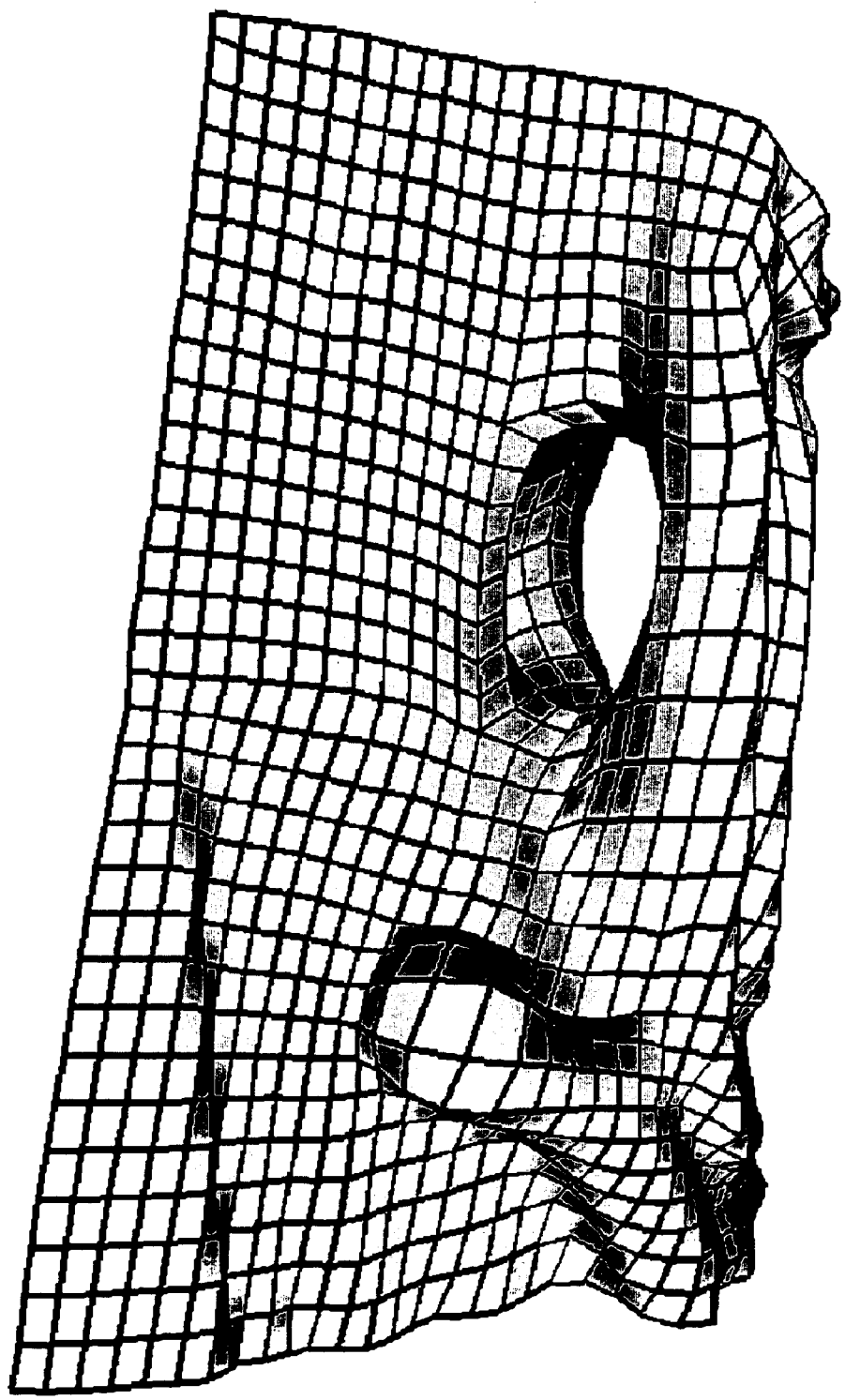

Once the irregular submesh has been introduced into the level three mesh, additional adaptive refinement steps, i.e., regular refinement steps where faces which are already sufficiently flat are not subdivided, may be performed. FIG. 14H illustrates the portion 1403 of the layer three mesh of FIG. 14B, with the selected area 1404 replaced by the remesh, after two additional regular refinement steps have been performed.

Figure 15A:
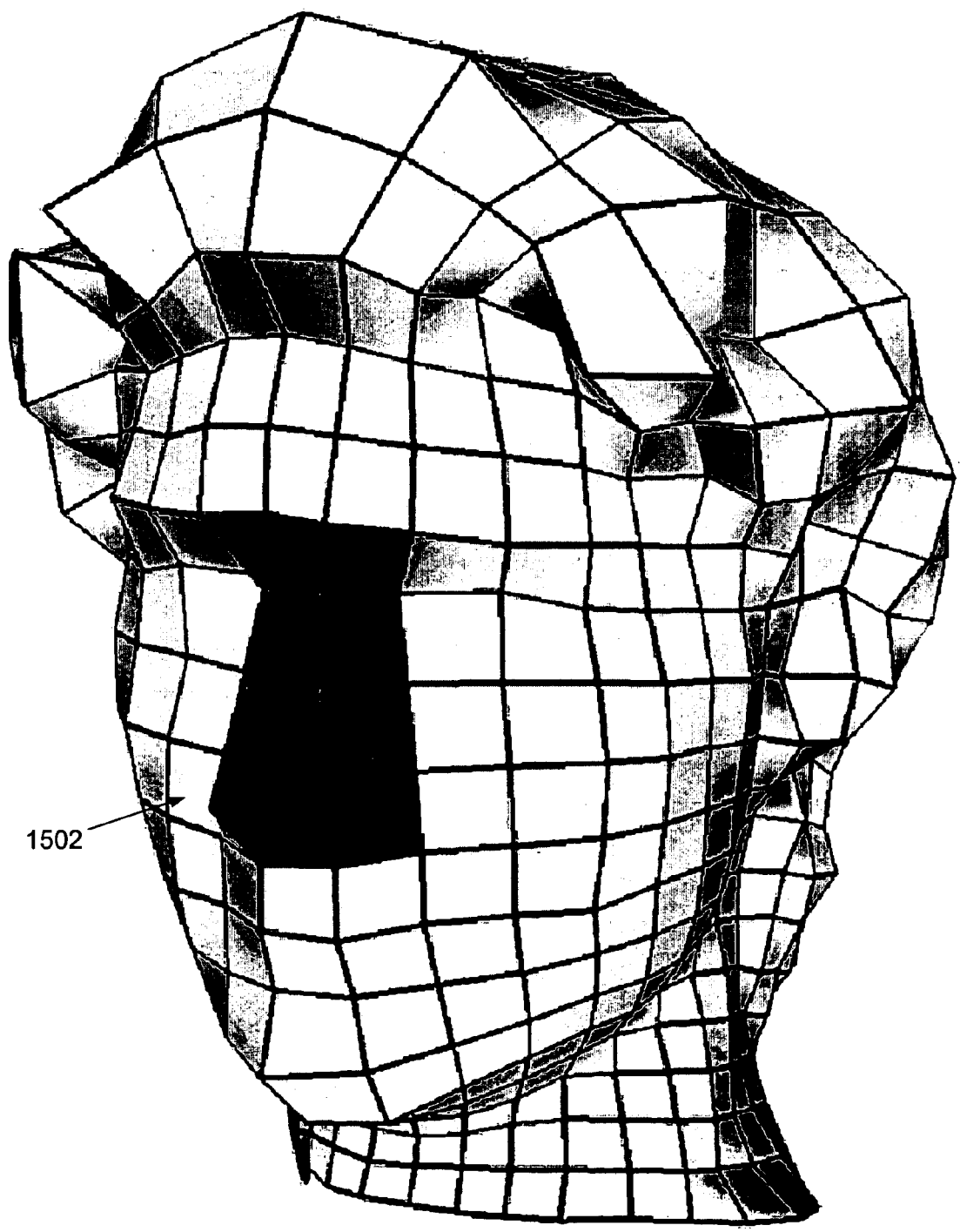
FIGS. 15A-15G illustrate portions of one embodiment of a process of building a hybrid mesh representation of David's head.
Figure 15B:
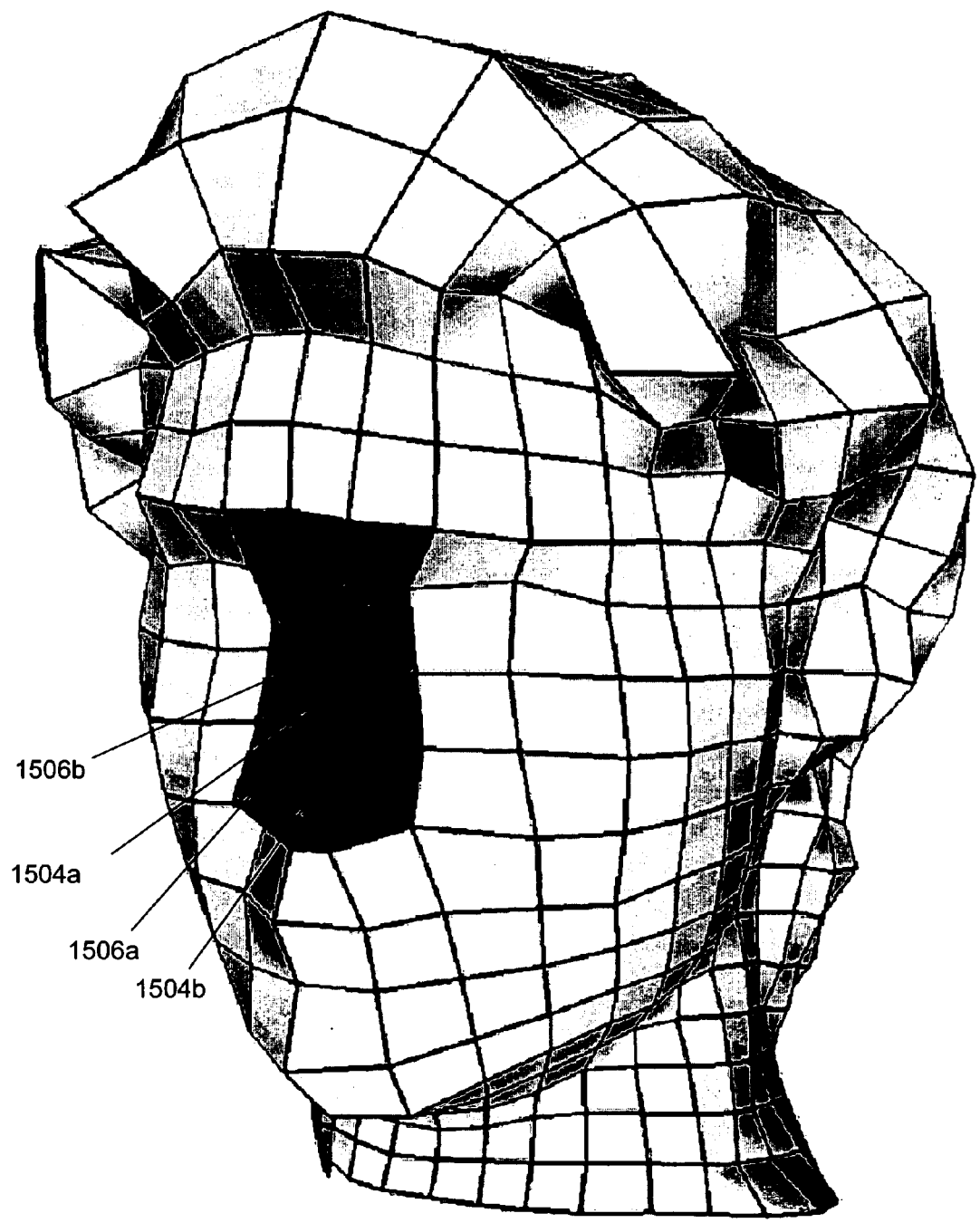

Referring to FIGS. 15A-15G, some of the steps in the process of building a hybrid mesh representing David's head is illustrated. FIG. 15A illustrates a level three mesh representation of the head, after a user has selected the nose area 1502 for irregular operations comprising adding additional "skin" (in the form of additional polygons) to the nose area, and re-aligning of patch edges to coincide with object features. FIG. 15B illustrates the same level three mesh after these irregular operations have been performed. In particular, note that additional skin in the form of polygons such as polygons 1504a and 1504b has been added, and the edges of polygons 1506a and 1506b have been realigned to correspond with the contours of the nose area on the original object surface.

Figure 15C:
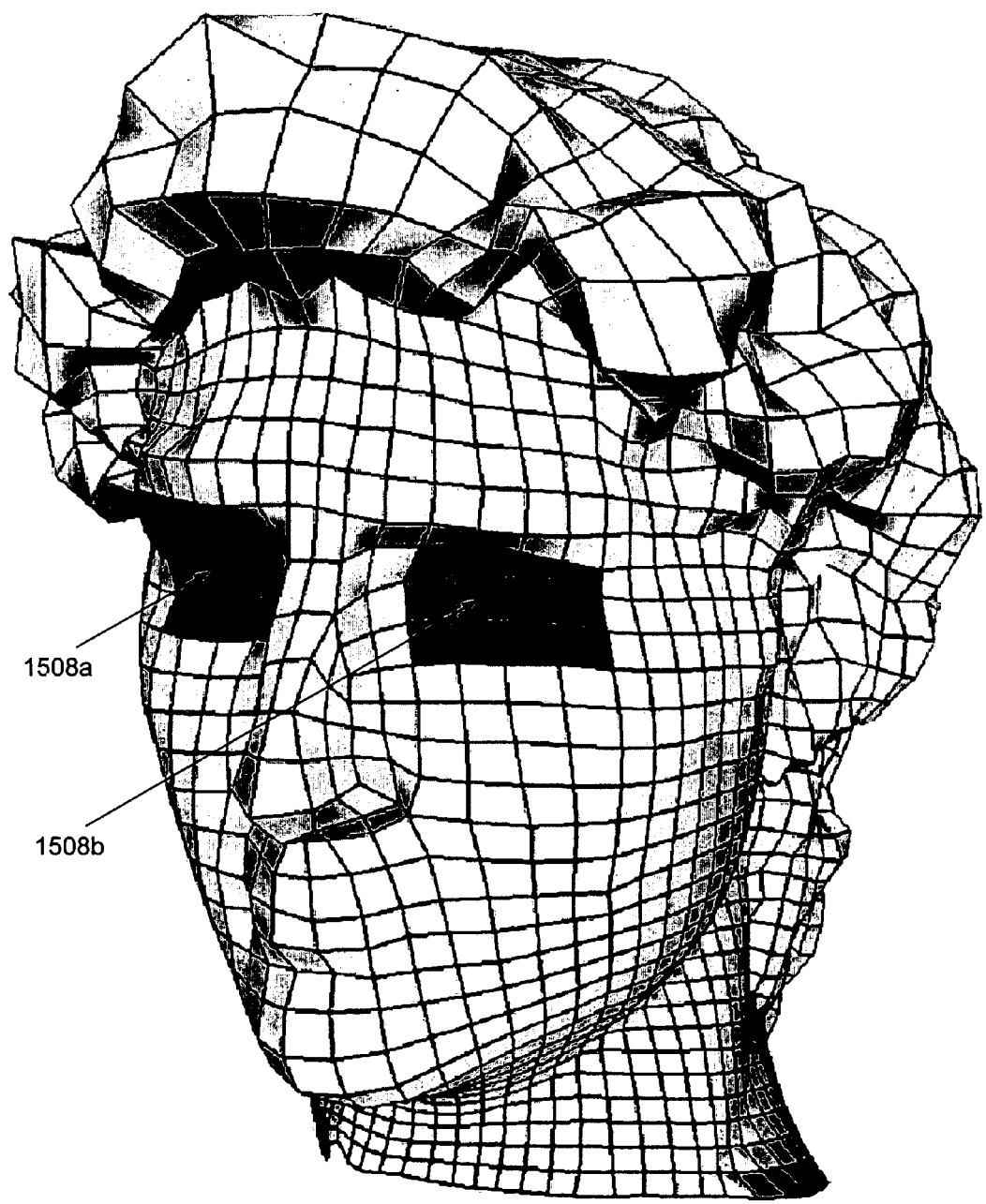
Figure 15D:
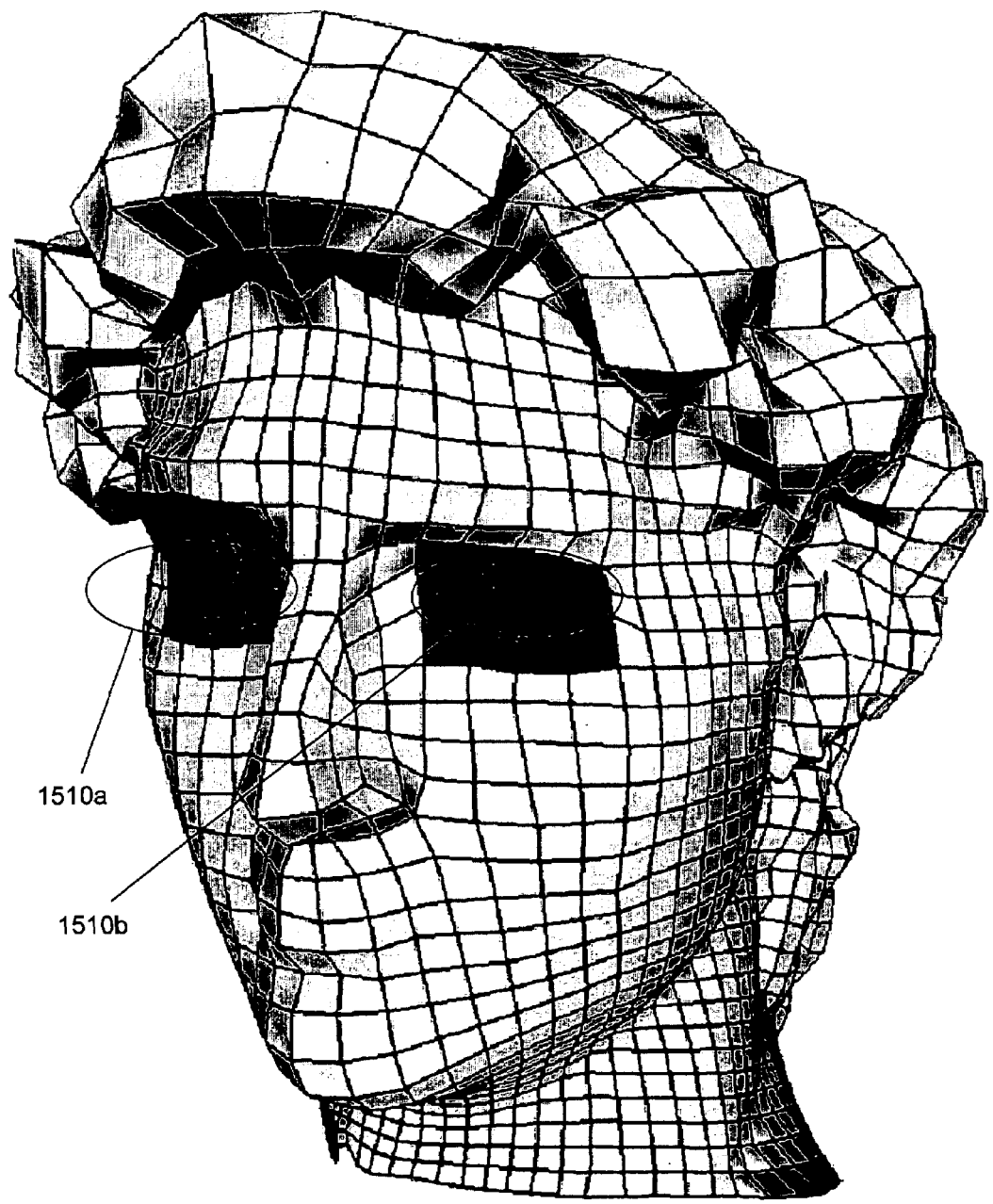

FIG. 15C illustrates a level four mesh representation of the head, after a user has selected eye areas 1508a and 1508b for irregular operations, comprising adding polygons, and realigning the patch edges so that they coincide with features, e.g., the eyelids/eye cavities, on the original object surface. FIG. 15D illustrates the same level four mesh after these irregular operations have been performed. In particular, note the addition of polygons in the areas 1510a and 1510b, and the alignment of the edges of these polygons with the eyelids/eye cavities in the original object surface.

Figure 15E:
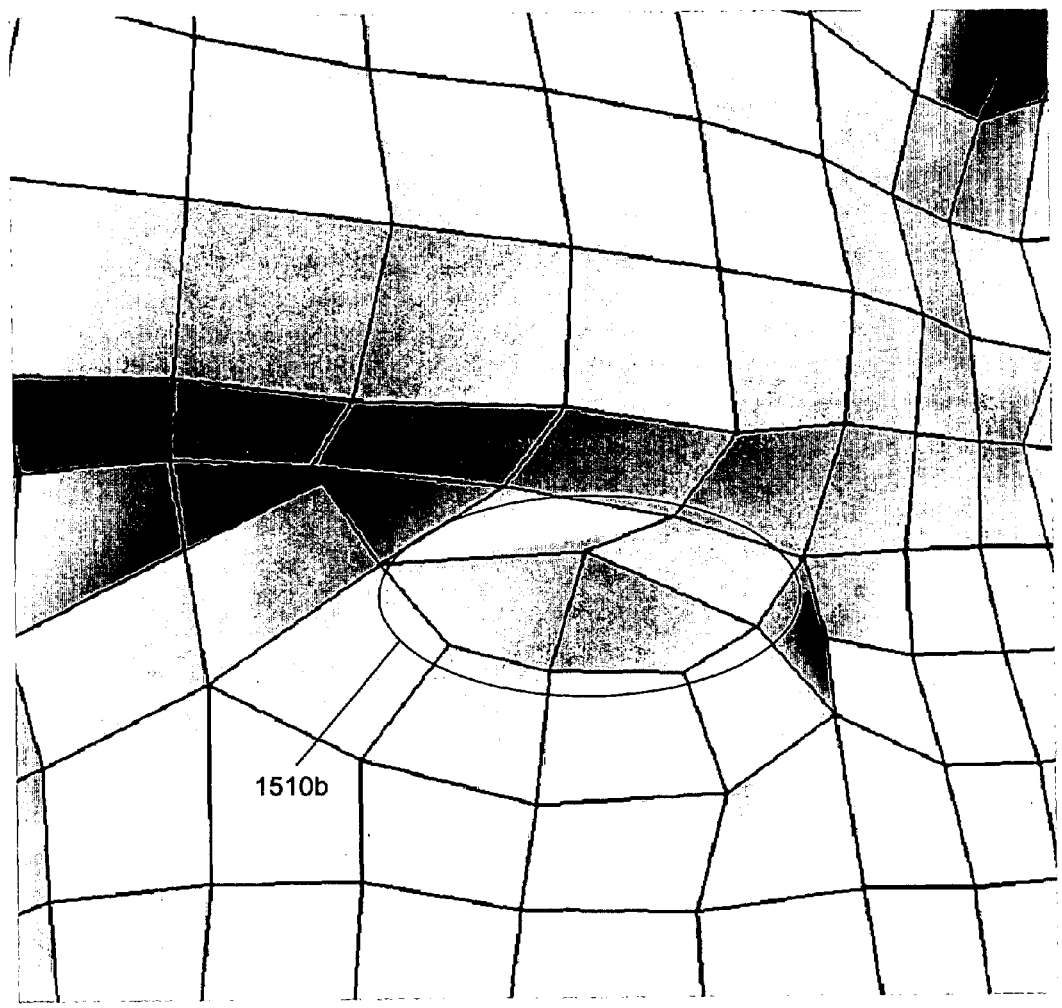
Figure 15F:
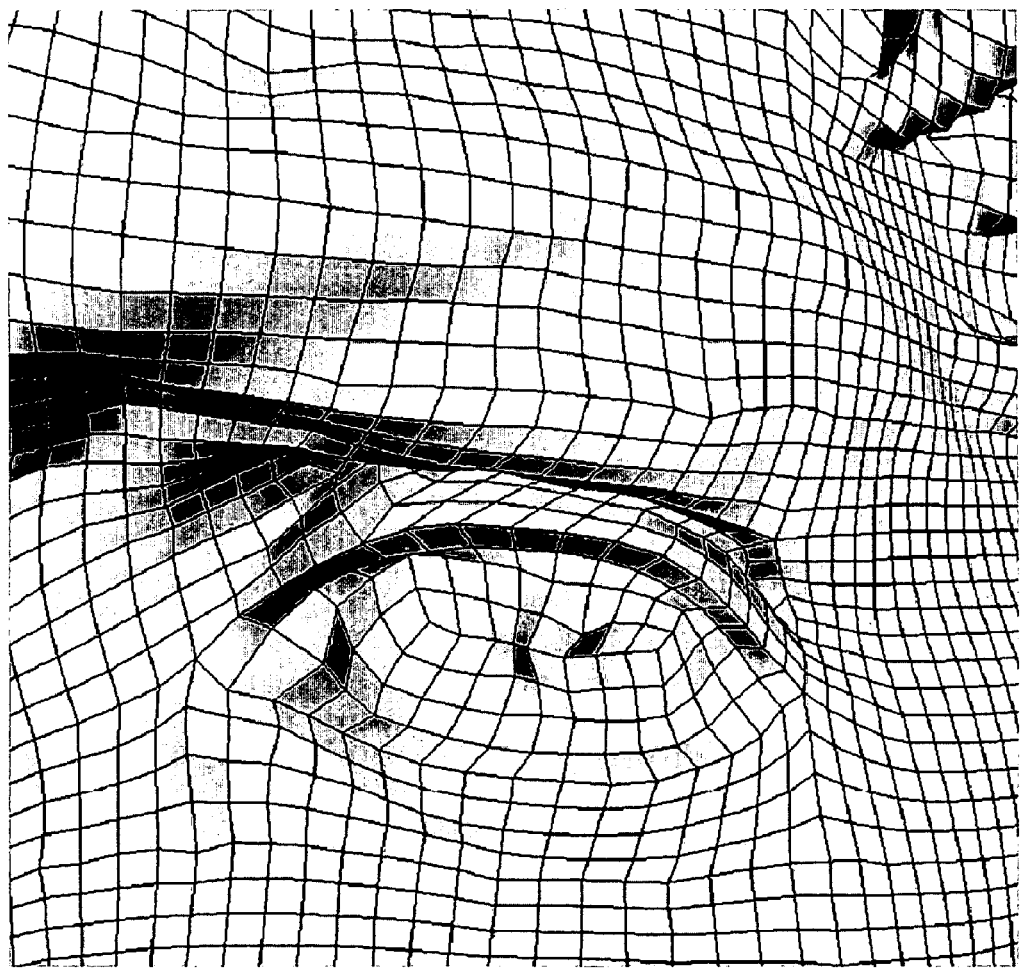
Figure 15G:

FIG. 15E illustrates a blow-up of the area 1510b in the level four mesh illustrated in FIG. 15B, and FIG. 15F illustrates this same area after it undergoes two additional adaptive refinement steps, i.e., regular refinement steps where faces which are already sufficiently flat are not subdivided. FIG. 15G illustrates the final mesh after eleven levels of adaptive refinement.

In one implementation, the method employs one or more algorithmic components in the process of building or applying a hybrid mesh representation of an object surface. These components will now be described using examples in which the polygons are in the form of quads. However, it should be appreciated that other examples and polygons are possible, so these examples should not be taken as limiting.

A first such algorithmic component is path tracing, which refers to the process of drawing lines between patch vertices on the original model. This process may be used for drawing layouts for the base mesh and submeshes.

A second such algorithmic component is parameterization, which has already been discussed in relation to FIG. 3.

Figure 16A:
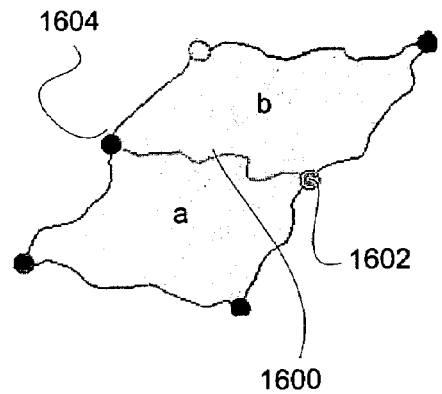
FIGS. 16A-16C illustrate one implementation of a process of relaxing patch edges which may find use or application in one embodiment of a process of building a hybrid mesh representation.
Figure 16B:
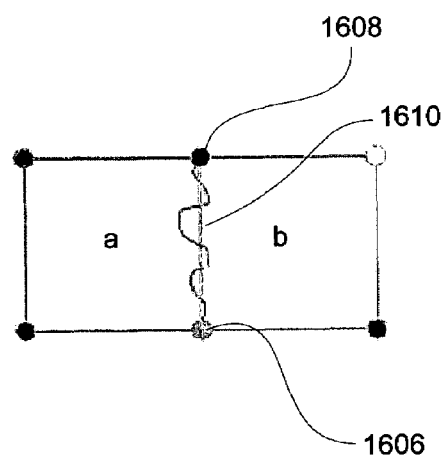
Figure 16C:
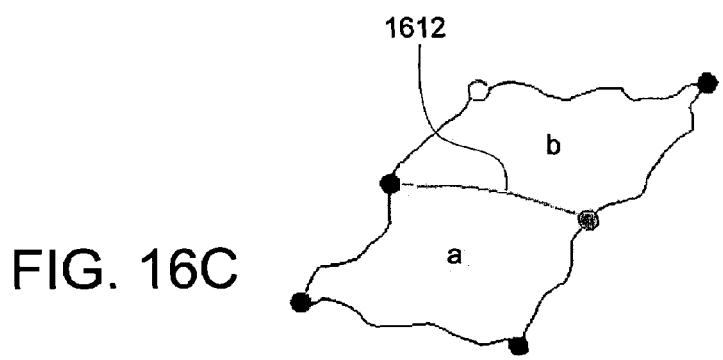

A third such algorithmic component is patch edge and vertex relaxation in order to achieve a smooth sampling pattern, and therefore smooth parameterization, of the remesh. Referring to FIGS. 16A-16C, the process of performing patch edge relaxation is illustrated. In FIG. 16A, two adjacent patches are identified as "a" and "b", and the edge to be relaxed is identified with numeral 1600. The patch vertices bounding the edge 1600 are identified with numerals 1602 and 1604.

To relax the boundary 1600, the patches "a" and "b" are parameterized, along with the vertices 1602 and 1604. Referring to FIG. 16B, through this process, the patch "a" is mapped into the unit square $[1, 0] \times [0, 1]$ in the (u, v) domain, and the patch "b" is mapped into the unit square $[2, 0] \times [0, 1]$ in the (u, v) domain. Similarly, the vertex 1602 is mapped into the vertex 1606 in the (u, v) domain, and the vertex 1604 is mapped into the vertex 1608 in the (u, v) domain. As illustrated in FIG. 16C, the straight line segment 1610 connecting the vertices 1606 and 1608 in the (u, v) domain is then mapped back into the (x, y, z) domain to become the relaxed patch edge 1612.

Figure 17A:
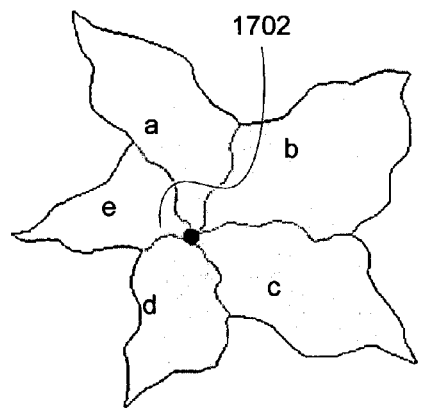
FIGS. 17A-17C illustrate one implementation of a process of relaxing polygon vertices which may find use or application in one embodiment of a process of building a hybrid mesh representation.
Figure 17B:
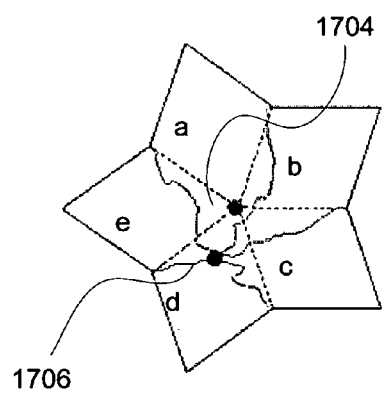
Figure 17C:
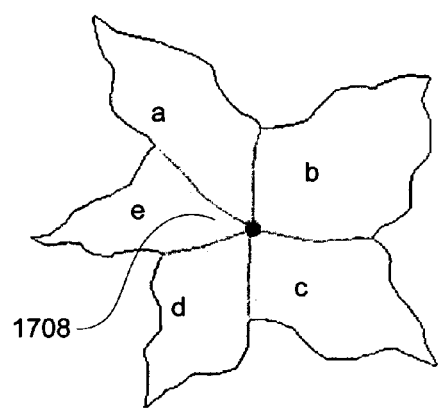

Referring to FIGS. 17A-17C, the process of performing patch vertex relaxation is illustrated. Referring to FIG. 17A, the vertex 1702 to be relaxed, along with its neighboring patches "a", "b", "c", "d", and "e", are mapped into a star-shaped region in the (u, v) domain as illustrated in FIG. 17B. The vertex 1702 in FIG. 17A is mapped into the vertex 1704 at the center of the star in FIG. 17B. Then, referring to FIG. 17B, the vertex 1704 is repositioned so that it is placed on the original object surface and is as close as possible to the star center 1704. The patch edges connecting to the vertex 1704 are repositioned as well to accommodate the shift in position of the vertex 1704. The new position of the vertex 1704 is identified with numeral 1706. Then, referring to FIG. 17C, the patches in the star, after the adjustment process illustrated in FIG. 17B, are mapped back into the (x, y, z) domain, as illustrated in FIG. 17C. Referring to FIG. 17C, the vertex 1706 in the parameter domain maps into the relaxed vertex 1708 in the (x, y, z) domain.

Figure 18A:
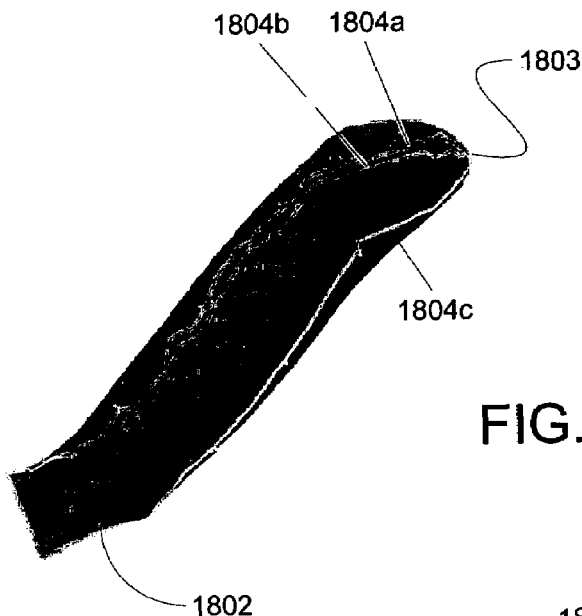
FIGS. 18A-18C illustrate one implementation of a semi-automated process of building or adding cubes or other volumes to a mesh representation which may find use or application in one embodiment of a process of building a hybrid mesh representation.
Figure 18B:
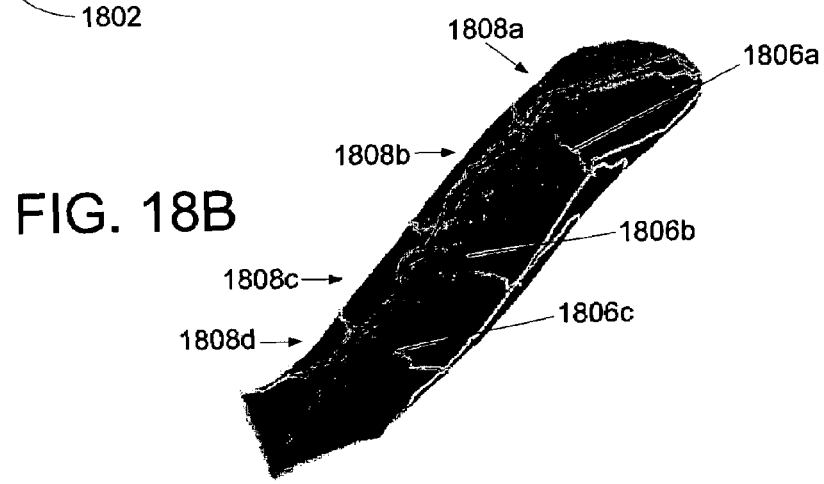
Figure 18C:

A fourth such algorithmic component is cube-building, an automatic procedure which is invoked when it is desired to add skin by building or adding cubes. Consider a portion of an object surface where one or more polygons in a mesh representation of the surface have a high aspect ratio or stretch parameter. Referring to FIG. 18A, which illustrates such a surface, the mesh boundary 1802 is first fixed. The vertex 1803 on the original object surface which is furthest from the boundary 1802 is then found, and then four curves 1804a, 1804b, 1804c, 1804d (curve 1804d not shown in FIG. 18A) are traced from the polygon corners on the boundary 1802 (which is assumed to be in the shape of a quad) to vertex 1803. Then, referring to FIG. 18B, the curves 1804a, 1804b, 1804c, 1804d are divided into four approximately equal portions 1808a, 1808b, 1808c, 1808d through the addition of connectors 1806a, 1806b, 1806c. The result is the formation of four cubes, one for each of the portions 1808a, 1808b, 1808c, 1808d. The cube vertices and edges are then relaxed using the procedures described above. The resulting mesh is illustrated in FIG. 18C.

Note that this cube building algorithm has been described in the context of quads and cubes, but it should be appreciated that other examples of building algorithms are possible employing polygons other than quads, and employing volumes other than cubes. Therefore, this particular example of a building algorithm should not be taken as limiting.

A fifth such algorithmic component is compression of hybrid mesh representations which is performed in a manner similar to that described in U.S. patent application Ser. No. 09/658,214, entitled "COMPRESSION OF 3D SURFACES USING PROGRESSIVE GEOMETRY," filed Sep. 8, 2000, U.S. Provisional Application No. 60/178,134, entitled "PROGRESSIVE GEOMETRY COMPRESSION," filed Jan. 26, 2000, and U.S. Provisional Application No. 60/176, 155, "PROGRESSIVE GEOMETRY COMPRESSION," filed Jan. 14, 2000, each previously incorporated herein by reference, in relation to normal meshes.

As described in these references, the method involves performing a wavelet transformation of the original geometry, resulting in a set of wavelet coefficients. These coefficients are then encoded with a progressive encoding algorithm such as but not limited to the zero-tree algorithm.

To accommodate hybrid mesh representations, the method is extended to allow for encoding of the $N^j \Rightarrow M^j$ transformations, and for encoding of removed faces. Another extension which is possible involves applying the wavelet transform algorithm (applied to triangles in the foregoing references) to quads. These extensions are described in Igor Guskov et al., "Hybrid Meshes: Multiresolution using regular and irregular refinement," submitted for publication to SIGGRAPH 2002. This reference is hereby fully incorporated by reference herein as though set forth in full.

A topic related to wavelets and wavelet transformations is subdivision since any wavelet transform corresponds to a particular subdivision scheme (such as the Cutmull-Clark scheme in the case of the wavelet transform and extensions thereof described in the foregoing references). With proper redefinition of a neighbor operation (to handle irregular operations), subdivision algorithms can be applied directly, without any or with no substantial modifications.

Decompression of the coded mesh proceeds in reverse order. First, a zero-tree (or any other progressive algorithm) recovers wavelet coefficients. Then, an inverse wavelet transform algorithm builds the surface back. Since the coder is assumed to be progressive, this implies that the whole compressed archive is not needed to do reconstruction, although the more bits that are used from the archive, the better quality that is achieved in the reconstruction. (More bits implies better precision of wavelet coefficients which implies higher quality geometry reconstruction).

Also, the decoder may automatically introduce irregular operations which were present in the original, but it will do so at an appropriate scale. For example, considering the Buddha model, at a very low bit-rate (where it is appropriate to use only very small portion from the beginning of the compressed file), the reconstruction may not have any tunnels and may look like some kind of cylinder. As more bits are used in the reconstruction, the more detailed geometry may be recovered and tunnels at finer and finer levels may be introduced. Conversely, the user may instruct the system to skip creating some or all tunnels (or any irregular operations in general), in which case the de-compressor/decoder functions akin to a simple topological editor.

Furthermore, the topology of a model compressed in accordance with the foregoing can be decoded progressively, resulting in progressive reconstruction and progressive topology changes. Consider, for example, a Stanford Buddha sequence in which more and more tunnels are introduced as the geometry becomes more accurate. At the discretion of a user, some or all of these tunnels can be left closed or be filled in by smooth pieces of the surface.

A sixth such component involves the use of a hybrid mesh hierarchy to build a viewer with a selectable level of detail selected from amongst several possible levels of detail, where the particular level of detail can be chosen to match the capabilities of the hardware employed by the user. For example, for a very slow or thin machine, the user would still be able to view the general shape of the model, while more detailed views of the model can be displayed on faster or more powerful machines.

A second aspect of the invention comprises a hybrid mesh representation of an object surface. The hybrid mesh representation comprises a base mesh and one or more higher level meshes in a hierarchical relationship. The base mesh may be a regular or irregular mesh. Moreover, each of the higher level patch-representing meshes may be a regular or irregular mesh, but at least one of the higher level patch-representing meshes should be an irregular mesh. Examples of hybrid meshes which are possible are illustrated and described in relation to FIGS. 9A-9H, 10A-10H, 11A-11F, 12A-12E, 13A-13H, 14A-14H, and 15A-15G.

Figure 19:
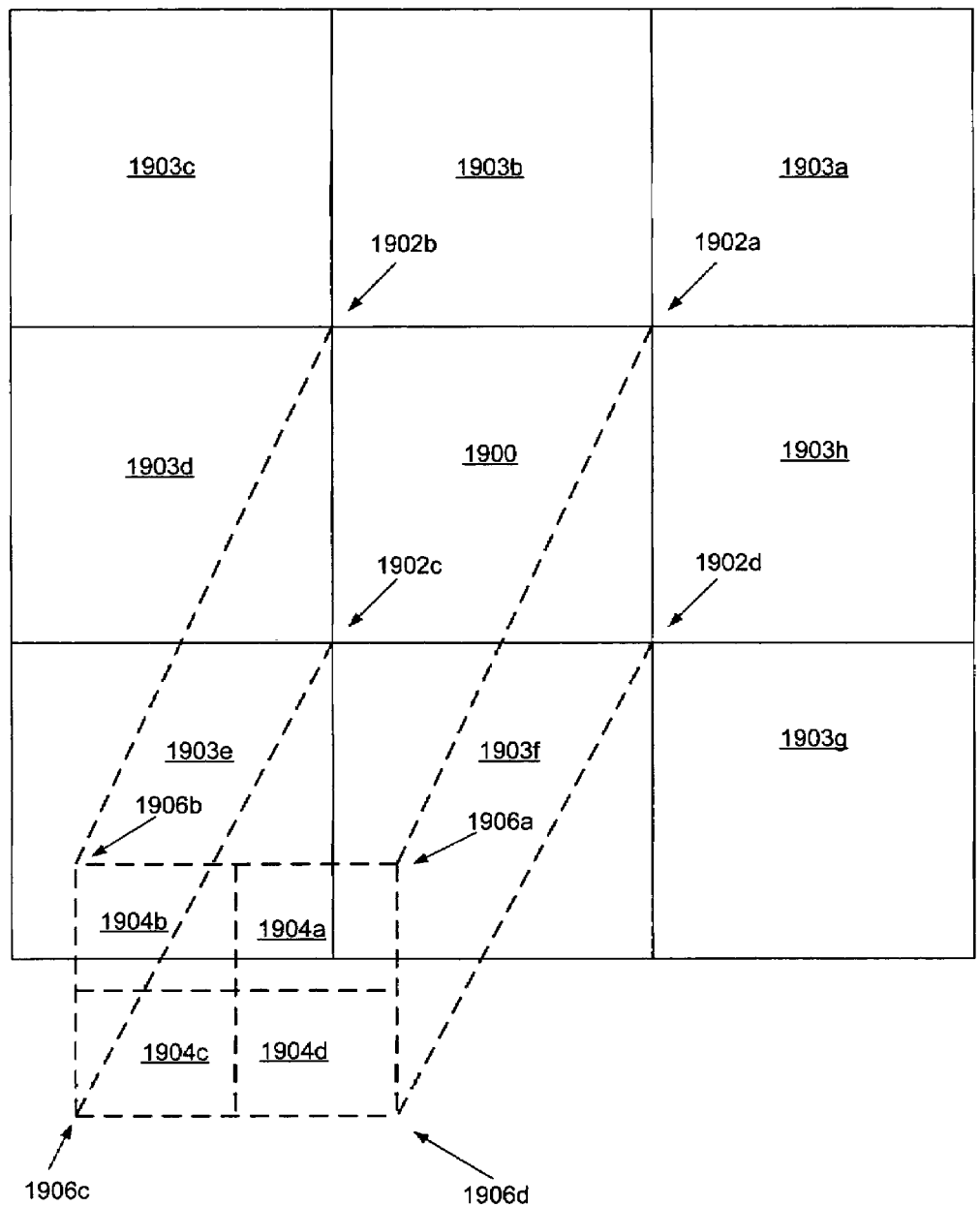
FIG. 19 depicts in simplified form embodiments of data structures corresponding to root polygons and child polygons.

A third aspect of the invention comprises one or more data structures corresponding to a hybrid mesh representation. A first data structure comprises a data structure corresponding to a root polygon in a mesh representation. In a hybrid mesh, such root polygons may appear in the base mesh or in higher level meshes. Referring to FIG. 19, in one embodiment, the data structure corresponding to root polygon 1900 comprises a pointer to each of its vertices 1902a, 1902b, 1902c, 1902d, a pointer to the root polygons 1903a, 1903b, 1903c, 1903d, 1903e, 1903f, 1903g, 1903h of each of its neighbors, and a pointer to the polygons 1904a, 1904b, 1904c, 1904d comprising each of its children.

A second data structure comprises a data structure corresponding to a child polygon in a mesh representation. In a hybrid, a child polygon may appear at any level beyond the base mesh. Referring to FIG. 19, the data structure corresponding to child polygon 1904b comprises a pointer to its parent, in this case, root polygon 1900, a pointer to each of its vertices 1906a, 1906b, 1906c, 1906d, and a pointer to each of its children (not shown). In this embodiment, in contrast to the data structure corresponding to a root polygon, the data structure corresponding to a child polygon lacks pointers to each of its neighbors.

To reduce memory usage on very large meshes, four children which have the same parent can be allocated as a single block. Within such a block, only one instance of pointers to shared objects like common parent and common vertices is required. Using such optimization, the memory usage can be reduced to only three pointers per each child face.

Each child polygon also comprises a flag which has first and second states. The flag is normally in the first state, indicating that the child polygon is present. If the child polygon is removed, such as through an irregular operation, the flag is placed in the second state. In one implementation, the first state is the state in which the flag is a logical "0" (the reset state), and the second state is the state in which the flag is a logical "1" (the set state).

One or more child polygons may be selected and removed. Additional polygons forming an arbitrary irregular submesh can be added. This submesh can be connected to the main mesh along the boundary of the selected region. In the latter case, the submesh boundary must agree with the boundary of selected region. If additional polygons are added, they are represented by root faces so they have neighbor pointers to each other. If the submesh is attached to the main mesh, the neighbor information indicating faces in the submesh which are neighbors of main mesh faces (which do not have neighbor pointers) is stored using virtual root faces. Such virtual root faces do not represent any polygon in the mesh but are only used to store neighbor information. Virtual root faces are referenced by removed faces as their children (removed faces cannot have any real children).

It is also possible to remove some faces, without adding others, thus introducing holes in a mesh. It is also possible to add but not attach new faces, thus introducing a disconnected component in a mesh.

An embodiment of a method of finding neighbors of a face in a hybrid mesh comprises first determining if the face is a root face or a child face. If the face is a root face, the neighbors are determined simply by retrieving the data structure corresponding to the root face, and accessing the pointers to the each of the neighbors.

If the face is a child face, the method comprises following the chain of parent pointers upwards to coarser levels of the hierarchy until the nearest common ancestor is reached. Then, the method proceeds to follow the child pointers back down to find the neighbors of the face in question.

If a root face is encountered on the upwards search to coarser levels of the hierarchy, its neighbor relationships need to explored first before descending back down to lower levels of the hierarchy. In particular, the downwards search may involve first following one of these neighbor pointers horizontally before moving downwards by following the child pointers.

If a removed face is encountered (determined from the setting of the flag associated with the data structure corresponding to the face), the neighbor pointers of any corresponding virtual root quad need to be explored in order to continue the method.

In one implementation, the hybrid mesh representation in accordance with the invention, or any of the data structures corresponding to polygons in a hybrid or other mesh representation may be tangibly embodied, through storage or otherwise, on or in a processor readable medium or memory including but not limited to RAM, ROM, PROM, EPROM, EEPROM, hard disk, floppy disk, CD-ROM, DVD, flash memory, etc.

While various embodiments of the invention have been described, it will be apparent to those of ordinary skill in the art that many more embodiments and implementations are possible that are within the scope of this invention.

What is claimed is:

1. A method of forming a hybrid mesh representation of an object surface comprising:
   forming a base mesh; and
   forming one or more higher level meshes from the base mesh through one or more regular refinement operations in combination with at least one irregular operation, the hybrid mesh representation comprising the base mesh in combination with the one or more higher level meshes, the irregular operation violating valence restrictions applicable to regular refinement operations.

2. The method of claim 1 wherein the base mesh is a regular mesh.

3. The method of claim 1 wherein the base mesh is an irregular mesh.

4. The method of claim 1 wherein the meshes each comprise plurality of tessellated polygons.

5. The method of claim 4 wherein the polygons are quads.

6. The method of claim 4 wherein the polygons are triangles.

7. The method of claim 4 wherein the polygons are hexagons.

8. The method of claim 1 wherein the base mesh and the one or more higher level meshes have a hierarchical relationship.

9. The method of claim 1 wherein the at least one irregular operation comprises cutting a hole in a mesh by removing polygons.

10. The method of claim 1 wherein the at least one irregular operation comprises adding one or more polygons to a mesh.

11. The method of claim 10 wherein the one or more polygons define a volume.

12. The method of claim 11 wherein the volume is a cube.

13. The method of claim 1 further comprising parameterizing one or more of the meshes.

14. The method of claim 13 further comprising performing the at least one irregular operation after the parameterization step.

15. A method of forming a hybrid mesh representation of an object surface comprising:
    a step for forming a base mesh; and
    a step for forming one or more higher level meshes from the base mesh through one or more regular refinement operations in combination with at least one irregular operation, the irregular operation violating valence restrictions applicable to regular refinement operations.

16. The hybrid mesh representation resulting from the method of any of claims 1-15.

17. A hybrid mesh representation of an object surface comprising:
    a base mesh comprising a plurality of patches; and
    one or more higher level meshes in a hierarchical relationship with the base mesh,
    at least one of the higher level meshes representing a patch in the base mesh being an irregular mesh, the irregular mesh violating valence restrictions applicable to regular refinement operations.

18. The hybrid mesh representation of claim 17 wherein the base mesh is a regular mesh.

19. The hybrid mesh representation of claim 17 wherein the base mesh is an irregular mesh.

20. The hybrid mesh representation of any of claims 17-19 which is tangibly embodied in a processor readable medium.

21. The hybrid mesh representation of claim 17 which is tangibly embodied in a memory.

22. A data structure corresponding to a root polygon in a hybrid mesh representation comprising a base mesh and one or more higher level meshes formed from the base mesh through one or more regular refinement operations in combination with at least one irregular operation that violates valence restrictions applicable to regular refinement operations, the polygon having vertices, one or more neighboring polygons, and, optionally, one or more child polygons, comprising:

a pointer to each of the vertices of the root polygon;

a pointer to each of the neighboring polygons or data structures corresponding thereto; and a pointer to any child polygons or data structures corresponding thereto, wherein the root polygon appears in either the base mesh or one of the one or more higher level meshes in the hybrid mesh representation.

23. The data structure of claim 22 wherein the root polygon is a quad.

24. The data structure of claim 22 wherein the root polygon is a triangle.

25. The data structure of claim 22 wherein the root polygon is a hexagon.

26. The data structure of claim 22 tangibly embodied in a processor readable medium.

27. The data structure of claim 22 tangibly embodied in a memory.

28. A data structure corresponding to a child polygon in a hybrid mesh representation comprising a base mesh and one or more higher level meshes formed from the base mesh through one or more regular refinement operations in combination with at least one irregular operation that violates valence restrictions applicable to regular refinement operations, the child polygon having vertices, a parent polygon, and, optionally, one or more second child polygons, comprising:

a pointer to the parent polygon or a data structure corresponding thereto;

a pointer to each of the vertices of the child polygon; and a pointer to any second child polygons or data structures corresponding thereto, wherein the child polygon appears in one of the one or more higher level meshes of the hybrid mesh representation.

29. The data structure of claim 28 tangibly embodied on or in a processor readable medium.

30. The data structure of claim 28 tangibly embodied on or in a memory.

31. The data structure of claim 28 further comprising a flag having first and second states for indicating whether or not the child polygon has been removed from the mesh representation.

32. A method of replacing a first polygon in a higher level mesh of a mesh representation having a base mesh and one or more higher level meshes with a plurality of second polygons comprising:

placing a flag in a state indicating that the first polygon has been removed from the mesh representation, the flag being part of a data structure corresponding to the first polygon, the data structure also having pointers to any polygons that are children of the first polygon;

adding the second polygons to the mesh representation; and modifying the pointers in the data structure corresponding to the first polygon so that they point to the second polygons or data structures corresponding thereto, wherein the replacing of the first polygon with the plurality of second polygons is an irregular operation that violates valence restrictions applicable to regular refinement operations.

33. The method of claim 32 wherein the mesh representation is a hybrid mesh representation comprising a base mesh and one or more higher level meshes formed from the base mesh through one or more regular refinement operations in combination with at least one irregular operation that violates valence restrictions applicable to regular refinement operations.

34. A data structure corresponding to a virtual root polygon in a hybrid mesh representation comprising a base mesh and one or more higher level meshes formed from the base mesh through one or more regular refinement operations in combination with at least one irregular operation that violates valence restrictions applicable to regular refinement operations, the virtual root polygon having vertices and corresponding to a removed child polygon having neighbors, and one or more added polygons which are neighbors of the neighbors of the removed child polygon, comprising:

a pointer to each of the vertices of the virtual root polygon; and a pointer to each of the added polygons which are neighbors of the neighbors of the removed child polygon, wherein the child polygon appears in one of the one or more higher level meshes of the hybrid mesh representation.

35. The data structure of claim 34 tangibly embodied in a processor readable medium.

36. The data structure of claim 34 tangibly embodied in a memory.

\* \* \* \* \*